(12) United States Patent
Nomura et al.

(10) Patent No.: US 6,741,807 B2
(45) Date of Patent: May 25, 2004

(54) LENS ASSEMBLY

(75) Inventors: Hiroshi Nomura, Saitama (JP); Takamitsu Sasaki, Saitama (JP); Kazunori Ishizuka, Kanagawa (JP); Maiko Takashima, Tokyo (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 10/101,837

(22) Filed: Mar. 21, 2002

(65) Prior Publication Data

US 2002/0136547 A1 Sep. 26, 2002

(30) Foreign Application Priority Data

Mar. 22, 2001 (JP) ........................................ 2001-082923

(51) Int. Cl.[7] .......................... G03B 17/00; G03B 9/08
(52) U.S. Cl. ..................... 396/72; 396/451; 396/462
(58) Field of Search ............................ 396/72, 82, 87, 396/451, 449, 462

(56) References Cited

U.S. PATENT DOCUMENTS

| | | |
|---|---|---|
| 4,227,792 A | 10/1980 | Rentschler |
| 4,390,262 A | 6/1983 | Hirohata et al. |
| 4,416,527 A | 11/1983 | Okura |
| 4,426,145 A | 1/1984 | Hashimoto |
| 4,484,800 A | 11/1984 | Tamura |
| 4,576,446 A | 3/1986 | Kamata |
| 4,595,081 A | 6/1986 | Parsons |
| 4,662,241 A | 5/1987 | Edwards |
| 4,834,514 A | 5/1989 | Atsuta et al. |
| 4,839,680 A | 6/1989 | Amada et al. |
| 4,922,274 A | 5/1990 | Yamamoto et al. |
| 4,944,030 A | 7/1990 | Haraguchi et al. |
| 4,971,427 A | 11/1990 | Takamura et al. |
| 4,993,815 A | 2/1991 | Yamazaki et al. |
| 5,037,187 A | 8/1991 | Oda et al. |
| 5,126,883 A | 6/1992 | Sato et al. |
| 5,166,829 A | 11/1992 | Iizuka |
| 5,177,638 A | 1/1993 | Emura et al. |
| 5,196,963 A | 3/1993 | Sato et al. |
| 5,241,422 A | 8/1993 | Shimada et al. |
| 5,268,794 A | 12/1993 | Chan |
| 5,301,066 A | 4/1994 | Higuchi et al. |
| 5,461,443 A | 10/1995 | Nakayama et al. |
| 5,559,571 A | 9/1996 | Miyamoto et al. |
| 5,589,987 A | 12/1996 | Tanaka |
| 5,701,208 A | 12/1997 | Sato et al. |
| 5,739,962 A | 4/1998 | Asakura et al. |
| 5,774,266 A | 6/1998 | Otani et al. |
| 5,812,889 A * | 9/1998 | Nomura et al. ............... 396/87 |
| 5,870,232 A | 2/1999 | Tsuji et al. |

(List continued on next page.)

FOREIGN PATENT DOCUMENTS

JP        4340907        11/1992

OTHER PUBLICATIONS

English Language Abstract of JP Appln. No. 4–340907.

Primary Examiner—Rodney Fuller
Assistant Examiner—Arthur A Smith
(74) Attorney, Agent, or Firm—Greenblum & Bernstein, P.L.C.

(57) ABSTRACT

A lens assembly includes an exposure control unit having an exposure control member; a lens drive unit including a lens drive mechanism which moves a photographing lens group in an optical axis direction; center apertures which are formed in the exposure control unit and the lens drive unit, respectively, at the center portions thereof, which define a lens movement opening when the exposure control unit and the lens drive unit are connected to each other; and a lens support frame which supports the photographing lens group, the lens support frame being provided in the lens movement openings so as to move in the optical axis direction and driven via the lens drive mechanism.

23 Claims, 29 Drawing Sheets

U.S. PATENT DOCUMENTS

| | | |
|---|---|---|
| 5,892,998 A | 4/1999 | Kodaira et al. |
| 5,933,285 A | 8/1999 | Sato et al. |
| 6,069,745 A | 5/2000 | Fujii et al. |
| 6,089,760 A | 7/2000 | Terada |
| 6,118,666 A | 9/2000 | Aoki et al. |
| 6,125,237 A | 9/2000 | Park |
| 6,160,670 A | 12/2000 | Nakayama et al. |
| 6,176,627 B1 | 1/2001 | Suh |
| 6,195,211 B1 | 2/2001 | Iwasaki |
| 6,522,478 B2 | 2/2002 | Nomura et al. |
| 6,522,481 B2 | 2/2002 | Nomura et al. |
| 6,522,482 B2 | 2/2002 | Nomura et al. |
| 6,369,955 B1 | 4/2002 | Enomoto et al. |
| 6,424,469 B2 | 7/2002 | Hirai |
| 6,429,979 B2 | 8/2002 | Enomoto |
| 6,437,922 B2 | 8/2002 | Enomoto et al. |
| 6,437,924 B1 | 8/2002 | Azegami |
| 6,456,442 B1 | 9/2002 | Enomoto |
| 6,456,445 B2 | 9/2002 | Nomura et al. |
| 6,469,840 B2 | 10/2002 | Nomura et al. |
| 6,469,841 B2 | 10/2002 | Nomura et al. |
| 6,493,511 B2 | 12/2002 | Sato |
| 6,512,638 B2 | 1/2003 | Sato et al. |
| 2002/0012178 A1 | 1/2002 | Noguchi |
| 2002/0036836 A1 | 3/2002 | Hagimori |

* cited by examiner

Fig. 8
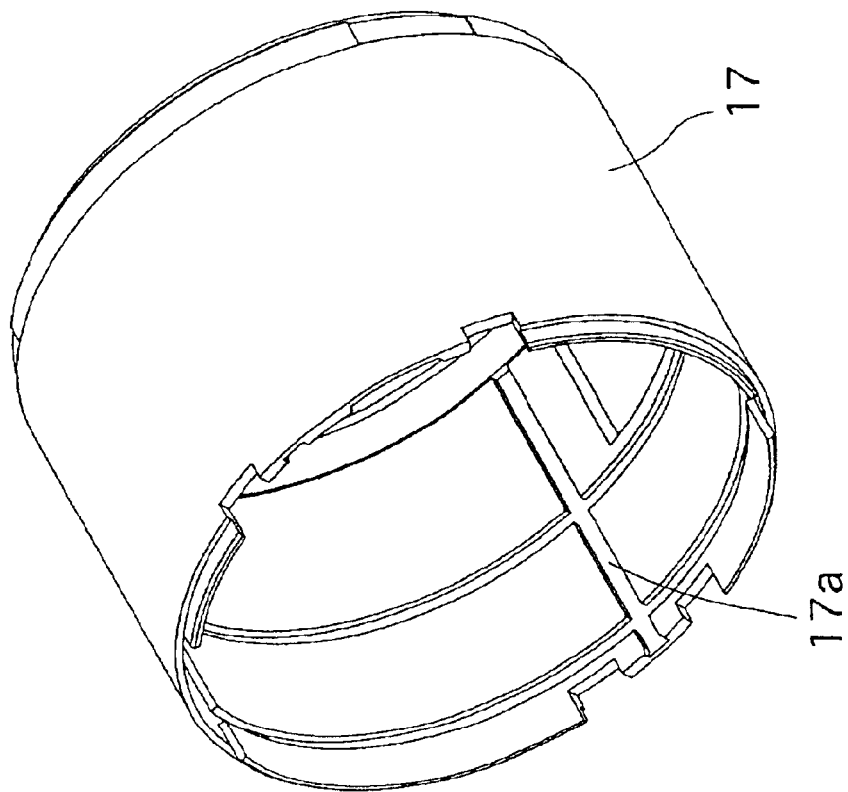
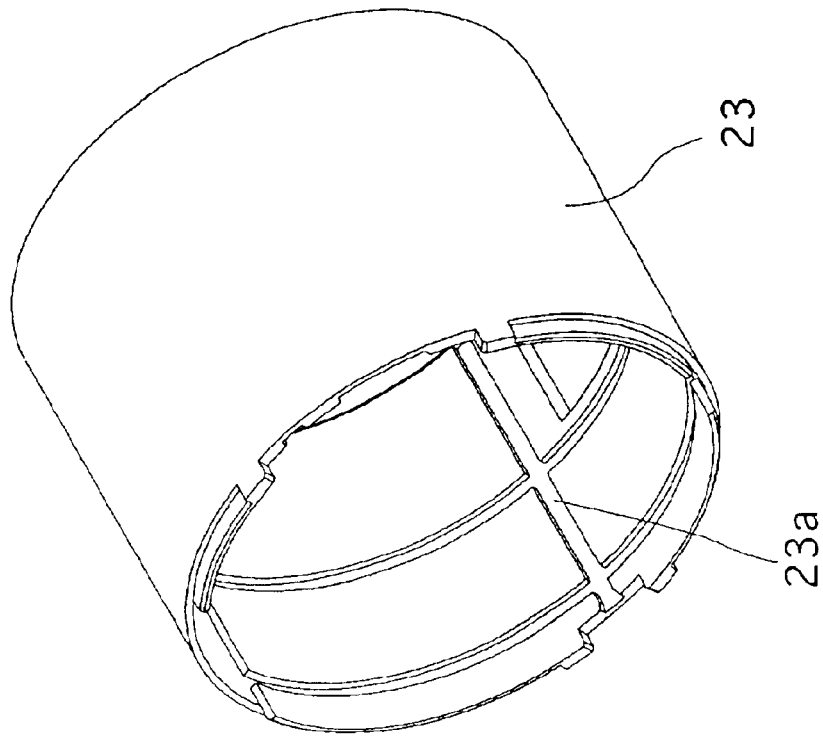

LENS ASSEMBLY

BACKGROUND OF THE INVENTION

1. Field of the Invention

The present invention relates to a lens assembly which includes a lens drive mechanism and an exposure control member.

2. Description of the Related Art

In a known lens shutter type camera, a drive mechanism which drives a photographing lens group (e.g., a focusing lens group) in an optical axis direction and an exposure control member, such as a shutter or a diaphragm, are integrally constructed as a lens assembly (lens-shutter unit/ photographing-function unit) which is incorporated in a lens barrel. The lens assembly which includes the lens drive mechanism and the exposure control member is complex in structure. The individual mechanisms mounted in the lens assembly have various functions including an exposure controlling function or a focusing function, which have significant influence on picture quality. Accordingly, each mechanism must be highly precisely operated. However, due to the complex structure of the lens assembly, it is impossible to individually remove the mechanisms from the lens assembly to inspect the operation or performance thereof. For instance, in order to examine the operation of a shutter or a diaphragm at the manufacturing stage, it is necessary to assemble the lens assembly including the lens drive mechanism, which is inconvenient. Likewise, it is impossible to examine the operation of the lens drive mechanism until the lens assembly is completely assembled.

During the manufacturing process or during repair of the lens drive mechanisms, if only one of the lens drive mechanism and the exposure control mechanism is defective, it is necessary to replace the entire the lens assembly including other mechanisms, even though the other mechanisms operate properly, which is very uneconomical.

Moreover, the lens assembly is often provided with a detector such as a photo-interrupter to detect the operation state of the photographing lens group or the exposure control member. In general, the detector is secured by an adhesive or the like. However, it takes long time to dry and set the adhesive, and a possible leakage of the adhesive attenuates the performance of functional members or movable members within the lens assembly, including the detector itself. Furthermore, once the detector is adhered, it is difficult to detach the detector afterwards.

SUMMARY OF THE INVENTION

The present invention provides a lens assembly which can be easily assembled and disassembled and the function of the internal elements can be easily checked without wasting the elements.

The present invention provides a lens assembly in which a detector to detect the operation of the photographing lens group or the exposure control member, etc., can be easily attached to and detached from the lens assembly without damaging the detector.

For example, in an embodiment, a lens assembly is provided, including an exposure control unit having an exposure control member; a lens drive unit including a lens drive mechanism which moves a photographing lens group in an optical axis direction; center apertures which are formed in the exposure control unit and the lens drive unit, respectively, at the center portions thereof, which define a lens movement opening when the exposure control unit and the lens drive unit are connected to each other; and a lens support frame which supports the photographing lens group, the lens support frame being provided in the lens movement openings so as to move in the optical axis direction and driven via the lens drive mechanism.

The lens drive mechanism can include a lens drive motor; and a lens drive gear train provided between the lens drive motor and the lens support frame; wherein the lens drive motor and the lens drive gear train are supported by the lens drive unit.

The lens drive mechanism can further include a lens drive ring which is rotatably provided between the lens drive unit and the exposure control unit; wherein the lens drive ring is rotated via the lens drive motor and the lens drive gear train, so that the lens support frame is moved in the optical axis direction in accordance with the rotation of the lens drive ring.

The photographing lens group can include a front sub-lens group and a rear sub-lens group which optically function at a mutually close position and a mutually distant position in the optical axis direction; wherein the lens support frame includes a front lens frame and a rear lens frame which support the front and rear sub-lens groups, respectively. The rear lens frame is rotatable within a predetermined angular range in the lens drive unit, and is supported so as to linearly move in the optical axis direction at each rotational extremity of the predetermined angular range while restricting the rotation thereof. The rear lens frame viand the lens drive ring include first contact portions, and the first contact portions causing the rear lens frame to rotate and linearly move at the each rotational extremity, in accordance with the rotation of the lens drive ring. The front lens frame and the rear lens frame include second contact portions, the second contact portions moving the front lens frame and the rear lens frame between the mutually close position and the mutually distant position in accordance with the rotation of the rear lens frame, and the second contact portions linearly moving the front lens frame together with the rear lens frame, in accordance with the linear movement of the rear lens frame.

It is desirable for the exposure control member provided in the exposure control unit to include at least one of shutter sectors which open and close the center aperture of the exposure control unit and diaphragm sectors which vary a diameter of the center aperture of the exposure control unit, independently of the shutter sectors.

It is desirable for the exposure control member to be rotatable about rotation axes parallel with the optical axis of the photographing lens group so that the exposure control member is movable into the center aperture of the exposure control unit in accordance with the rotation thereof. The exposure control unit is provided with an exposure control member drive ring which is rotatable in the forward and reverse directions about the optical axis, so that the exposure control member is driven by the rotation of the exposure control member drive ring.

The exposure control member drive ring can be provided with a gear having a center located substantially on the optical axis; the lens drive unit including an exposure control motor and an exposure control gear train provided between the exposure control motor and the gear of the exposure control member drive ring. When the lens drive unit and the exposure control unit are connected to each other, the exposure control gear train and the gear of the exposure control member drive ring are engaged with each other.

The exposure control member drive ring can be provided on the outer peripheral surface thereof with a driven projection which extends in an externally radial direction of the exposure control unit; and a ring-rotating mechanism can be externally provided on the exposure control unit, the ring-rotating mechanism being provided with an engagement portion with which the driven projection engages and which rotates the exposure control member drive ring via the engagement portion and the driven projection.

The lens assembly can be mounted to a zoom lens barrel, and the ring-rotating mechanism can rotate the exposure control member drive ring in accordance with a zooming operation of the zoom lens barrel.

The exposure control unit can include shutter sectors which open and close the center aperture of the exposure control unit; a shutter drive ring which rotates about the optical axis in the forward and reverse directions to open and close the shutter sectors; diaphragm sectors which vary the diameter of the center aperture of the exposure control unit, independently of the shutter sectors; and a diaphragm drive ring which rotates about the optical axis in the forward and reverse directions to open and close the diaphragm sectors.

The shutter drive ring, which is supported in the exposure control unit, can be provided with a gear having a center located substantially on the optical axis; and the lens drive unit can include a shutter drive motor, and a shutter drive gear train provided between the shutter drive motor and the gear of the shutter drive ring, so that the shutter drive gear train and the gear of the shutter drive ring engage with each other when the lens drive unit and the exposure control unit are connected to each other.

The diaphragm drive ring can be provided on the outer peripheral surface thereof with a driven projection which extends in an externally radial direction of the exposure control unit. A ring-rotating mechanism can be externally provided on the exposure control unit, the ring-rotating mechanism being provided with an engagement portion with which the driven projection engages and which rotates the diaphragm drive ring through the engagement portion and the driven projection.

The lens assembly can further include at least one detection member, the detection member including at least one of a lens movement detector which detects the amount and direction of the movement of the photographing lens group in the optical axis direction, and an exposure control detector which detects the operation state of the exposure control member. The lens drive unit can be provided on the outer surface thereof with a support portion on which the detection member is supported.

The lens assembly can further include a cover member which is provided with engagement portions for engaging with the lens drive unit and the exposure control unit, the cover member being mounted to the outer surfaces of the lens drive unit and the exposure control unit via the engagement portions when the lens drive unit and the exposure control unit are interconnected, to thereby cover the support portion which supports the detection member.

The cover member can be provided with an elastically deformable abutment portion which abuts against the detection member to bias the detection member into the support portion of the lens drive unit.

The cover member can support a portion of an FPC, which is connected to the detection member, between the cover member and the outer surface of the lens drive unit.

In another embodiment, a lens assembly is provided, including a support barrel having a center opening; a lens support frame which supports a photographing lens group; a lens drive mechanism which moves the lens support frame within the center opening of the support barrel in the optical axis direction; and an exposure control member which is movable into the center opening. The support barrel includes a lens drive unit having at least part of the lens drive mechanism, and an exposure control unit which supports the exposure control member. The lens drive unit and the exposure control unit are interconnected upon each of the lens drive unit and the exposure control unit being independently assembled.

In another embodiment, a lens assembly is provided, including an exposure control unit having an exposure control member; a lens drive unit including at least a part of a lens drive mechanism which moves a photographing lens group in an optical axis direction; center apertures which are formed in the exposure control unit and the lens drive unit, respectively, at the center portions thereof, which define a lens movement opening when the exposure control unit and the lens drive unit are connected to each other; a lens support frame which supports the photographing lens group, the lens support frame being provided in the lens movement openings so as to move in the optical axis direction and so as to be driven via the lens drive mechanism provided in the lens drive unit; a lens movement detector which detects the amount and direction of the movement of the lens support frame; an exposure control detector which detects the operational state of the exposure control member; support portions provided on the outer surface of the lens drive unit to support the lens movement detector and the exposure control detector; and a cover member which is provided with engagement portions for engaging with the lens drive unit and the exposure control unit, the cover member being mounted to the outer surfaces of the lens drive unit and the exposure control unit via the engagement portions when the lens drive unit and the exposure control unit are interconnected, to thereby cover the support portions which support the detectors.

The cover member can be provided with a pair of elastically deformable abutment portions which abut against the lens movement detector and the exposure control detector to bias the lens movement detector and the exposure control detector into the support portions of the lens drive unit.

The lens assembly can further include an FPC which is connected to the lens movement detector and the exposure control detector; wherein the cover member holds a part of the FPC between the cover member and the outer surface of the lens drive unit.

In another embodiment, a lens assembly is provided, including an exposure control mechanism; a lens drive mechanism which drives a photographing lens group in an optical axis direction; and a detector which detects the operational state of at least one of the lens drive mechanism and the exposure control mechanism. The lens assembly includes front and rear function units which can be divided, one of the front and rear function units being provided on the outer peripheral surface thereof with a detector receiving portion which receives therein the detector. A cover member having engagement portions for engaging with the front and rear function units can be mounted to the outer surfaces of the front and rear function units via the engagement portions when the function units are interconnected, to thereby cover the detector receiving portion.

The cover member can be provided with an elastically deformable abutment portion which abuts against the detector to bias the detector into the detector receiving portion of the function unit.

The lens assembly can further include an FPC which is connected to the detector; wherein the cover member holds a part of the FPC between the cover member and the outer surface of the function unit.

The present disclosure relates to subject matter contained in Japanese Patent Application No.2001-82923 (filed on Mar. 22, 2001) which is expressly incorporated herein by reference in its entirety.

BRIEF DESCRIPTION OF THE DRAWINGS

The invention will be discussed below with reference to the accompanying drawings, in which:

FIG. 8 is a perspective view of first and second outer barrels;

DESCRIPTION OF THE PREFERRED EMBODIMENTS

The following embodiments are addressed to a zoom lens barrel having a lens assembly (photographing-function unit) of the present invention.

Figure 1:
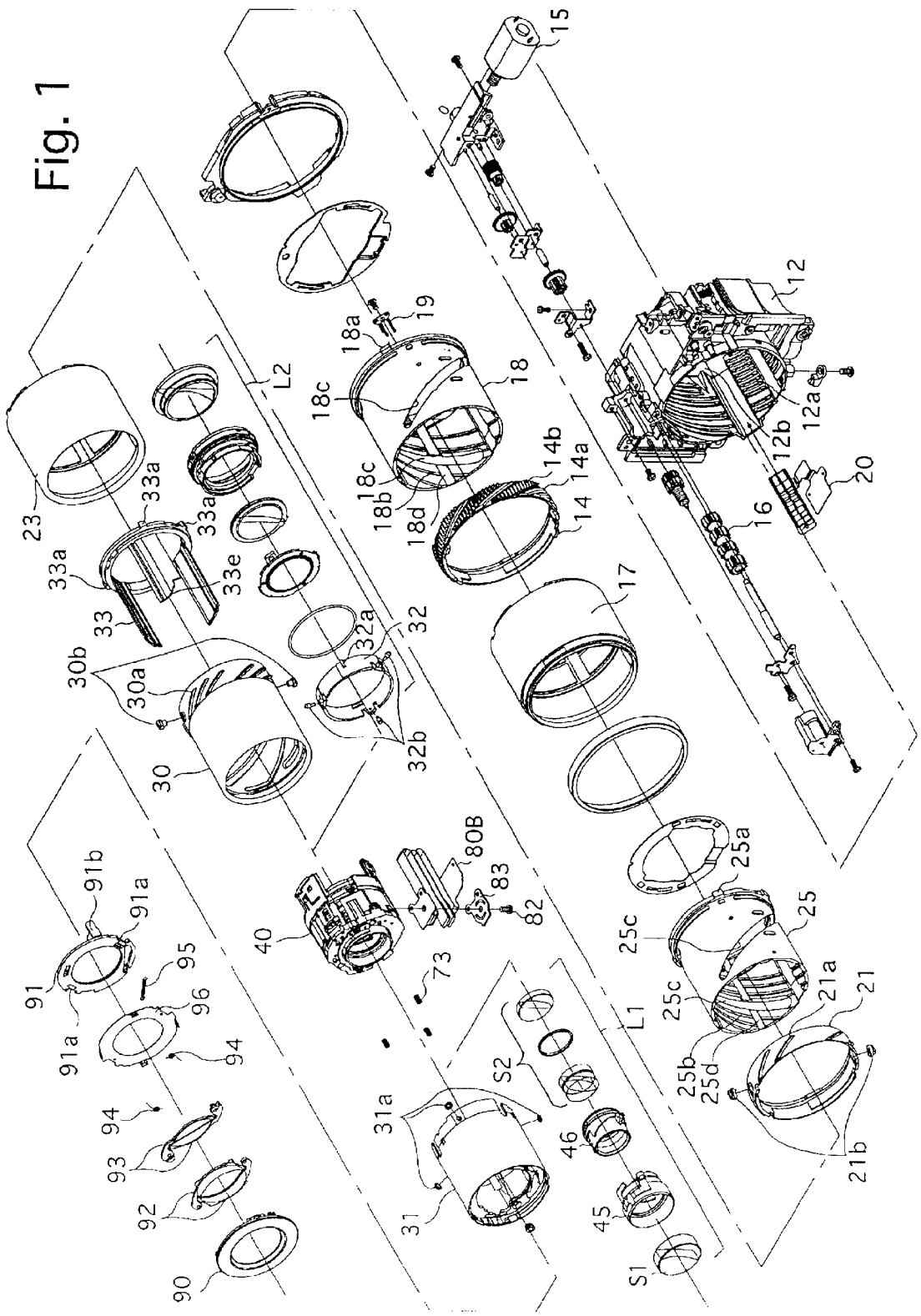
FIG. 1 is an exploded perspective view of components of a zoom lens barrel, according to the present invention.

As shown in FIG. 1, a stationary barrel 12 secured to a camera body 11 is provided on its inner peripheral surface with a female helicoid 12a which is screw-engaged with a male helicoid 14a formed on an outer peripheral surface of a first helicoid ring 14. A pinion 16 which is rotated by a zooming motor 15 is provided outside the stationary barrel 12. The pinion 16 is in mesh with a gear 14b formed on the outer peripheral surface of the first helicoid ring 14 via a cut-out portion of the male helicoid 14a. The gear 14b is inclined in the same direction as the lead of the male helicoid 14a. The first helicoid ring 14 is connected at the front end thereof to a first outer barrel 17. Consequently, when the first helicoid ring 14 is rotated in the forward or reverse direction by the zooming motor 15, the first helicoid ring 14 and the first outer barrel 17, integrally connected thereto, are moved in the optical axis direction in accordance with the engagement of the female helicoid 12 and the male helicoid 14a.

A first linear guide ring 18 which is rotatable relative to, and movable together with, the first outer barrel 17 in the optical axis direction (i.e., not relatively movable with respect to the first outer barrel 17 in the optical axis direction) is supported in the inner periphery of the first outer barrel 17. The first linear guide ring 18 has a projection 18a which is engaged in a linear guide groove 12b of the stationary barrel 12, so that the first linear guide ring 18 is linearly movable only in the optical axis direction. The axial displacement of the first linear guide ring 18 is detected by a brush 19 and a code plate 20 secured to the first linear guide ring 18 and the stationary barrel 12, respectively.

The first linear guide ring 18 is provided on the inner peripheral surface thereof with a female helicoid 18b which is engaged with a male helicoid 21a formed on an outer peripheral surface of a second helicoid ring 21. The second helicoid ring 21 is provided on the outer peripheral surface thereof with a pair of guide portions 21b which are engaged in guide grooves 17a (see FIG. 8) formed in the inner peripheral surface of the first outer barrel 17 through guide through-grooves 18c formed in the first linear guide ring 18. The guide through-grooves 18c are elongated through-holes inclined in the same direction as the female helicoid 18b, and the guide grooves 17a are linear grooves parallel with the optical axis O of the zoom lens system. The second helicoid ring 21 is connected at the front end thereof to a second outer barrel 23. Consequently, when the first outer barrel 17 is rotated in the forward or reverse direction by the zooming motor 15, the second helicoid ring 21 and the second outer barrel 23, integrally connected thereto, are rotated in accordance with the engagement between the guide portion grooves 17a and the guide portions 21b, and accordingly, are moved in the optical axis direction with respect to the first linear guide ring 18 (and an assembly of the first outer barrel 17 and the first helicoid ring 14) in accordance with the female helicoid 18b and the male helicoid 21a.

A second linear guide ring 25 which is rotatable relative to, and is movable in the optical axis direction together with, the second outer barrel 23 (i.e., not movable in the optical axis direction relative to the second outer barrel 23) is supported in the second outer barrel 23. The second linear guide ring 25 has a projection 25a which is engaged in a linear guide groove 18d of the first linear guide ring 18, so that the second linear guide ring 25 is linearly movable only in the optical axis direction.

Similar to the first linear guide ring 18, the second linear guide ring 25 is provided on the inner peripheral surface thereof with a female helicoid 25b which is engaged with a male helicoid 30a formed on an outer peripheral surface of a rear end of a cam ring (third outer barrel) 30. The cam ring 30 is provided on the outer peripheral surface thereof with a pair of guide portions 30b which are engaged in guide grooves 23a (see FIG. 8) formed in the inner peripheral surface of the second outer barrel 23 through guide through-grooves 25c formed in the second linear guide ring 25. The guide through-grooves 25c are in the form of elongated through-holes inclined in the same direction as the female helicoid 25b, and the guide grooves 23a are in the form of linear grooves parallel with the optical axis O. Consequently, when the second outer barrel 23 is rotated in the forward or reverse direction by the zooming motor 15, the cam ring 30 is moved in the optical axis direction relative to the second linear guide ring 25 (and an assembly of the second outer barrel 23 and the second helicoid ring 21), in accordance with the engagement between the female helicoid 25b and the male helicoid 30a.

A third linear guide ring 33 which is rotatable relative to, and is movable in, the optical axis direction together with the cam ring 30 (i.e., not movable in the optical axis direction relative to the cam ring 30) is supported in the cam ring 30. The third linear guide ring 33 is provided on the outer peripheral surface thereof with a plurality of linear guide projections 33a which are engaged in a linear guide groove 25d formed on the inner peripheral surface of the second linear guide ring 25, so that the third linear guide ring 33 is linearly movable only in the optical axis direction.

Figure 9:
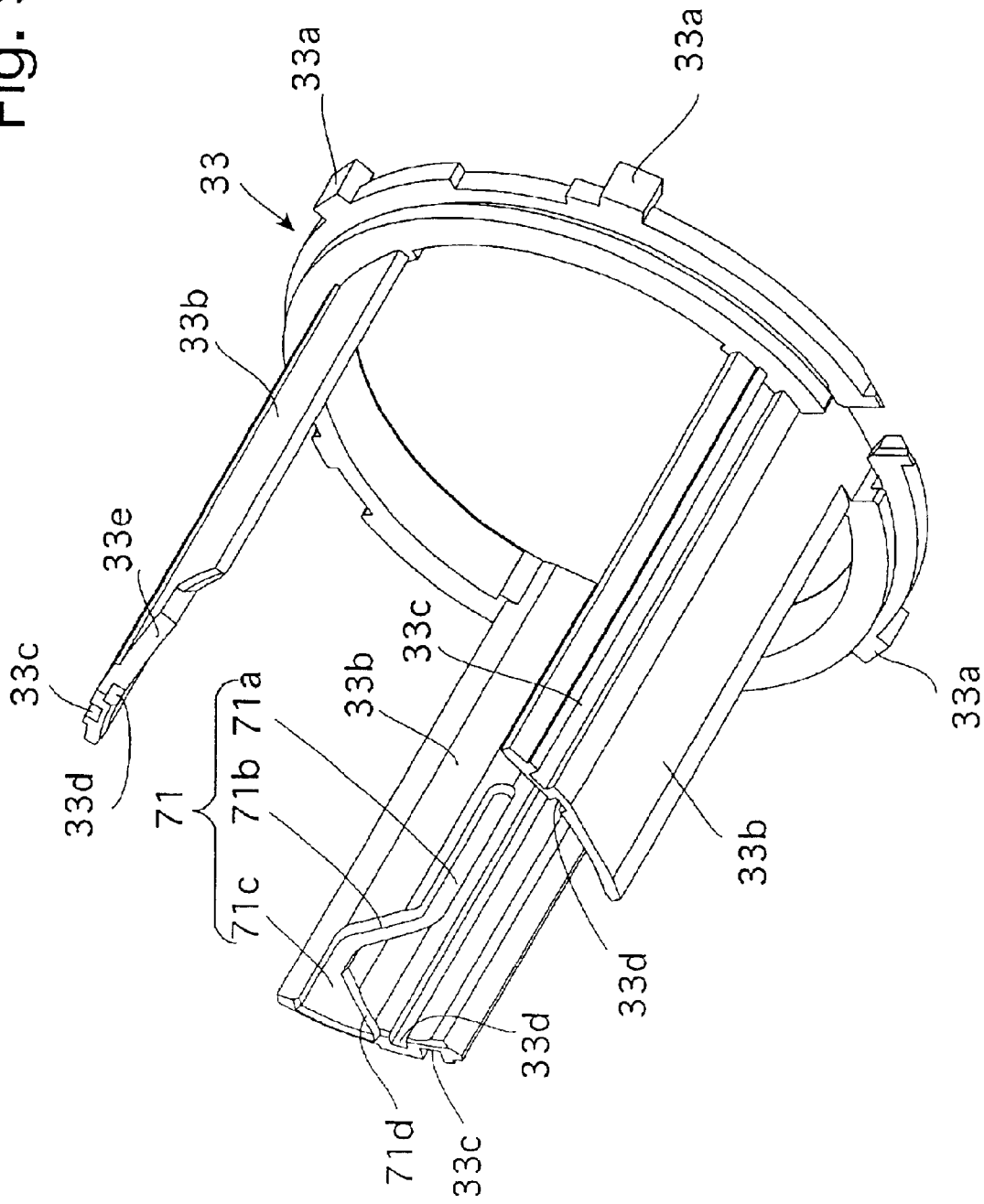
FIG. 9 is a perspective view of a third linear guide ring.
Figure 10:
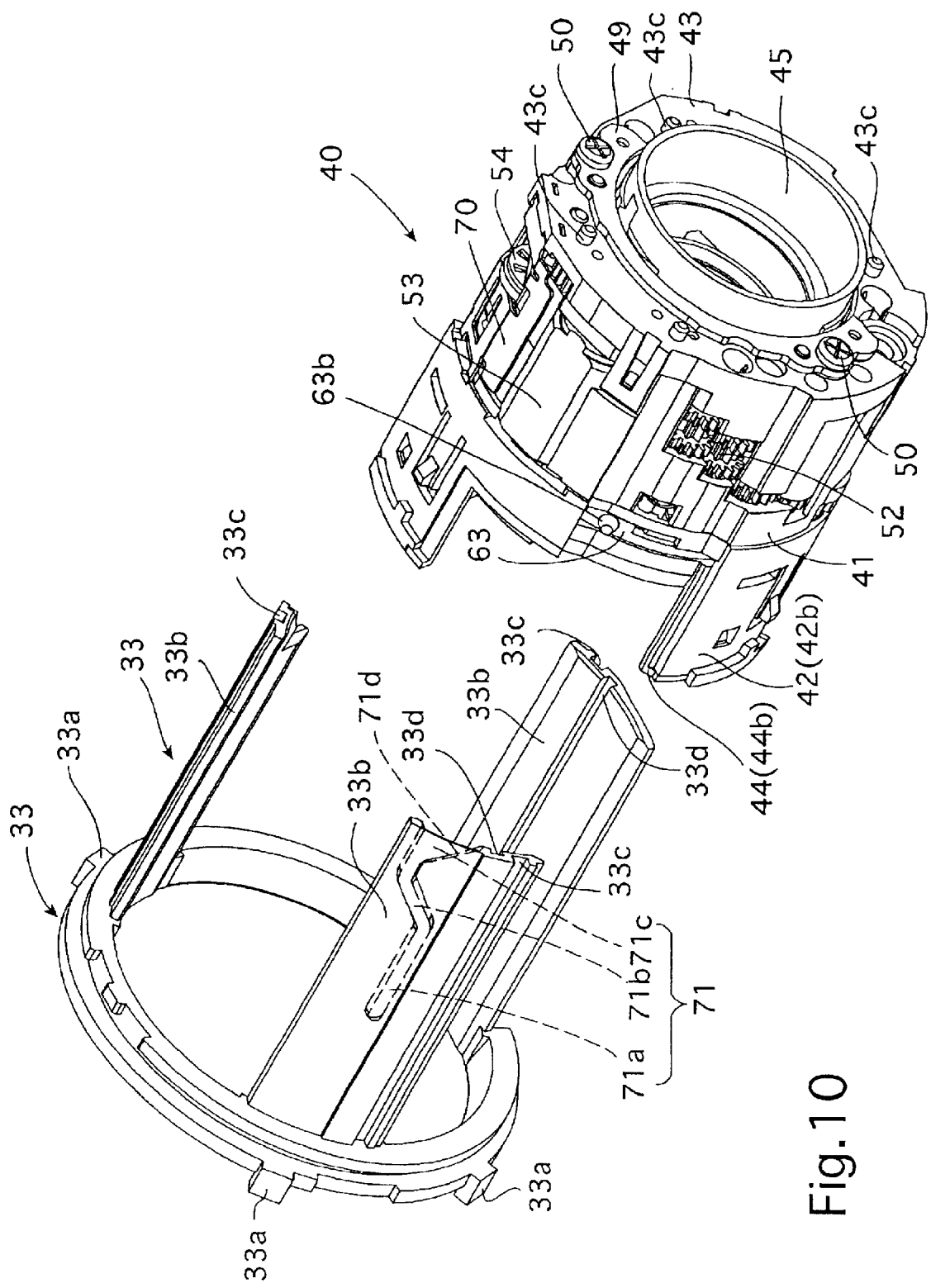
FIG. 10 is an exploded perspective view of a third linear guide ring and a lens-shutter unit.

A lens support barrel (fourth outer barrel) 31 having a first variable power lens group L1 (first sub-lens group S1 and a second sub-lens group S2) and a second lens group frame 32 having a second variable power lens group L2 secured thereto are arranged in the cam ring 30. The lens support barrel 31 and the second lens group frame 32 are guided to linearly move in the optical axis direction with the third linear guide ring 33. Specifically, as shown in FIGS. 9 and 10, three arms 33b, which are provided on the periphery of an imaginary cylinder and constitute the third linear guide ring 33, are each provided on the outer and inner surfaces (front and rear sides) thereof with linear guide grooves 33c and 33d which extend parallel with the optical axis O. Linear guide projections (not shown) provided on the inner peripheral surface of the lens support barrel 31 are movably fitted in the respective linear guide grooves 33c, and linear guide projections 32a provided on the outer peripheral surface of the second lens group frame 32 are movably fitted in the respective linear guide grooves 33d.

Figure 12:
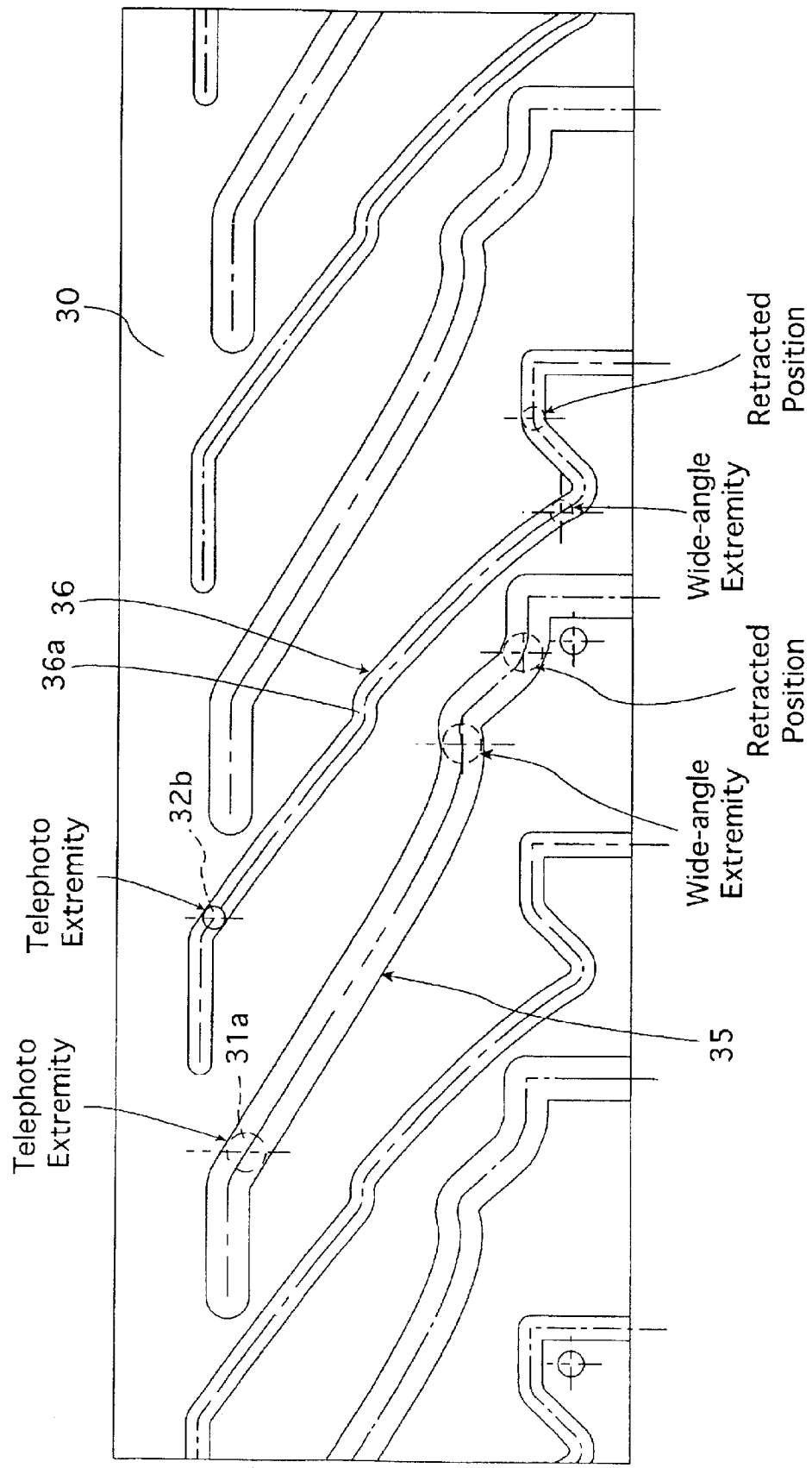
FIG. 12 is a developed view of an inner surface of a cam ring, showing a cam groove profile, by way of example.

The cam ring 30 is provided on the inner peripheral surface thereof with bottomed cam grooves 35 and bottomed cam grooves 36 for the lens support barrel 31 and the second lens group frame 32, respectively. FIG. 12 shows a developed view of the bottomed cam grooves 35 and 36. There are three sets of bottomed cam grooves 35 and 36, respectively, and are spaced in the circumferential direction at equal pitches. The lens support barrel 31 and the second lens group frame 32 are provided with radially extending cam follower projections 31a and 32b which are fitted in the bottomed cam grooves 35 and 36, respectively.

In FIG. 12, the bottomed cam grooves 35 and 36 have a range of usage between a telephoto extremity position and a retracted position. Upon photographing, the follower projections 31a and 32b are guided between the telephoto extremity position and a wide-angle extremity position within the range of usage of the bottomed cam grooves 35 and 36. The bottomed cam grooves 36 are each provided with an intermediate interruption portion 36a between the telephoto extremity and the wide-angle extremity. The first variable power lens group L1 held in the lens support barrel 31 which is guided by the bottomed cam grooves 35 has a switching function to move the first sub-lens group S1 and the second sub-lens group S2 to a mutually close position and a mutually distant position at an intermediate position between the telephoto extremity and the wide-angle extremity. Upon switching of the first variable power lens group L1, the second variable power lens group L2 passes through the intermediate interruption portions 36a of the bottomed cam grooves 36. The intermediate interruption portions 36a are not used as zooming areas during an actual zooming operation (i.e., the cam ring 30 is not stopped thereat).

In the zoom lens barrel constructed as above, when the pinion 16 is rotated in the forward or reverse direction by the zooming motor 15, the cam ring 30 is moved in the optical axis direction while rotating, so that the lens support barrel 31 (first variable power lens group L1) and the second lens group frame 32 (second variable power lens group L2), guided in the cam ring 30 to linearly move in the optical axis direction, are linearly moved in the optical axis direction in accordance with predetermined profiles of the bottomed cam grooves 35 and 36. For instance, in the retracted position of the lens barrel (accommodated position) shown in FIG. 2, the entire zoom lens barrel is substantially retracted in the camera body. When the zooming motor 15 is driven in the barrel advancing direction, the zoom lens barrel is moved to the wide-angle extremity position shown in FIG. 3. The zoom lens barrel can be moved to the telephoto extremity position shown in FIG. 4 by further rotation of the zooming motor 15 in the barrel advancing direction. If the zooming motor 15 is rotated in the reverse direction, the zoom lens barrel is moved from the telephoto extremity position to the wide-angle extremity position and to the retracted position. The zooming operation is, in practice, controlled stepwise so that the focal length from the wide-angle extremity and the telephoto extremity is split into a plurality of focal length steps, wherein the zooming motor 15 is stopped at each focal length step to carry out focusing or an exposure. In the control therefor, the area corresponding to the switching of the first sub-lens group S1 and the second sub-lens group S2 between the mutually close position to the mutually distant position is not used for photographing and, hence, the focal length step does not exist in this area, wherein the cam ring 30 (zooming motor 15) does not stop thereat.

Figure 13:
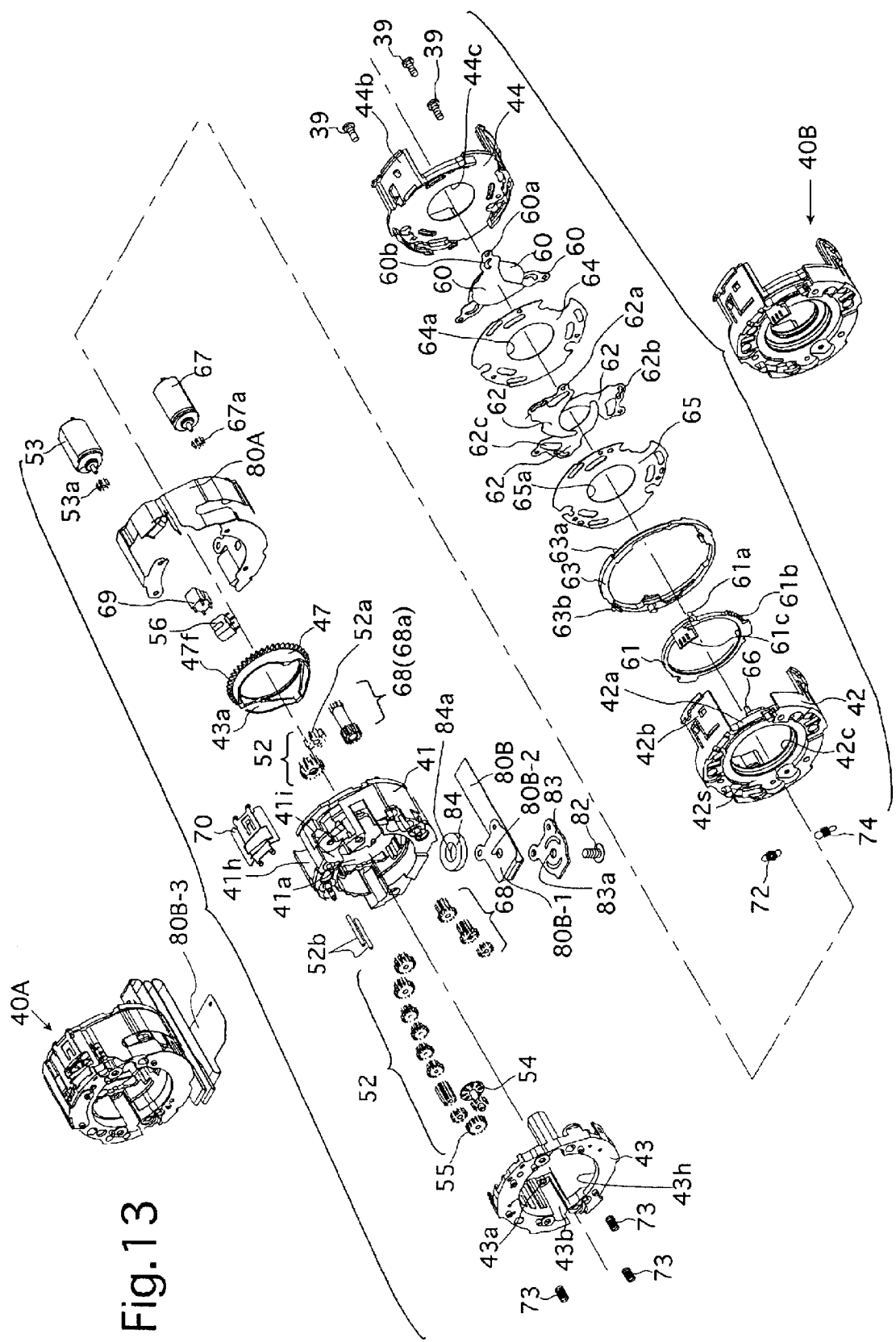
FIG. 13 is an exploded perspective view of a lens-shutter unit.
Figures 18, 19:
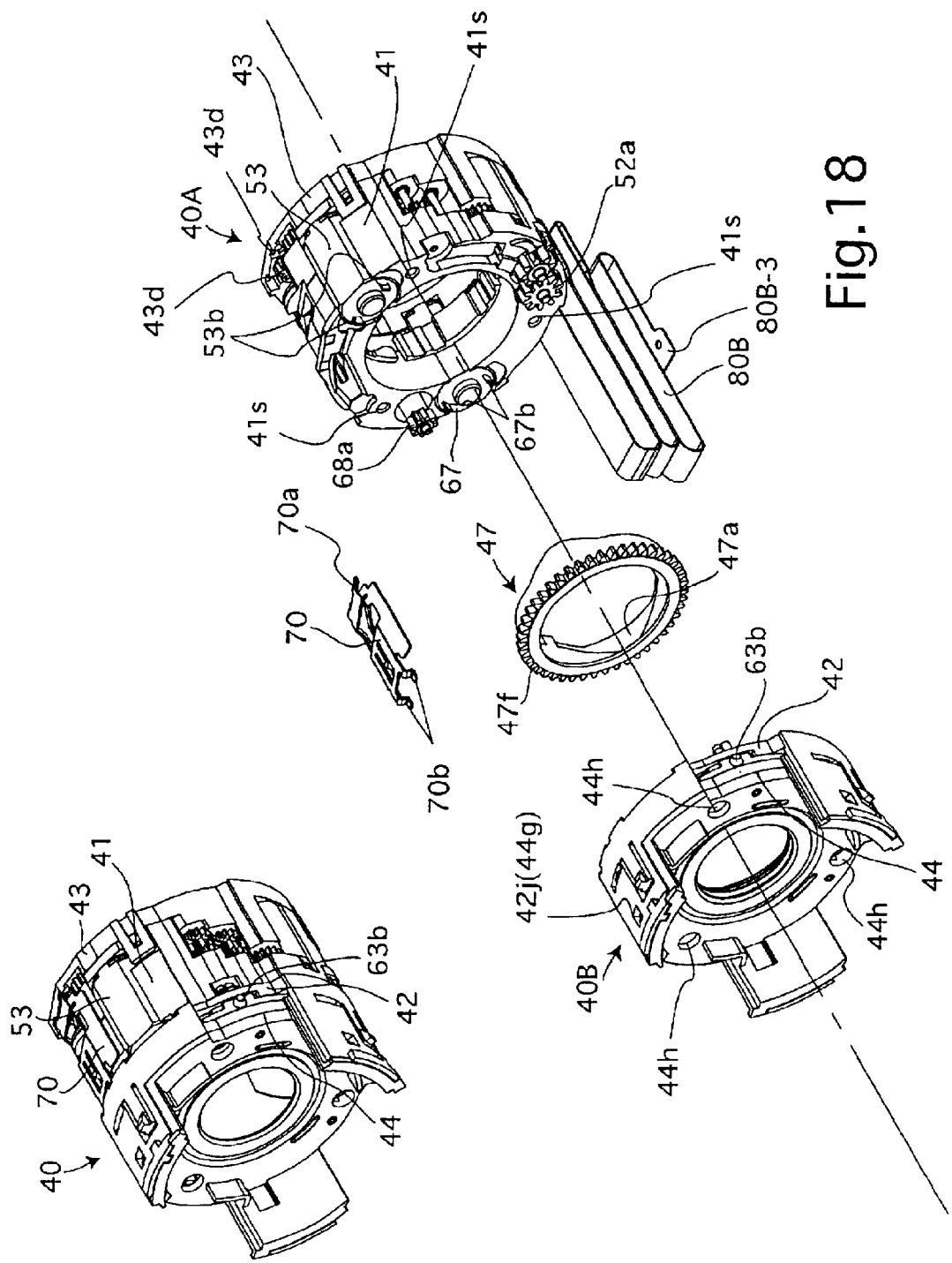
FIG. 18 is an exploded rear perspective view of a front unit and a rear unit, of a lens-shutter unit.
FIG. 19 is a rear perspective view of an assembly of a front and rear unit, of a lens-shutter unit.

A lens-shutter unit 40 is provided in the lens support barrel 31. As shown in FIGS. 13 and 18, the lens-shutter unit 40 includes a front support ring 41, a rear support ring 42, a gear retainer ring 43 and a sector retainer ring 44. The lens-shutter unit 40 can be split into two units, i.e., a front unit 40A having an assembly including the front support ring 41 and the gear retainer ring 43, and a rear unit 40B having an assembly including the rear support ring 42 and the sector retainer ring 44.

The front unit 40A will be discussed below. The front support ring 41 has a center opening 41a in which the front sub-lens group frame 45 and the rear sub-lens group frame 46 are fitted. The first sub-lens group S1 is secured to the front sub-lens group frame 45 and the second sub-lens group S2 is secured to the rear sub-lens group frame 46. The relative axial position of the front sub-lens group frame 45 and the rear sub-lens group frame 46 (the first sub-lens group S1 and the second sub-lens group S2) between the telephoto extremity and the wide-angle extremity can be selectively moved to the mutually distant position for a short focal length and the mutually close position for a long focal length. The relative movement of the axial position of the front sub-lens group frame 45 and the rear sub-lens group frame 46, and the focusing operation in which the front sub-lens group frame 45 and the rear sub-lens group frame 46 are moved together in the optical axis direction, can be performed by the drive ring 47.

The rearward extremity of the drive ring 47 is restricted by the receiving surface 42s of the rear support ring 42 and is rotatably supported between the front support ring 41 and the rear support ring 42.

Figure 20:
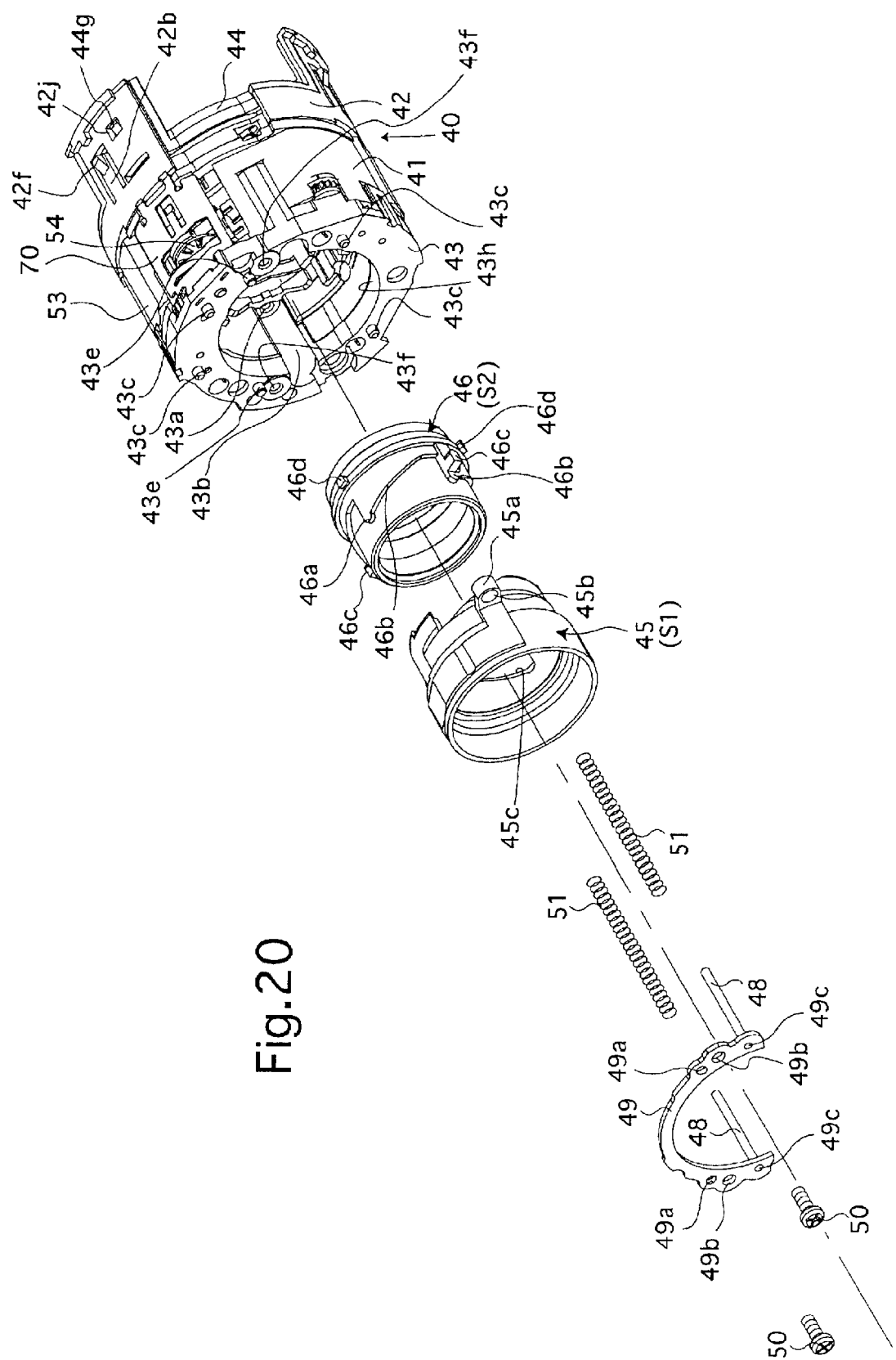
FIG. 20 is an exploded perspective view of a first variable power lens group and surrounding components thereof.

The front sub-lens group frame 45 is cylindrical and is provided on the outer periphery thereof with diametrically opposed linear guide ribs 45a, as shown in FIG. 20. The linear guide ribs 45a are provided with guide holes 45b in which linear guide rods 48 are loosely fitted (inserted). The linear guide rods 48 are secured at the rear ends thereof to securing holes 43a formed in the bottom of the gear retainer ring 43, and the front ends of the linear guide rods 48 are secured to a securing bracket 49. The securing bracket 49 is secured to the front surface of the gear retainer ring 43 with securing screws 50. Compression coil springs 51 which are provided between the securing bracket 49 and the linear guide ribs 45a surround the linear guide rods 48 to bias the front sub-lens group frame 45 toward the rear sub-lens group frame 46. The gear retainer ring 43 is provided with generally U-shaped recesses 43b in which the linear guide rods 48 and the compression coil springs 51 are received. The recesses 43b are communicatively connected to the center opening 41a of the front support ring 41.

Figure 22:
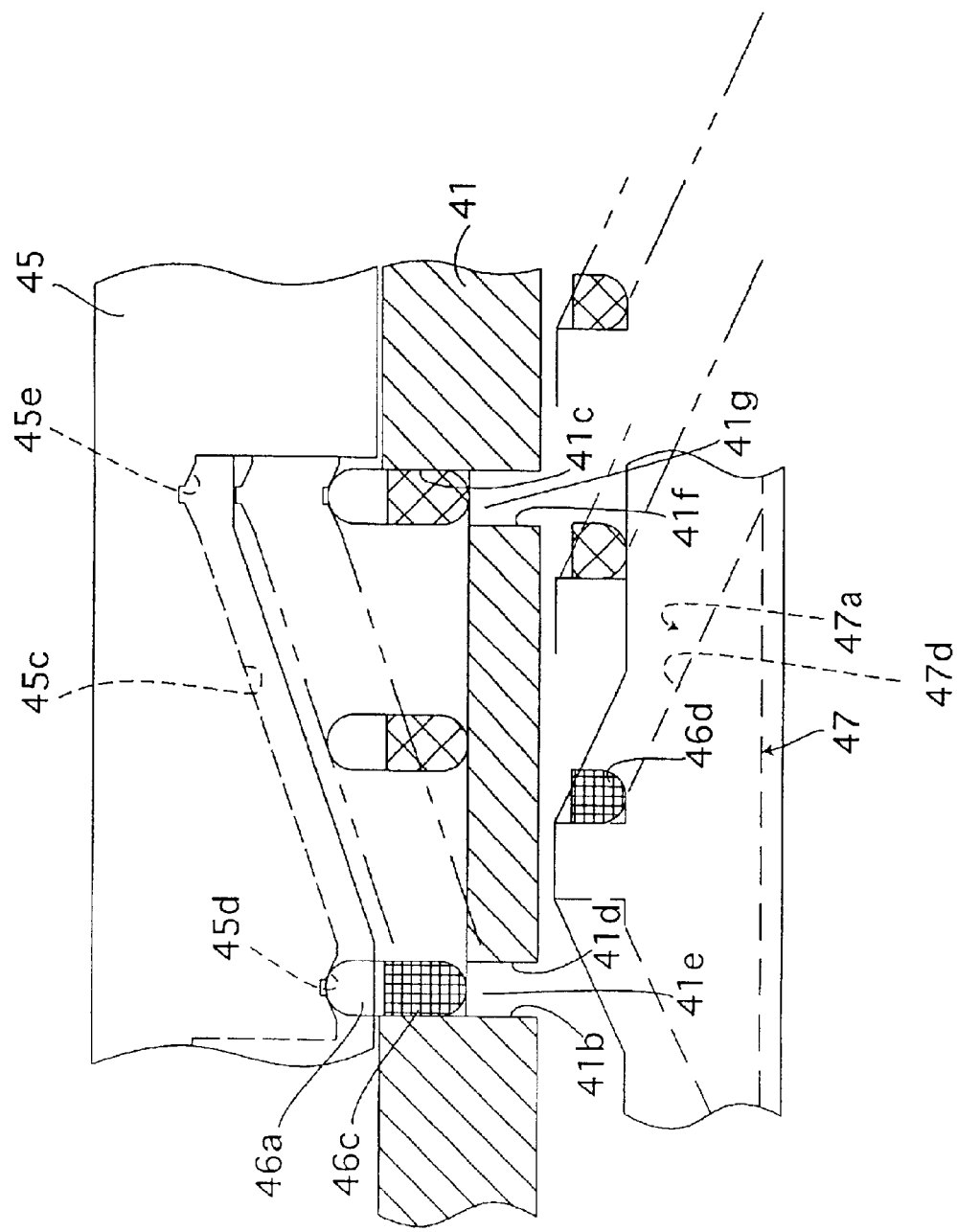
FIG. 22 is an enlarged developed view of a front sub-lens group frame, a rear sub-lens group frame and a drive ring, in connection with a front hold ring.

The front sub-lens group frame 45 has four shift leading surfaces (shift cam surfaces) 45c, which are formed circumferentially at equi-angular intervals on the end-face of the front sub-lens group frame 45, in order to move the front and rear sub-lens group frames to a mutually close position or a mutually distant position, in the optical axis direction. The shift leading surfaces 45c are provided at their opposed ends with follower engaging recesses 45d and 45e (FIG. 22). Note that only one shift leading surface 45c is shown in FIG. 22. The rear sub-lens group frame 46 is provided with four follower projections 46a corresponding to the shift leading surfaces 45c of the front sub-lens group frame 45. As shown in FIG. 20, the follower projections 46a are provided on the front end portions of inclined surfaces 46b, corresponding to the shift leading surfaces 45c of the front sub-lens group frame 45. The shift leading surfaces 45c formed on the front sub-lens group frame 45 and the follower projections 46a formed on the rear sub-lens group frame 46 constitute a shift cam mechanism for moving the front sub-lens group frame 45 and the rear sub-lens group frame 46 to a mutually close position or to a mutually distant position, in the optical axis direction.

The rear sub-lens group frame 46 is also provided with a pair of linear guide projections 46c which are located at the same circumferential positions as two of the four follower projections 46a that are diametrically opposed, and are provided behind the two follower projections 46a in the axial direction. Furthermore, three driven projections 46d are provided on the outer peripheral surface of the rear sub-lens group frame 46 and are spaced at equi-angular intervals in the circumferential direction and behind the linear guide projections 46c in the axial direction.

The front support ring 41 is provided on the inner peripheral surface thereof with a pair of rotation preventing surfaces 41b and 41c (see FIG. 22) which correspond to the linear guide projections 46c of the rear sub-lens group frame 46 and restrict the angular displacement of the rear sub-lens group frame 46 with respect to the front support ring 41, which does no rotate. Namely, the rotation preventing surfaces 41b and 41c engage with the linear guide projections 46c to prevent further rotation of the rear sub-lens group frame 46 at the rotational movement extremities thereof when the rear sub-lens group frame 46 is rotated in the forward and reverse directions. Moreover, the rotation preventing surface 41b and the guide surface 41d opposed thereto constitute a wide-angle linear guide groove 41e, and the rotation preventing surface 41c and the guide surface 41f opposed thereto constitute a telephoto linear guide groove 41g. The linear guide projections 46c are substantially snugly engaged in the guide grooves 41e and 41g at the wide-angle and telephoto extremities, respectively.

Figure 23:
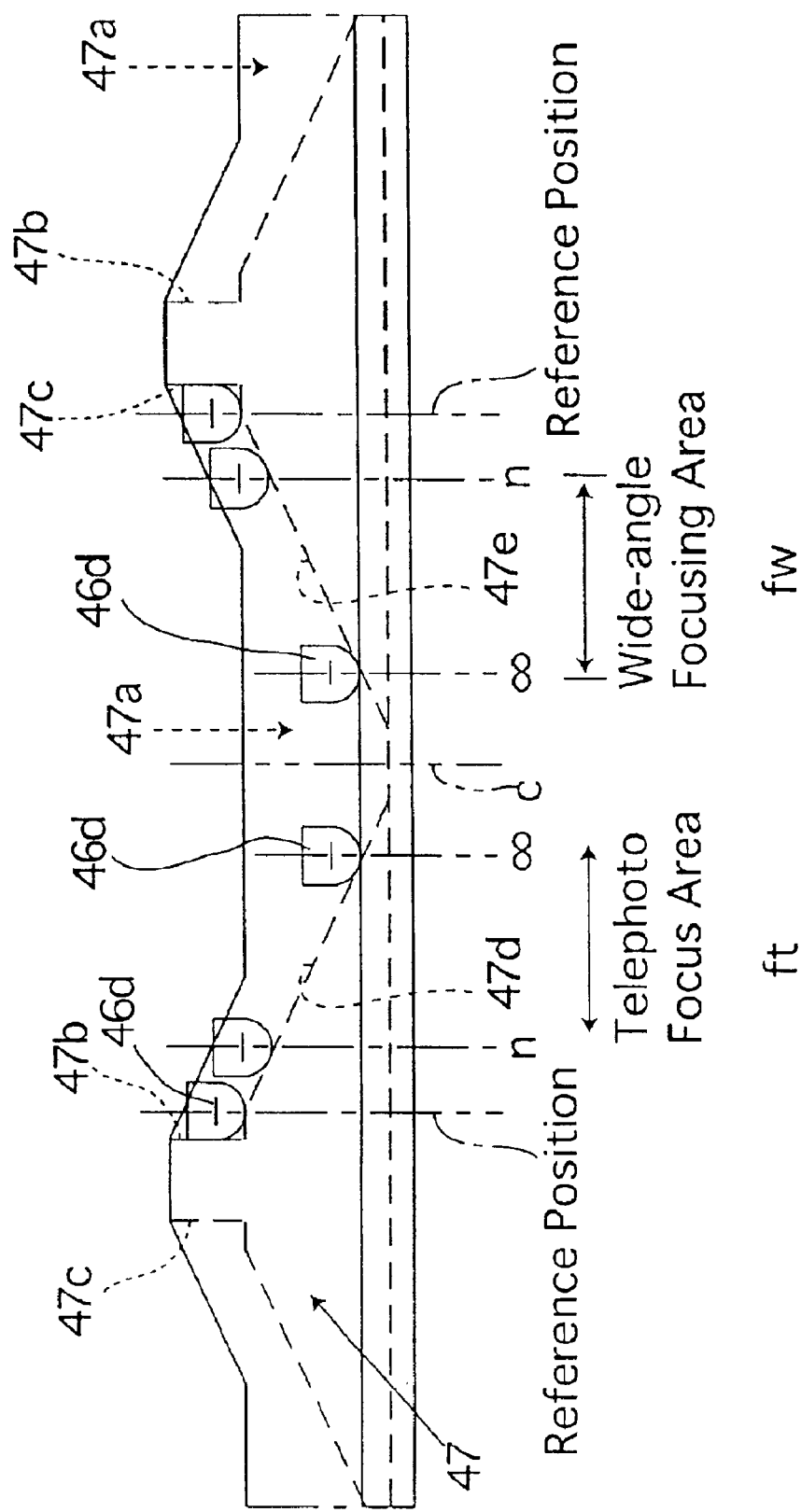
FIG. 23 is an explanatory view showing a focusing operation using a drive ring.

The drive ring 47 has three control recesses 47a (FIGS. 18 and 22) at the front end surface thereof, corresponding to the three driven projections 46d of the rear sub-lens group frame 46. Note that only one or two control recesses 47a are shown in the drawings. As shown in FIG. 23, the control recesses 47a are symmetrical in the lateral direction with respect to a center line 'c' parallel with the optical axis, and each include a pair of effective surfaces 47b and 47c which engage with the driven projection 46d, and telephoto and wide-angle focus leading surfaces (focus cam surfaces) 47d and 47e which abut against the arc end-surface of the driven projection 46d. The telephoto focus leading surface 47d and the wide-angle focus leading surface 47e are defined by end cam surfaces having open ends between the effective surfaces 47b and 47c. The focus leading surfaces 47d and 47e are inclined with respect to the circumferential direction in opposite directions and at an equal inclination angle. The focus leading surfaces 47d and 47e of the drive ring 47 and the driven projections 46d formed on the rear sub-lens group frame 46 constitute a focus cam mechanism.

Figure 24:
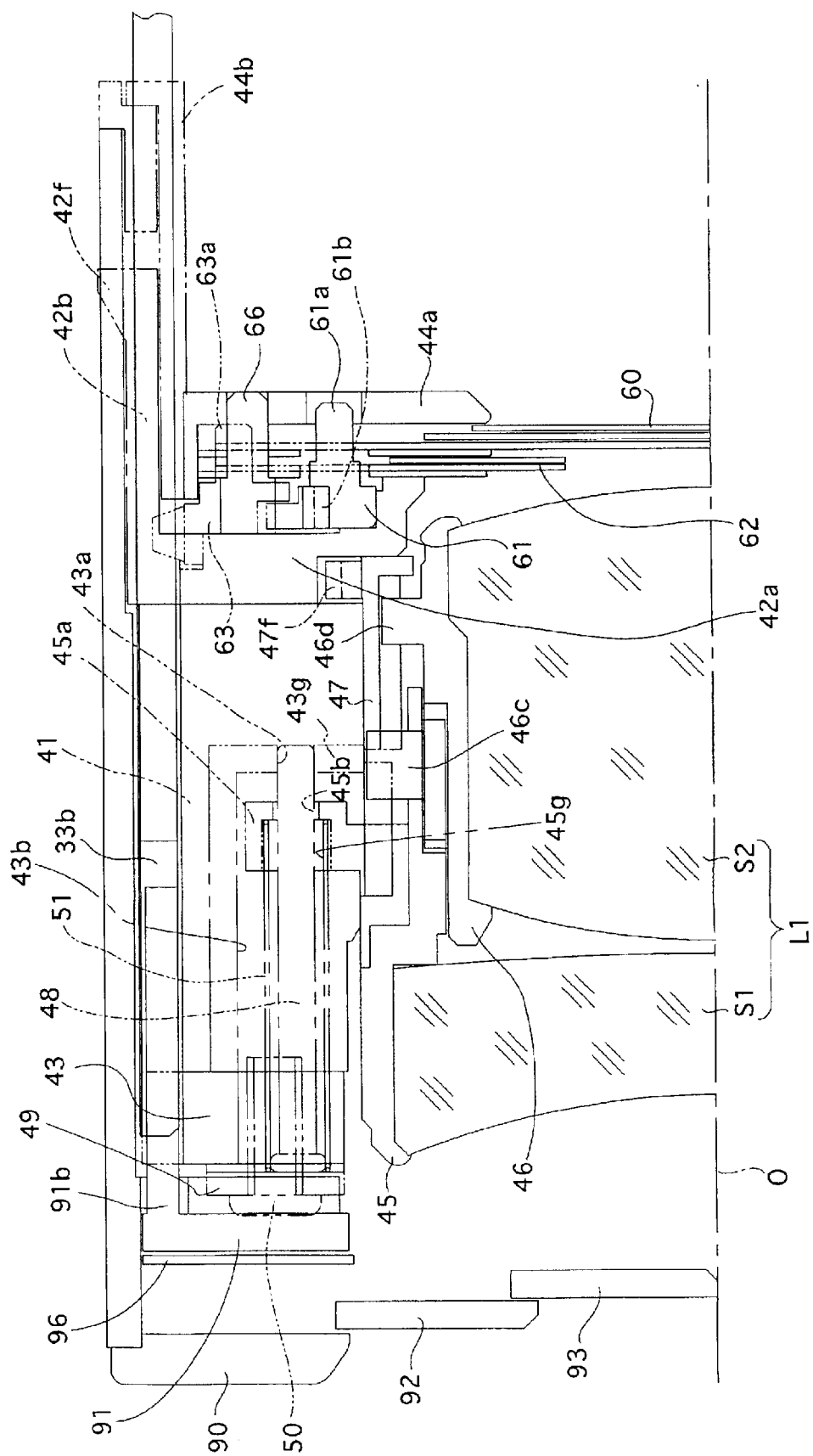
FIG. 24 is an enlarged sectional view of an upper half of a lens-shutter unit and the surrounding components thereof when a lens barrier thereof is closed.
Figure 25:
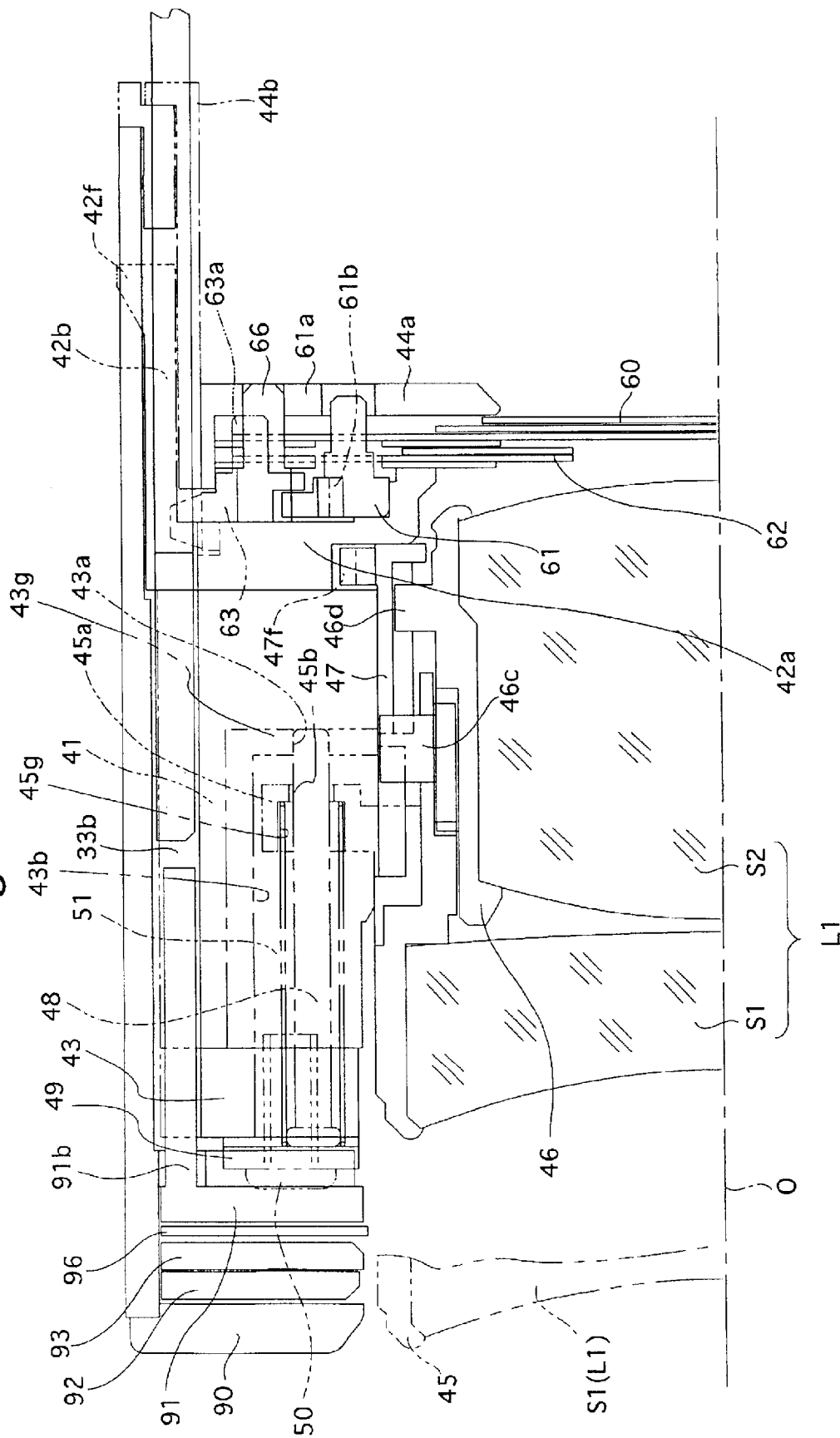
FIG. 25 is a sectional view similar to FIG. 24, when a lens barrier is open.

The compression coil springs 51, which bias the front sub-lens group frame 45 rearwardly, cause the shift leading surfaces 45c of the front sub-lens group frame 45 to be always in contact with the follower projections 46a of the rear sub-lens group frame 46, and cause the driven projections 46d of the rear sub-lens group frame 46 to be always in contact with the telephoto or wide-angle focus leading surfaces 47d and 47e. The drive ring 47 abuts at the rear end surface thereof against the receiving surface 42s of the rear support ring 42, as mentioned above. The contact relationship of the front sub-lens group frame 45, the rear sub-lens group frame 46, the drive ring 47, and the rear support ring 42 (receiving surface 42s) is maintained by the spring force of the compression coil springs 51. In contacting state, as shown in FIGS. 24 and 25, the front end of the rear sub-lens group frame 46 is inserted inside the inner peripheral surface of the front sub-lens group frame 45, and the drive ring 47 is fitted on the outer peripheral surface of the rear sub-lens group frame 46.

At the mutually distant position at the wide-angle side of the first sub-lens group S1 and the second sub-lens group S2, the effective surfaces 47b of the drive ring 47 abut against the driven projections 46d, and the linear guide projections 46c are disengaged from the wide-angle linear guide grooves 41e. In this state, if the drive ring 47 is moved in the right hand direction with respect to FIG. 22 (rotated in the clockwise direction), the effective surfaces 47b press against the driven projections 46d and rotate the rear sub-lens group frame 46 in the same direction, so that the linear guide projections 46c abut against the rotation preventing surfaces 41c. During this movement, the front sub-lens group frame 45 (first sub-lens group S1) comes close to the rear sub-lens group frame 46 (second sub-lens group S2) in accordance with the engagement of the shift leading surfaces 45c and the follower projections 46a of the rear sub-lens group frame 46 and, consequently, the follower projections 46a are stably engaged in the follower engaging recesses 45e.

Thus, the switching from the mutually distant position at the wide-angle side to the mutually close position at the telephoto side is completed. Consequently, the first sub-lens group S1 is close to the second sub-lens group S2 (mutually close extremity, i.e., at a mutually close position for a long focal length), and no further rotation of the drive ring 47 in the same direction is permitted.

When the switching to the mutually close position at the telephoto side is completed, the drive ring 47 is rotated in the reverse direction. Consequently, the driven projections 46d (rear sub-lens group frame 46) are moved rearwardly in accordance with the telephoto focus leading surfaces 47d and, hence, the linear guide projections 46c are engaged in the telephoto linear guide grooves 41g, so that the linear guide projections 46c are linearly movable only in the axial direction. The focusing operation on the telephoto side, from an intermediate focal length to the long focal length extremity (telephoto extremity), is carried out by the integral movement of the rear sub-lens group frame 46 and the front sub-lens group frame 45 at the mutually close extremity via the telephoto focus leading surfaces 47d. Namely, as shown in FIG. 23, when the drive ring 47 is rotated within the telephoto focus area ft (from the infinite object distance ∞ to the shortest object distance n) in a state that the driven projections 46d of the rear sub-lens group frame 46 abut against the telephoto focus leading surfaces 47d, the rear sub-lens group frame 46 whose rotation is restricted by the engagement of the telephoto linear guide grooves 41g, the linear guide projections 46c, and the front sub-lens group frame 45 whose rotation is restricted by the engagement of the linear guide rods 48 in the guide holes 45b (i.e., the first sub-lens group S1 and the second sub-lens group S2) are integrally moved together in the optical axis direction to carry out the focusing operation.

When the drive ring 47 is rotated until the effective surfaces 47c come into contact with the driven projections 46d, the linear guide projections 46c of the rear sub-lens group frame 46 are disengaged from the telephoto linear guide grooves 41g. In this state, when the drive ring 47 is moved in the left hand direction in FIG. 22 (rotated in the counterclockwise direction), the effective surfaces 47c press against the driven projections 46d to thereby rotate the rear sub-lens group frame 46 in the same direction. Consequently, the linear guide projections 46c abut against the rotation preventing surfaces 41b. During this movement, the front sub-lens group frame 45 comes close to the rear sub-lens group frame 46 in accordance with the engagement of the shift leading surfaces 45c and the follower projections 46a of the rear sub-lens group frame 46, and the follower projections 46a become stably engaged in the follower engaging recesses 45d. Thus, the switching from the mutually close position at the telephoto side to the mutually distant position at the wide-angle side is completed, so that the first sub-lens group S1 moves away from the second sub-lens group S2 (mutually distant extremity, i.e., the mutually distant position for a long focal length), and no further rotation of the drive ring 47 in the same direction is permitted.

When the switching to the mutually distant position at the wide-angle side is completed, the drive ring 47 is rotated in the reverse direction. Consequently, the driven projections 46d (rear sub-lens group frame 46) are moved rearwardly in accordance with the wide-angle linear guide grooves 41e, and accordingly, the linear guide projections 46c are engaged in the wide-angle linear guide grooves 41e and is linearly movable only in the optical axis direction. The focusing operation on the wide-angle side, from an intermediate focal length to the short focal length extremity, is carried out by the integral movement of the rear sub-lens group frame 46 and the front sub-lens group frame 45 at the mutually distant extremity by the wide-angle linear guide grooves 41e. Namely, as shown in FIG. 23, when the drive ring 47 is rotated within the wide-angle focus area fw (from the infinite object distance ∞ to the shortest object distance n) in a state that the driven projections 46d abut against the wide-angle focus leading surface 47e, the rear sub-lens group frame 46 whose rotation is restricted by the engagement of the wide-angle linear guide grooves 41e and the linear guide projections 46c, and the front sub-lens group frame 45 whose rotation is restricted by the engagement of the linear guide rods 48 in the guide holes 45b (i.e., the first sub-lens group S1 and the second sub-lens group S2) are moved together in the optical axis direction to carry out the focusing operation.

When the drive ring 47 is rotated until the effective surfaces 47b abut against the driven projections 46d, the linear guide projections 46c of the rear sub-lens group frame 46 are disengaged from the wide-angle linear guide grooves 41e and are returned to the initial state.

As mentioned above, in the front unit 40A of the lens-shutter unit 40, the shifting operation for moving the first sub-lens group S1 and the second sub-lens group S2 to the mutually distant position for a short focal length, or to the mutually close position for a long focal length, and the focusing operation in which the first variable power lens group L1 is entirely moved in the optical axis direction, can be carried out by controlling the rotation of the drive ring 47. The focusing operations on the telephoto side and the wide-angle side are carried out by controlling the number of pulses counted by a pulser (encoder) of the driving system which drives the drive ring 47, with reference to the position (the position in which the direction of the rotation of the drive ring 47 is reversed) in which the linear guide projections 46c of the rear sub-lens group frame 46 abut against the rotation preventing surfaces 41b or 41c. For instance, the number of the pulses to move the focusing lens group (i.e., the first variable power lens group L1 including the first sub-lens group S1 and the second sub-lens group S2) to the shortest object distance n, the infinite object distance ∞, or an object distance therebetween, from the reference position can be predetermined taking into account the lead angles of the telephoto and wide-angle focus leading surfaces 47d and 47e. Therefore, focusing can be carried out based on the object distance data by controlling the number of pulses.

The drive ring 47 is provided, on the entire outer peripheral surface of the rear end thereof, with a gear 47f which is in mesh with a terminal gear 52a (FIG. 18) of a reduction gear train 52, so that the gear 47f can be rotated in the forward or reverse direction by a reversible drive motor 53 rotating in the forward and reverse directions (see FIGS. 13 and 18).

A pinion 53a of the reversible drive motor 53 is located on the front side of the front support ring 41 and a gear 47f of the drive ring 47 is located between the front support ring 41 and the rear support ring 42, i.e., on the rear side of the front support ring 41. Consequently, the reduction gear train 52, shown in FIG. 13, which transmits the motor drive force from the pinion 53a to the gear 47f, is held between the front support ring 41 and the gear retainer ring 43 in such a way that the gears are arranged along the outer peripheral surface of the front support ring 41. Moreover, a rotating slit disc 54, which constitutes the pulser to detect the amount of rotation of the reversible drive motor 53, is provided in the vicinity of the pinion 53a of the reversible drive motor 53. A relay gear 55 is provided between the rotating slit disc 54 and the pinion 53a.

The reversible drive motor 53 is held in a motor holding recess 41h of the front support ring 41. The rotating slit disc 54 is held in the slit disc holding recess 41i of the front support ring 41 (shown best in FIG. 17). The front support ring 41 is provided with an interrupter holding recess 41j communicatively connected to the slit disc holding recess 41i. A photo-interrupter 56 for detecting a drive amount of the reversible drive motor 53 for the switching operation of the sub-lens groups and for the focusing operation, is received in the interrupter holding recess 41j (see FIG. 17). The rotating slit disc 54 is arranged in the photo-interrupter 56 (between two components of the photo-interrupter), so that the rotation angle (amount of angular displacement) of the slit disc 54 can be detected by counting the number of pulses. In other words, the drive amount of the reversible drive motor 53 can be detected.

Figure 14:
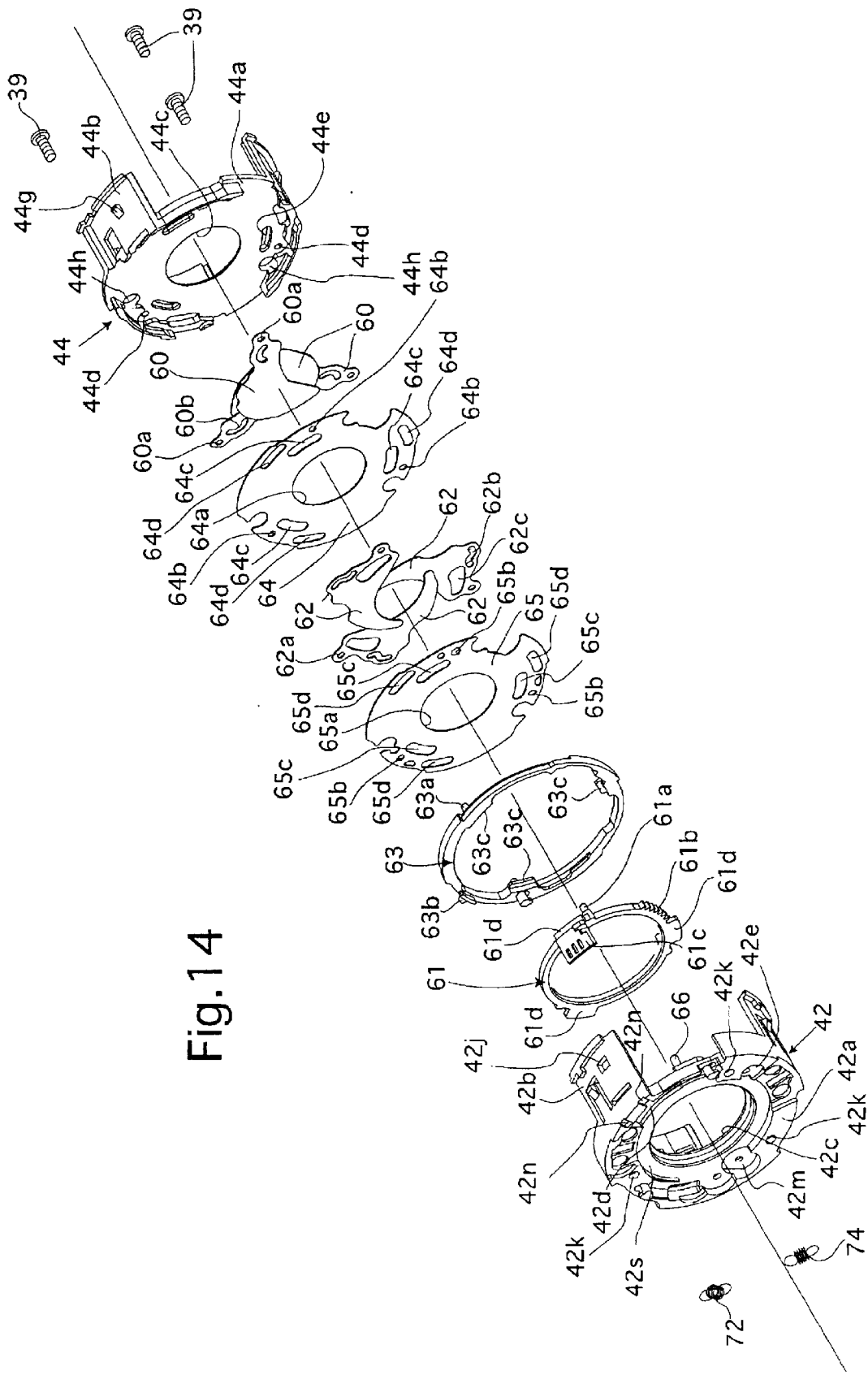
FIG. 14 is an exploded perspective view of a rear unit of a lens-shutter unit.

The rear unit 40B will be explained below. A lens shutter and a diaphragm mechanism are provided between the rear support ring 42 and the sector retainer ring 44. As shown in FIGS. 13 and 14, the rear support ring 42 and the sector retainer ring 44 are provided with front wall portions 42a and 44a in the form of circular discs extending in orthogonal planes, with respect to the optical axis, and three rear arms 42b and 44b extending rearwardly in the optical axis direction from the front wall portions 42a and 44a, respectively. The lens shutter and the diaphragm mechanism are held between the front wall portions 42a and 44a. The rear arms 42b and 44b are overlapped in the radial direction of the lens barrel (see FIG. 15).

The lens shutter has three shutter sectors 60 and a shutter drive ring 61 which opens and closes the shutter sectors 60. The diaphragm mechanism has three diaphragm sectors 62 and a diaphragm drive ring 63 which opens and closes the diaphragm sectors 62. A separation plate 64 is arranged between the shutter sectors 60 and the diaphragm sectors 62, and a separation plate 65 is arranged between the diaphragm sectors 62 and the diaphragm drive ring 63. The separation plate 64 prevents interference between the movable shutter sectors 60 and the movable diaphragm sectors 62, and the separation plate 65 prevents interference of the diaphragm sectors 62 with the rotatable shutter drive ring 61 and the rotatable diaphragm drive ring 63. The sector retainer ring 44, the separation plate 64 and the separation plate 65 are provided with photographing circular openings 44c, 64a and 65a, respectively, which have substantially in the same diameter about the optical axis O. The rear support ring 42 is provided with a center opening 42c whose diameter is greater than the diameter of the photographing circular openings 44c, 64a and 65a.

The shutter sectors 60 and diaphragm sectors 62 which are each made of three blades are rotatably supported by projecting pivots (support pivots) 66 (only one of which is shown in FIGS. 13 and 14) which extend rearward from the front wall portion 42a of the rear support ring 42. The projecting pivots 66 extend through support holes 60a and 62a formed in the shutter sectors 60 and the diaphragm sectors 62. Projecting pivot securing holes 44d (see FIG. 14), in which the front ends of the projecting pivots 66 are received, are formed in the front wall portions 44a of the sector retainer ring 44.

The shutter drive ring 61 is provided with three rotation transmission dowels 61a which are engaged in rotational guide cam slots 60b formed in the shutter sectors 60. The three shutter sectors 60 are rotated about the projecting pivots 66 in accordance with the relationship between the rotational guide cam slots 60b and the rotation transmission dowels 61a when the shutter drive ring 61 is reciprocally rotated, so that the front portion of the photographing circular opening 44c is opened and closed. The aperture of the shutter sectors 60 can be controlled by the angular displacement of the shutter drive ring 61. The sector retainer ring 44 is provided with dowel receiving slots 44e in which the front ends of the rotation transmission dowels 61a are inserted. The shutter drive ring 61 is biased in the closing direction by a shutter drive ring biasing spring 74, so that play (in the shutter drive ring 61) can be removed by the shutter drive ring biasing spring 74.

Similar to the shutter drive ring 61, the diaphragm drive ring 63 is provided with three rotation transmission dowels 63a which are engaged in rotational guide cam slots 62b formed in the diaphragm sectors 62. The three diaphragm sectors 62 are rotated about the projecting pivots 66 in accordance with the relationship between the rotational guide cam slots 62b and the rotation transmission dowels 63a when the diaphragm drive ring 63 is reciprocally rotated, so that the front portion of the photographing circular opening 44c is opened and closed. The aperture of the diaphragm sectors 62 can be controlled by the angular displacement of the diaphragm drive ring 63. The diaphragm sectors 62 are provided with through-holes 62c to prevent interference with the rotation transmission dowels 61a of the shutter drive ring 61 regardless of the angular position of the diaphragm sectors 62. The front ends of the rotation transmission dowels 63a are in contact with, and held by, the front surface of the front wall portion 44a. The diaphragm drive ring 63 is biased by a diaphragm drive ring biasing spring 72 which is engaged at one end thereof with the diaphragm drive ring 63 and at the other end thereof with the rear support ring 42 in a direction to open the diaphragm sectors 62.

In the zoom lens barrel of the present invention, the shutter sectors 60 have a variable diaphragm function to determine a desired aperture value and a shutter function, and are electrically controlled so that the amount of opening (aperture value) and the opening time (shutter speed) of the shutter sectors 60 are varied in accordance with the exposure value when the shutter is released. The diaphragm sectors 62 are provided to restrict the maximum value of the aperture at a wide-angle object distance in particular, and the amount of opening thereof is varied in accordance with the feed amount of the zoom lens barrel as a whole.

The shutter drive ring 61 for opening and closing the shutter sectors 60 is provided on the outer peripheral surface thereof with a partial sector gear 61b which is in mesh with a reduction gear train 68 connected to a shutter drive motor 67 (see FIGS. 13 and 18). The shutter drive motor 67 is held in a motor holding recess 41k (see FIG. 17) of the front support ring 41, and a pinion 67a of the shutter drive motor 67 is located in front of the front support ring 41. The reduction gear train 68 transmits the drive force of the motor to the rear side of the front support ring 41, and has a terminal gear 68a distant from the pinion 67a of the shutter drive motor 67 exposed to the rear portion of the front support ring 41 (front unit 40A), as shown in FIG. 18. The front wall portion 42a of the rear support ring 42 is provided with a through-hole 42e in which the terminal gear 68a of the reduction gear train 68 is inserted so as to engage with the sector gear 61b.

When the shutter drive motor 67 is rotated in the forward or reverse direction, the shutter drive ring 61 is rotated in the same direction, so that the shutter sectors 60, which are in a closed position, are instantaneously opened and closed. As mentioned above, the amount of opening, and the opening time of the shutter sectors 60 are variable and are controlled in accordance with the drive signal (electric current) supplied to the shutter drive motor 67. Namely, if the rotation angle of the shutter drive ring 61 driven by the shutter drive motor 67 is increased, the amount of opening of the shutter sectors 60 is increased and the aperture value is reduced (approaches a fully open diaphragm position). If the rotation angle of the shutter drive ring 61 is decreased, the amount of opening of the shutter sectors 60 is decreased and the aperture value is increased (diaphragm closes). Moreover, if the time interval between the forward rotation and the reverse rotation of the shutter drive ring 61 driven by the shutter drive motor 67 is shortened, the opening time of the shutter sectors 60 is shortened, so that the shutter speed is increased. Conversely, if the time interval between the forward rotation and the reverse rotation is lengthened, the opening time of the shutter sectors 60 is prolonged, thus resulting in a slower shutter speed.

The shutter drive ring 61 has a slit plate 61c which is in the form of a small portion of a cylinder and protrudes forward in the optical axis direction. The slit plate 61c extends through an arc opening 42d (see FIG. 14), formed in the front wall portion 42a of the rear support ring 42, and an arc opening 41m (see FIG. 17) formed in the rear surface of the front support ring 41. The slit plate 61c is located in a photo-interrupter 69 (between two components of the photo-interrupter 69) shown in FIG. 17, so that the passing of slits of the slit plate 61c can be detected by the photo-interrupter 69 in order to detect the shutter operation. Namely, the opening and closing of the shutter sectors 60 can be detected by the operation of the shutter drive ring 61 via the slit plate 61c and the photo-interrupter 69.

The front support ring 41 is provided with an interrupter holding recess 41n (see FIG. 17) for receiving the photo-interrupter 69. The interrupter holding recess 41n is located adjacent to the interrupter holding recess 41j for receiving the photo-interrupter 56 for detecting the switching and focusing drive amount. The recesses 41n and 41j are covered by a common cover 70 in the form of a leaf spring. The two photo-interrupters 56 and 69 are held by the leaf spring cover 70.

As can be understood from the foregoing, in the zoom lens barrel of the present embodiment, the exposure is controlled by the shutter sectors 60. The purpose of the diaphragm sectors 62 is to restrict the size of the aperture so that the peripheral portion of the zoom lens system is not used for photographing at the short focal length.

Figure 11:
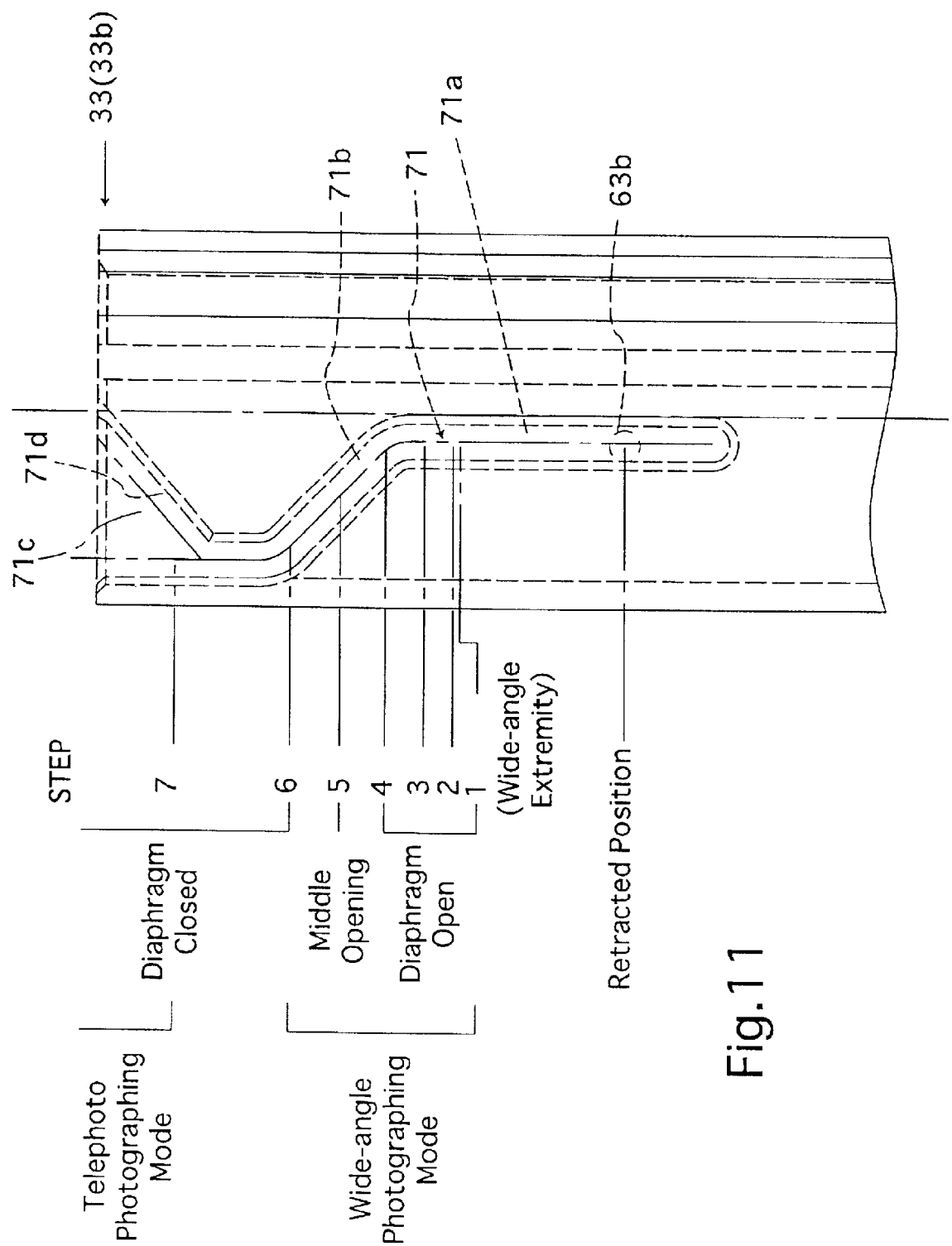
FIG. 11 is a developed view of a third linear guide ring, showing a diaphragm control cam groove thereof.

The diaphragm drive ring 63, for opening and closing the diaphragm sectors 62, is provided on the outer peripheral surface thereof with a driven projection 63b which is engaged in a diaphragm control cam groove 71 (see FIG. 10) formed in the inner peripheral surface of the arm 33b of the third linear guide ring 33. Upon zooming, the third linear guide ring 33 and the lens-shutter unit 40 (diaphragm drive ring 63) are relatively moved in the optical axis direction. Consequently, the driven projection 63b is moved in the circumferential direction in accordance with the diaphragm control cam groove 71 to rotate the diaphragm drive ring 63 to thereby vary the opening degree of the diaphragm sectors 62. As shown in FIG. 11, the diaphragm control cam groove 71 includes a linear restriction portion 71a extending parallel with the optical axis O, an oblique restriction portion 71b which is inclined with respect to the optical axis O, and a restriction releasing portion 71c which opens into the front end of the third linear guide ring 33. The width of the linear restriction portion 71a and the oblique restriction portion 71b is such that the driven projection 63b can be substantially snugly fitted therein.

Figure 2:
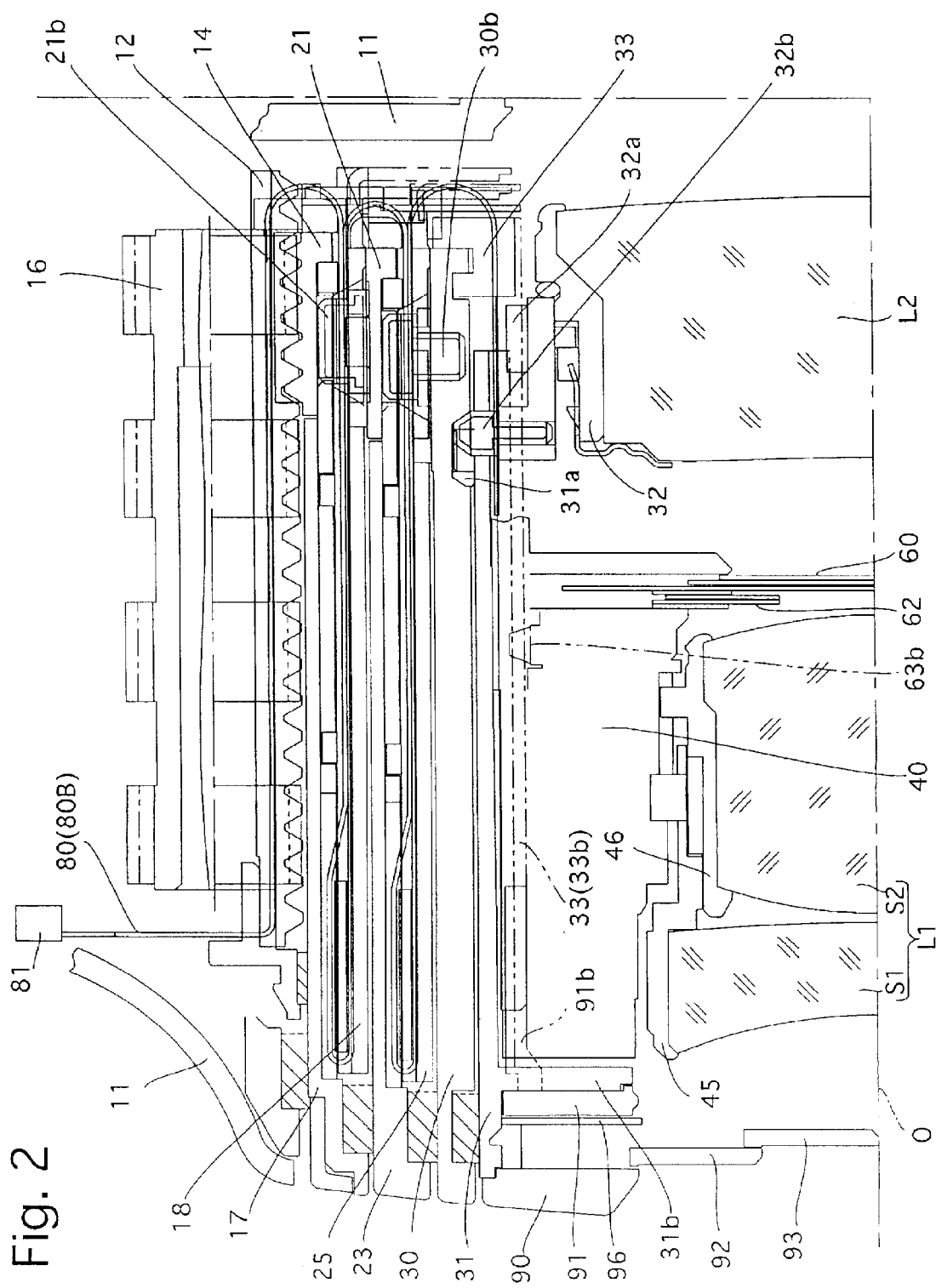
FIG. 2 is a sectional view of an upper half of the zoom lens barrel in a retracted position.
Figure 3:
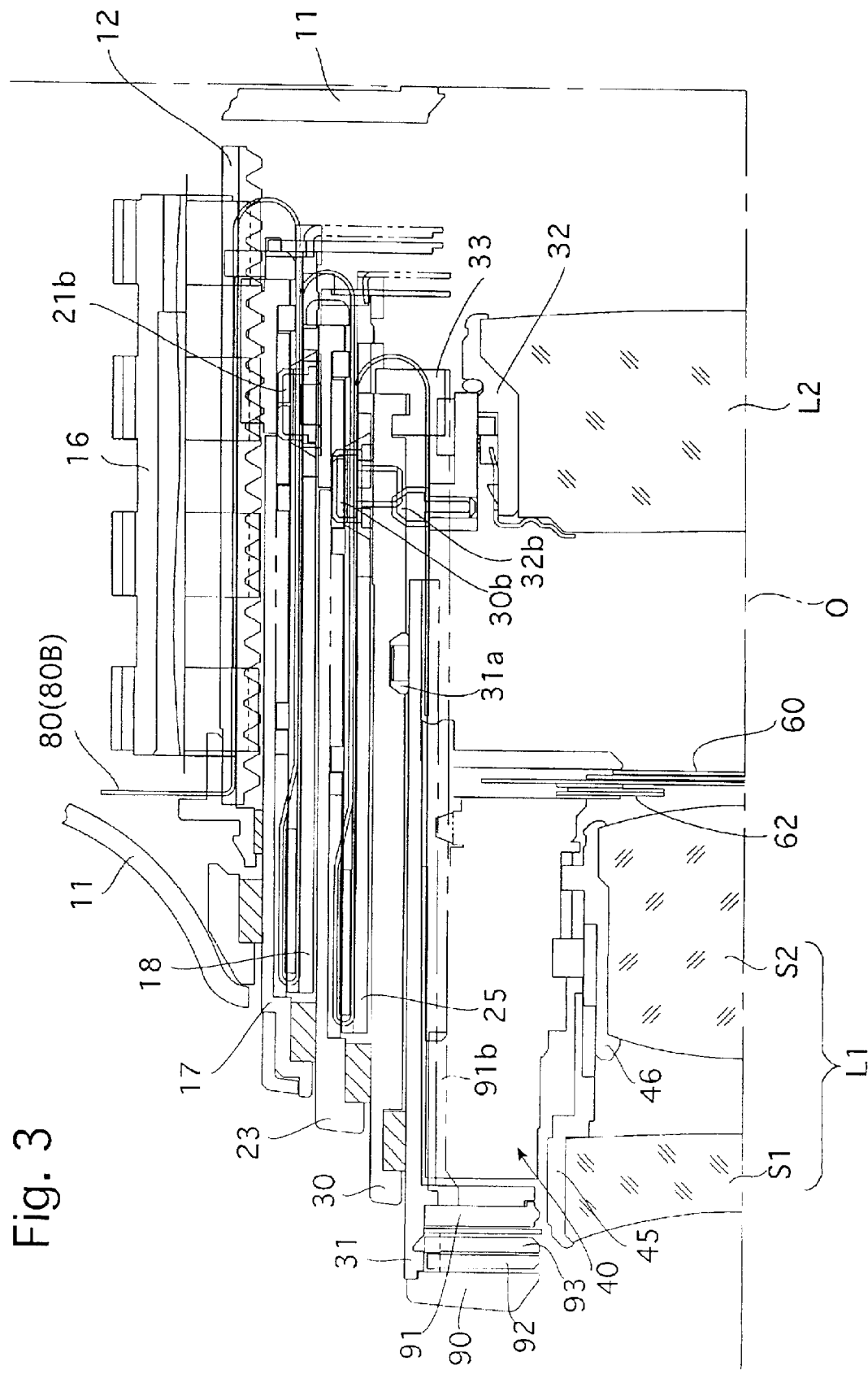
FIG. 3 is a sectional view of an upper half of the zoom lens barrel in a wide-angle position.

When the zoom lens barrel is in the retracted position (accommodated position) shown in FIG. 2, the driven projection 63b is located in the linear restriction portion 71a. When the zoom lens barrel is advanced to the wide-angle position, the driven projection 63b is still in the linear restriction portion 71a. When the driven projection 63b is in the linear restriction portion 71a, the driven projection 63b causes the aperture defined by the three diaphragm sectors 62 to be at a minimum aperture position. In the minimum aperture position, the diaphragm sectors 62 do not completely close the front portion of the photographing circular opening 44c but cover a predetermined width of the peripheral portion of the circular opening in the radial direction. Consequently, photographing is carried out at the wide-angle extremity without collecting unnecessary light.

When the zoom lens barrel is advanced toward the telephoto side and reaches the fourth focal length step from the wide-angle extremity, the driven projection 63b enters the oblique restriction portion 71b from the linear restriction portion 71a. The oblique restriction portion 71b is inclined so that the diaphragm drive ring 63 is rotated in the diaphragm opening direction as the driven projection 63b is moved toward the restriction releasing portion 71c. Therefore, when the lens barrel is advanced while the driven projection 63 in located in the oblique restriction portion 71b, the diaphragm drive ring 63 is rotated in the diaphragm opening direction to gradually open the diaphragm sectors 62. Specifically, a middle opening degree of the diaphragm sectors 62 is obtained at the fifth focal length step counting from the wide-angle extremity, and the diaphragm sectors 62 are fully opened at the sixth focal length step.

When further advancement of the zoom lens barrel takes place, the above-mentioned switching of the relative distance between the first sub-lens group S1 and the second sub-lens group S2 is carried between the sixth focal length step and the seventh focal length step, so that wide-angle photographing mode is transferred to the telephoto photographing mode. In the telephoto photographing mode, the driven projection 63b is located in the restriction releasing portion 71c. The restriction releasing portion 71c is shaped so as to give less restriction on the relative position of the driven projection 63b. When the driven projection 63b is in the restriction releasing portion 71c, the diaphragm drive ring 63 is held at an angle position to open the diaphragm sectors 62 by the diaphragm drive ring biasing spring 72. Therefore, in the telephoto photographing mode, a sufficient amount of light can be collected.

Conversely, when the zoom lens barrel is moved toward the wide-angle side from the telephoto side, the opening degree of the diaphragm sectors 62 is gradually reduced from the fifth focal length step counting from the wide-angle extremity. The diaphragm sectors 62 are closed in accordance with the relationship between the linear restriction portion 71a and the driven projection 63b, from the fourth focal length step to the wide-angle extremity (first focal length step). Note that the restriction releasing portion 71c has an inclined guide surface 71d which is adapted to smoothly guide the driven projection 63b to the oblique restriction portion 71b when the photographing mode is transferred from the telephoto photographing mode to the wide-angle photographing mode. The inclined guide surface 71d ensures that the driven projection 63b is moved into the oblique restriction portion 71b without interfering with the diaphragm control cam groove 71, even if the angular position of the diaphragm drive ring 63 which has been released at the telephoto photographing mode is slightly out of alignment.

In the rear unit 40B constructed as above, the rotatable shutter drive ring 61 and the rotatable diaphragm drive ring 63 are located substantially in the same position in the axial direction. The shutter drive ring 61 is supported on the inner diameter side of the diaphragm drive ring 63 (see FIG. 15). The diaphragm drive ring 63 is provided on the inner peripheral surface thereof with three inner diameter thrust projections 63c that are spaced in the circumferential direction at equi-angular intervals to rotatably support the shutter drive ring 61. The shutter drive ring 61 is provided on the outer peripheral surface thereof with three outer diameter thrust projections 61d that are spaced in the circumferential direction at equi-angular intervals to engage with the inner diameter thrust projections 63c. The diaphragm drive ring 63 is in contact with the rear surface of the front wall portion 42a of the rear support ring 42 and the rotation transmission dowels 63a are in contact with the front surface of the front wall portion 44a of the sector retainer ring 44, so that the diaphragm drive ring 63 is supported between the rear support ring 42 and the sector retainer ring 44 so as not relatively move in the optical axis direction. The driven projection 63b of the diaphragm drive ring 63 supported between the rear support ring 42 and the sector retainer ring 44 (between the front wall portion 42a and the front wall portion 44a) is located between a pair of rear arms 42b and 44b in the circumferential direction, so that the driven projection 63b can be engaged by the diaphragm control cam groove 71 of the third linear guide ring 33 (see FIG. 10). The shutter drive ring 61 is supported between the rear support ring 42 and the sector retainer ring 44, with the shutter drive ring 61 in contact with the rear surface of the front wall portion 42a and with the outer diameter thrust projections 61d being engaged with the inner diameter thrust projections 63c. The diaphragm drive ring 63 is shaped so that the sector gear 61b (see FIGS. 24 and 25) of the shutter drive ring 61, located inside the diaphragm drive ring 63, can engage with the reduction gear train 68.

Figure 16:
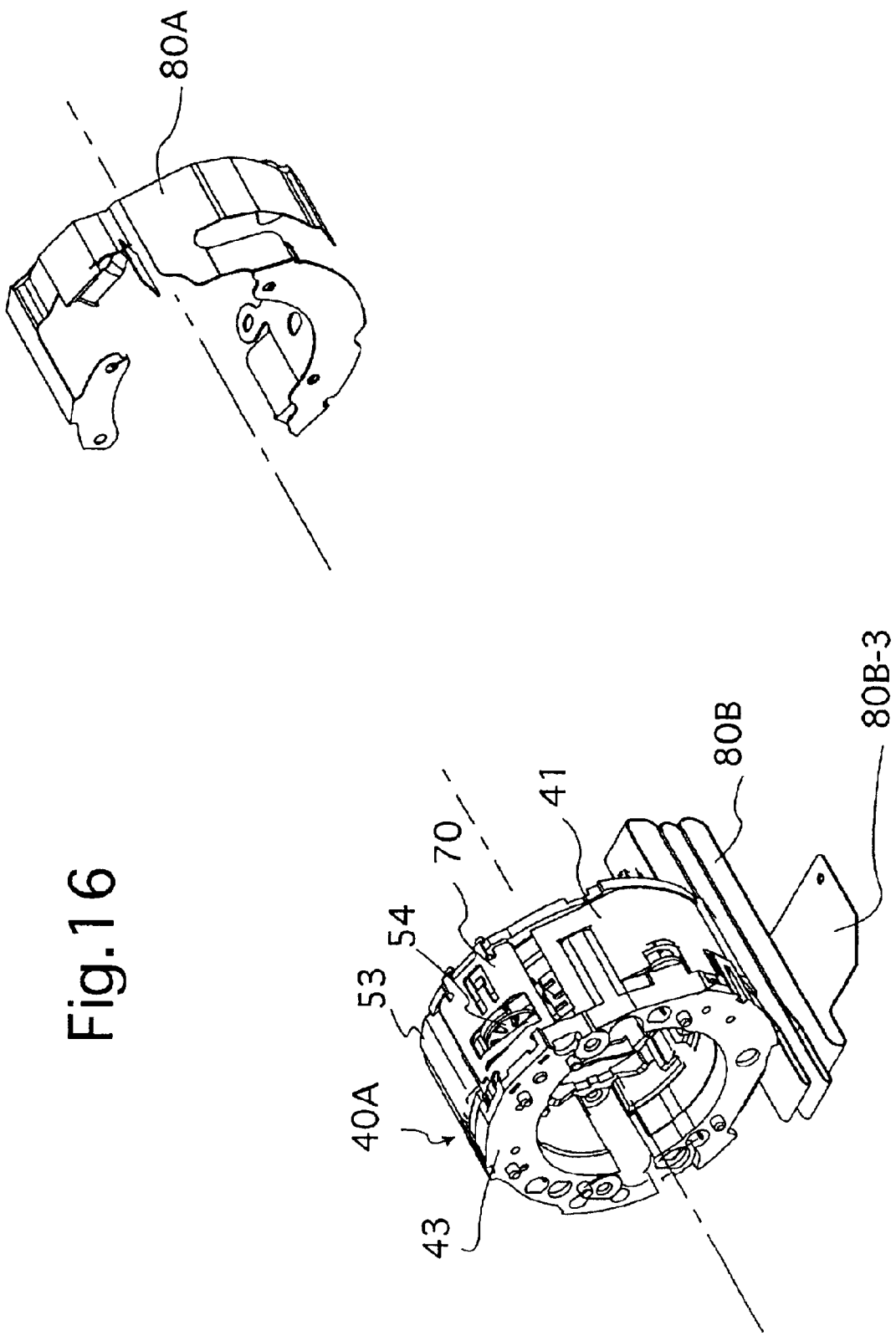
FIG. 16 is a perspective view of a front unit of a lens-shutter unit and a lens-shutter unit FPC (annular FPC)

As can be understood from the above discussion, the lens-shutter unit 40 includes the front unit 40A having the first variable power lens group L1 (first sub-lens group S1 and second sub-lens group S2) and the drive mechanism therefore, and the rear unit 40B having the lens shutter and the diaphragm mechanism. The front unit 40A includes the reversible drive motor 53 for driving the first variable power lens group L1, and the shutter drive motor 67 for opening and closing the shutter sectors 60. The front unit 40A is also provided with the photo-interrupter 56 which detects the shift movement of the first sub-lens group S1 and the second sub-lens group S2 and the movement of the entire first variable power lens group L1 during the focusing operation, and the photo-interrupter 69 which detects the opening and closing operation of the shutter sectors 60. The reversible drive motor 53, the shutter drive motor 67, and the photo-interrupters 56 and 69 are connected to a control circuit 81 (see FIG. 2) in the camera body 11 via a lens-shutter unit FPC (flexible printed circuit) 80. As shown in FIGS. 13 and 16, the lens-shutter unit FPC 80 is divided into an annular FPC 80A extending around the outer peripheral surface of the front unit 40A, and a foldable strip FPC 80B which is elongated in the optical axis direction. The annular FPC 80A is double-sided FPC having circuit patterns printed on upper and lower surfaces thereof. The foldable strip FPC 80B is a one-sided FPC having a circuit pattern printed on only one of upper and lower surfaces thereof.

Figure 4:
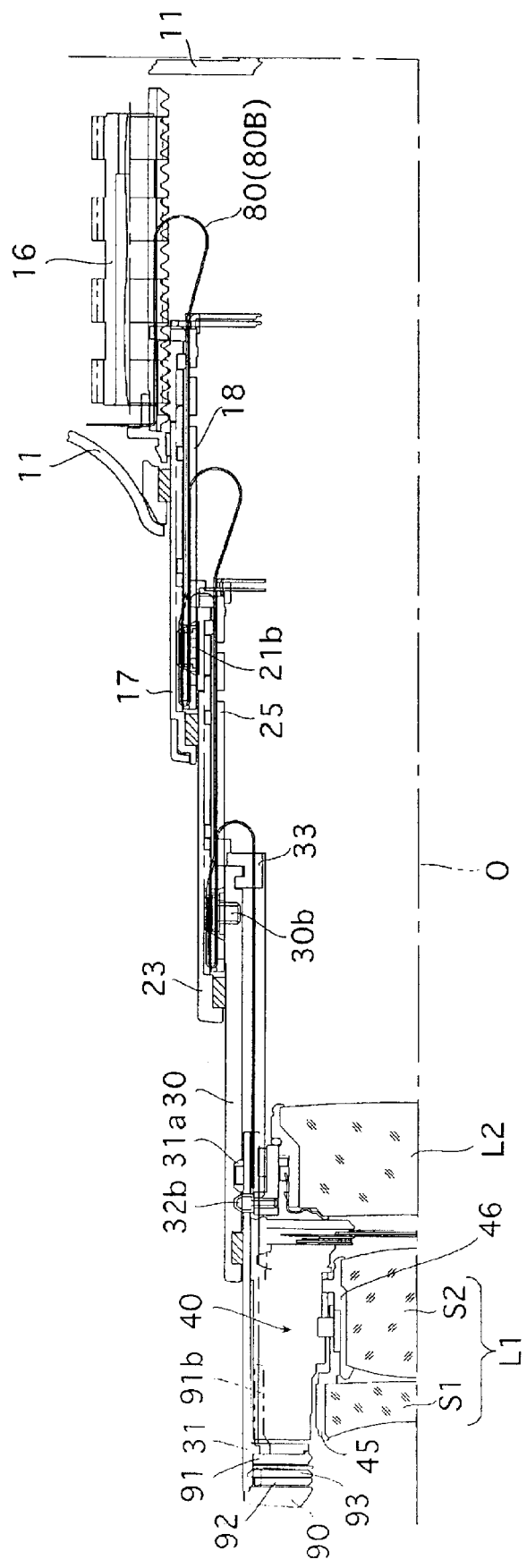
FIG. 4 is a sectional view of an upper half of the zoom lens barrel in a telephoto position.
Figure 5:
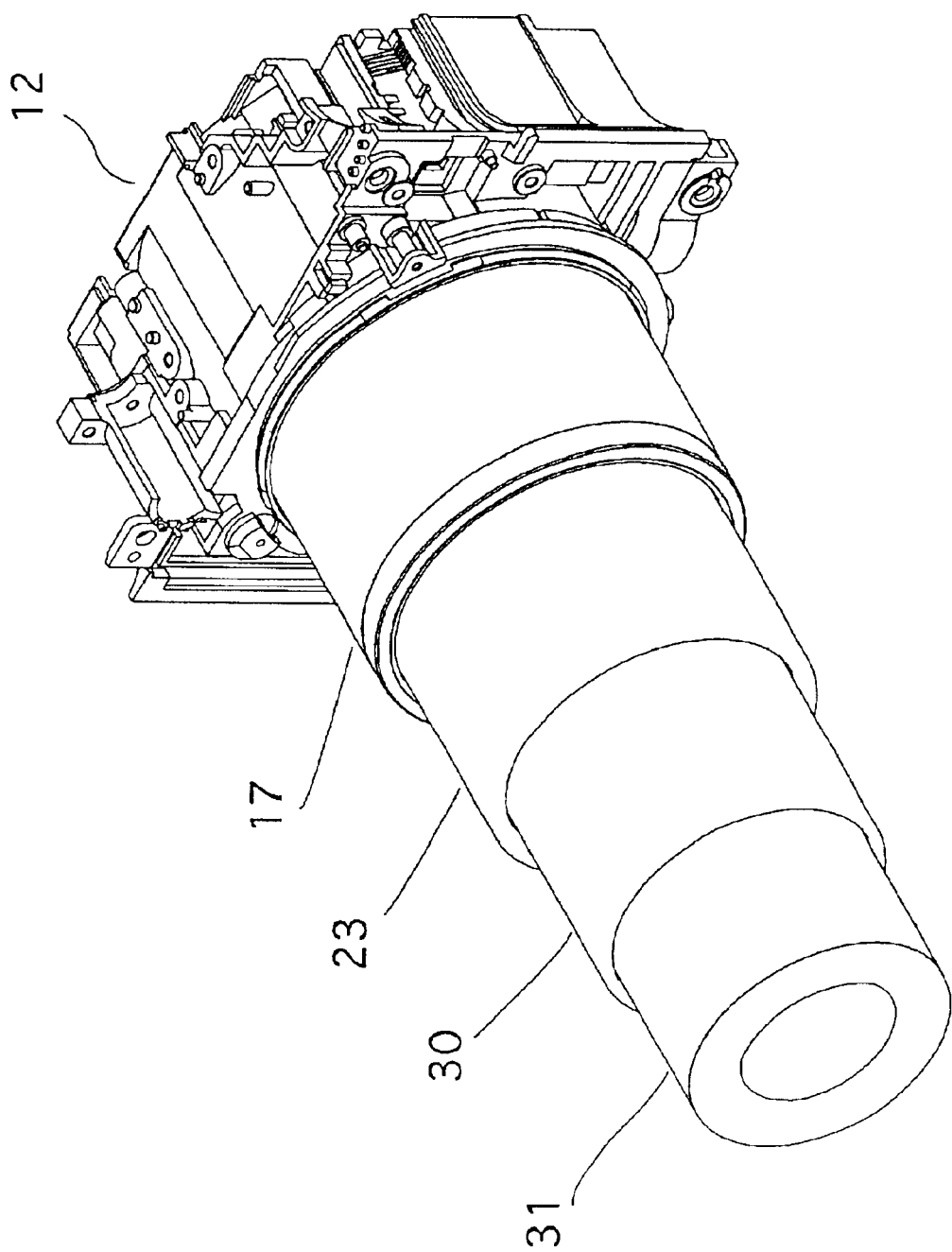
FIG. 5 is a perspective view of the zoom lens barrel in an advanced position.
Figure 6:
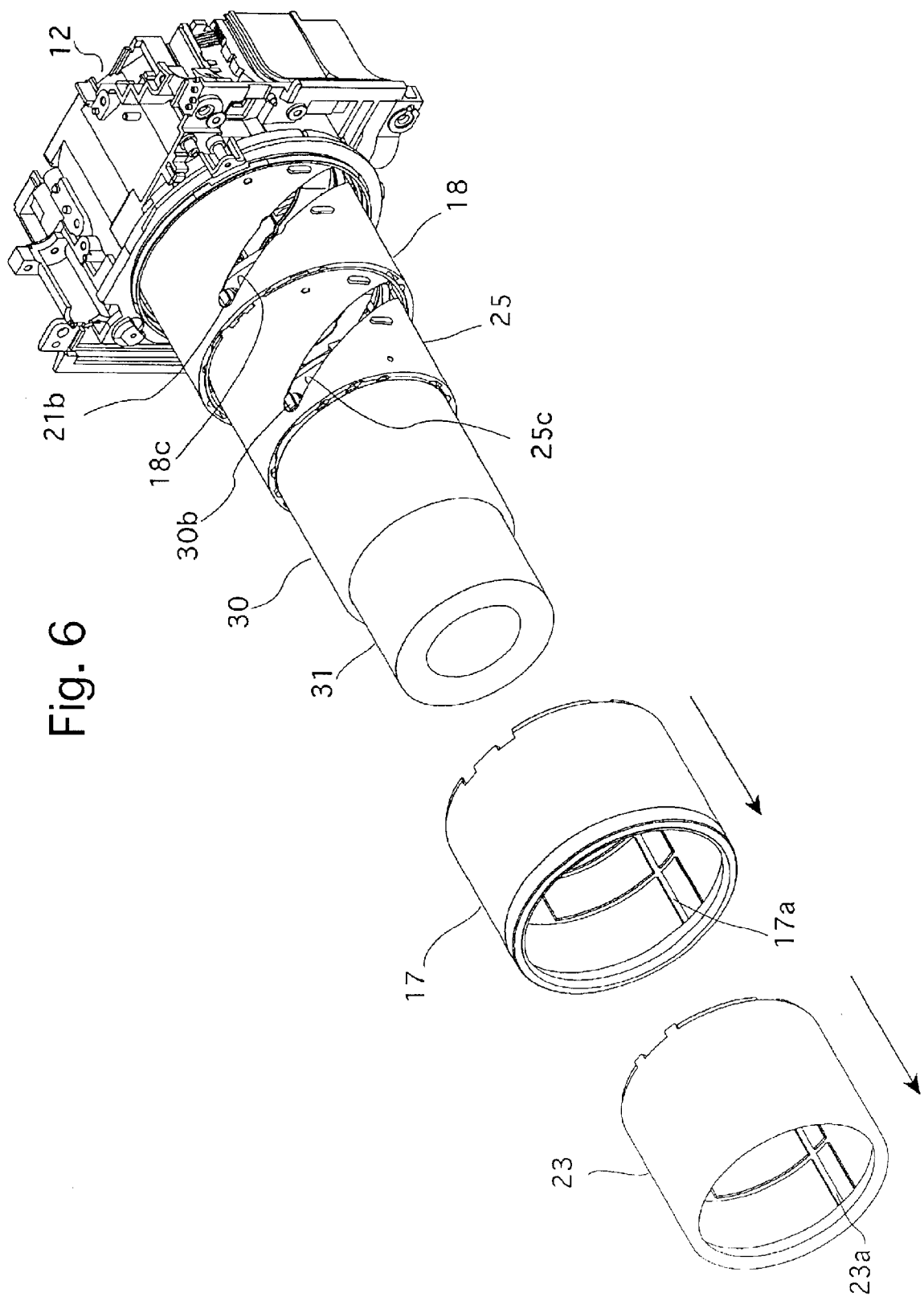
FIG. 6 is an exploded perspective view of the zoom lens barrel shown in FIG. 5.
Figure 7:
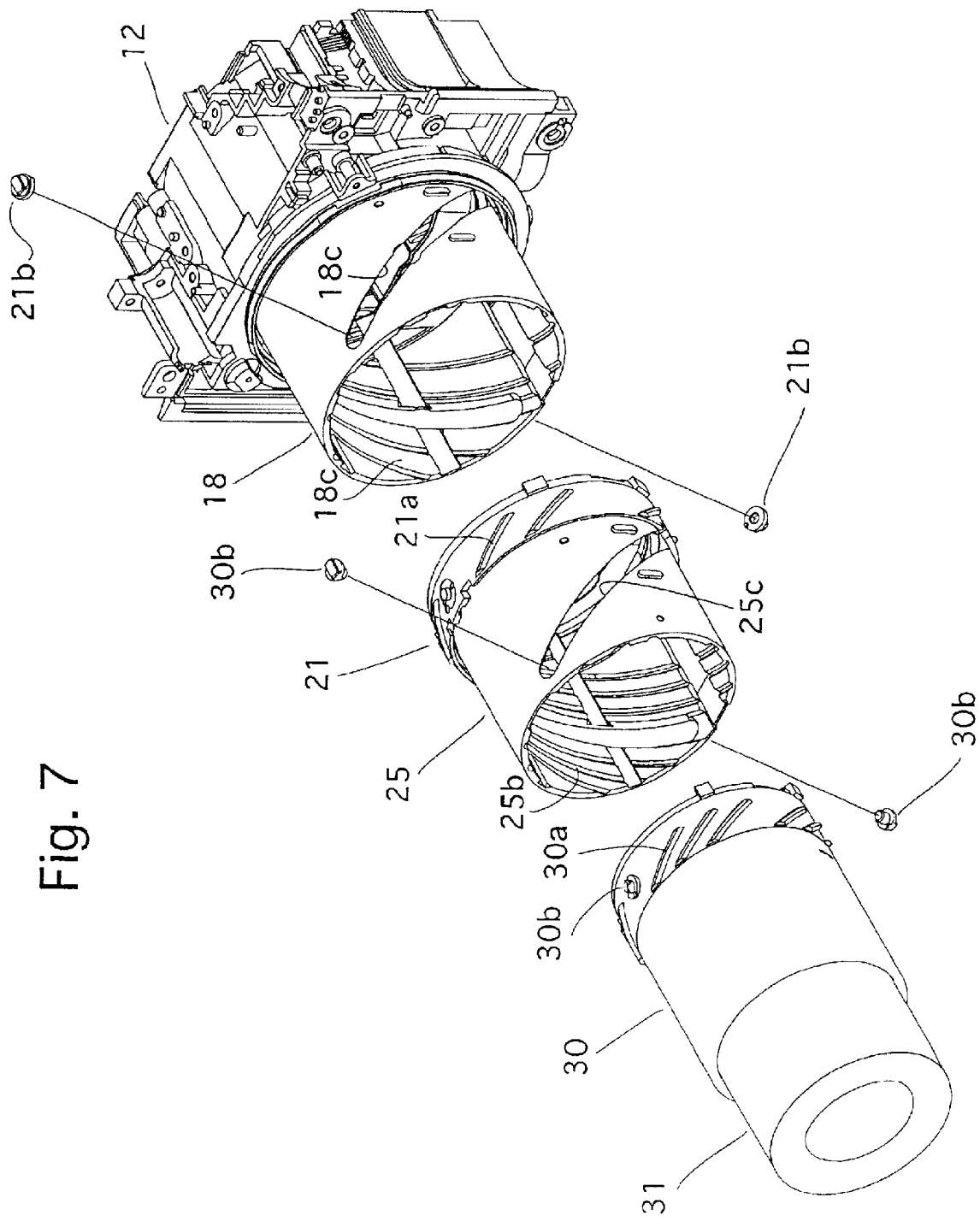
FIG. 7 is an exploded perspective view of the zoom lens barrel, showing a more detailed disassembly than FIG. 6.

The foldable strip FPC 80B is secured at a shutter securing end 80B-1 to the front support ring 41 by a securing screw 82, as shown in FIG. 13. An FPC support plate 83 is inserted between the shutter securing end 80B-1 and the securing screw 82. A cylindrical press-contact support rubber 84 is inserted between the shutter securing end 80B-1 and the front support ring 41. As shown in FIGS. 2 and 4, the foldable strip FPC 80B is connected at the other end to the control circuit 81. The foldable strip FPC 80B can be freely deformed to vary the position of the bent portions and the linear portions thereof in accordance with the relative position of the lens-shutter unit 40 and the control circuit 81 which is changed in accordance with the advance or retraction of the zoom lens barrel, to prevent an interference of the FPC with other members of the lens barrel or the photographing light path. The foldable strip FPC 80B is not connected to the motors (reversible drive motor 53 and the shutter drive motor 67) or the photo-interrupters 56 and 69 when the foldable strip FPC 80B is solely mounted to the front support ring 41. Namely, the motors and the photo-interrupters are connected to the control circuit 81 when the annular FPC 80A is mounted.

Figure 17:
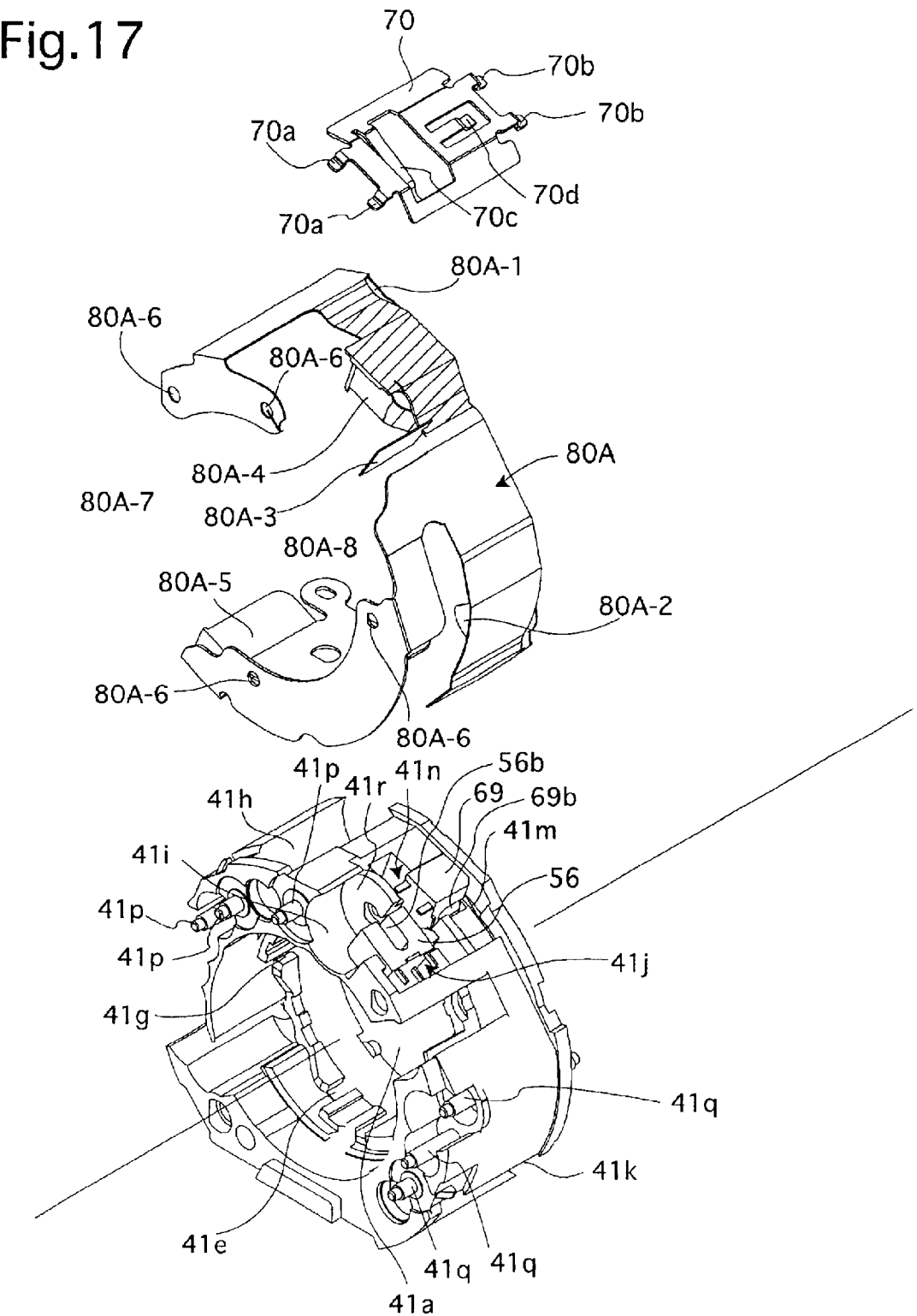
FIG. 17 is an exploded perspective view of a front holder ring and an annular FPC.

As shown in FIG. 17, the annular FPC 80A has two motor terminals 80A-1 and 80A-2 to supply power to the reversible drive motor 53 and the shutter drive motor 67, and two interrupter terminals 80A-3 and 80A-4 to receive the pulses output from the photo-interrupters 56 and 69, respectively. The wiring conductors extending from the terminals are gathered at a press-contact portion 80A-5. The press-contact portion 80A-5 is brought into press contact with the shutter securing end 80B-1 of the foldable strip FPC 80B, so that the wiring conductors of the annular FPC 80A and the foldable strip FPC 80B are connected. Thus, the reversible drive motor 53, the shutter drive motor 67, and the photo-interrupters 56 and 69 are electrically connected to the control circuit 81. The press-contact portion 80A-5 of the annular FPC 80A is fastened together with the shutter securing end 80B-1 of the foldable strip FPC 80B by the securing screw 82, and are secured to the front support ring 41. The annular FPC 80A is also provided with four positioning holes 80A-6 in which front surface projections 43c (see FIGS. 20 and 21) of the gear retainer ring 43 are fitted to determine the position thereof.

The leaf spring cover 70, which holds the photo-interrupters 56 and 69, covers the portion of the annular FPC 80A hatched in FIG. 17 to stably hold the annular FPC 80A.

Figure 26:
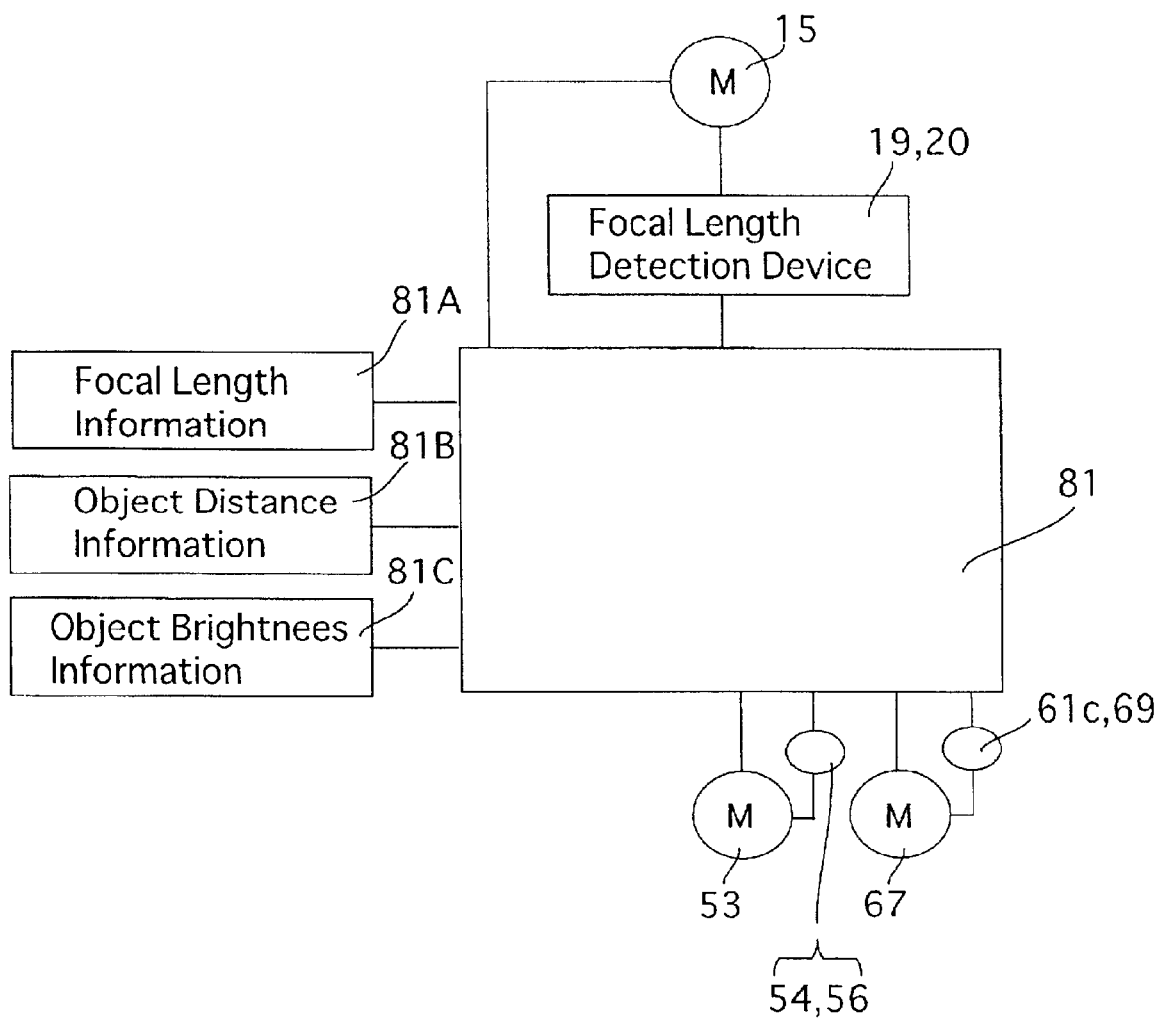
FIG. 26 is a block diagram of a control system of a zoom lens barrel shown in FIGS. 2 through 4.

As shown in FIG. 26, the control circuit 81 controls the zooming motor 15 as well as the reversible motor 53 and the shutter drive motor 67. Focal length information 81A set by an operator (photographer) via a zoom switch (zoom operating device) etc., detected object distance information 81B, object brightness information 81C, angular position information of the cam ring 30 detected by a focal length detection device including the brush 19 and the code plate 20, focusing drive amount information (position switching information of the first sub-lens group S1 and the second sub-lens group S2) detected by the photo-interrupter 56, and opening and closing state information of the shutter sectors 60 detected by the photo-interrupter 69 are input to the control circuit 81. The zooming motor 15, the reversible drive motor 53, and the shutter drive motor 67 are controlled so that the exposure is carried out under the correct exposure conditions at the set focal length, based on the input information. Note that although, in the illustrated embodiment, the shutter sectors 60 function as a shutter and a variable diaphragm, and the diaphragm sectors 62 restrict the aperture size at the wide-angle photographing position, it is possible to use a variable diaphragm mechanism in which the diaphragm sectors 62 are electrically driven by a motor.

The lens-shutter unit 40 is assembled with the members discussed above into a unit which is incorporated in the lens support barrel 31. Namely, the front unit 40A and the rear nit 40B are assembled separately, the two units 40A and 40B are secured using three unit securing screws 39 (see FIG. 13), and the assembly of the units 40A and 40B is mounted into the lens support barrel 31.

Figure 21:
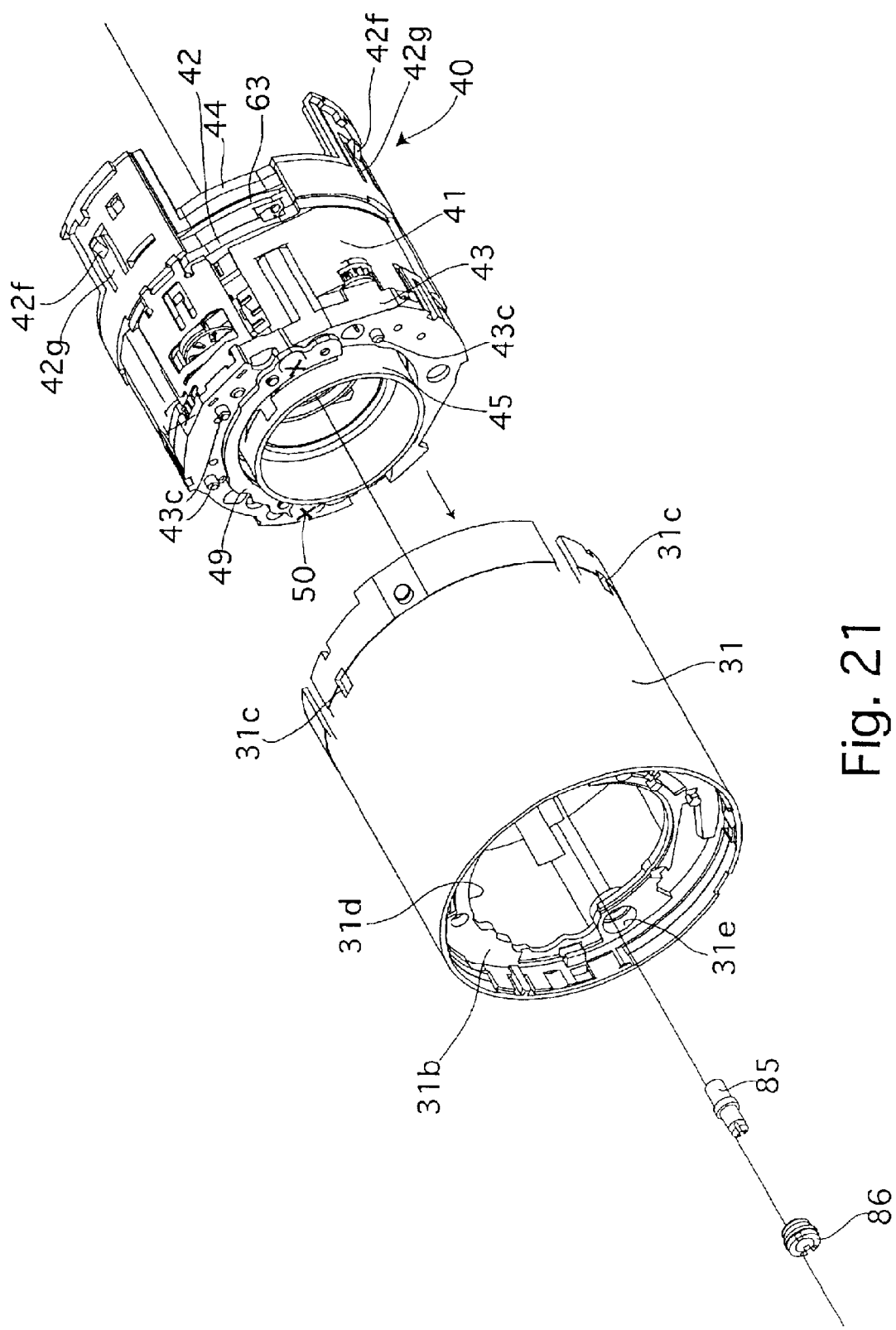
FIG. 21 is an exploded perspective view of a lens-shutter unit and a lens support barrel.

As shown in FIG. 21, the rear support ring 42 of the lens-shutter unit 40 is provided with engagement projections 42f provided on the outer surfaces of the three rear arms 42b. The engagement projections 42f are engaged in the engagement holes 31c of the lens support barrel 31. The engagement projections 42f are formed on resilient tongue portions 42g which are elastically deformable in the radial directions. When the lens-shutter unit 40 is inserted in the direction indicated by an arrow in FIG. 21 into the lens support barrel 31, the engagement projections 42f are moved inwardly by the inner surface of the lens support barrel 31, so that the elastic tongue portions 42g are elastically deformed inwardly. Further insertion o the lens-shutter unit 40 causes the engagement projections 42f to engage in the engagement holes 31c, so that the elastic tongue portions 42g are returned to the initial state, or the inward deformation of the elastic tongue portions 42g is reduced. The cross sectional shape of the engagement projections 42f is such that the elastic tongue portions 42g can be easily deformed inwardly when the lens-shutter unit 40 is inserted forwardly in the optical axis direction, and the lens-shutter unit 40 cannot slip off the lens support barrel 31 in the rearward direction. Therefore, when the engagement projections 42f engage in the engagement holes 31c, the lens-shutter unit 40 is held in the lens support barrel 31. Three lens-shutter unit retainer springs 73 (see FIGS. 1 and 13) are provided between the lens-shutter unit 40 and the lens support barrel 31 to bias the lens-shutter unit 40 rearwardly in the optical axis direction. Accordingly, the axial position of the lens-shutter unit 40 can be accurately determined.

It is possible to adjust the position of the lens-shutter unit 40 in a direction perpendicular to the optical axis, during the assembly of the lens barrel. The lens support barrel 31 is provided on the inner peripheral surface thereof with a substantially annular front wall portion 31b in the vicinity of the front end of the lens support barrel 31. The front wall portion 31b is provided with an insertion hole 31e (see FIG. 21) in which an eccentric member 85 and a direction member 86 are rotatably fitted. The eccentric member 85 is engaged in the gear retainer ring 43 of the lens-shutter unit 40. The eccentric member 85 and the direction member 86 are relatively rotatable. When the direction member 86 is rotated from the front end of the lens support barrel 31, the front end of the eccentric member 85 (the end of the eccentric member engaging with the lens-shutter unit 40) is moved in a plane perpendicular to the optical axis O. Consequently, the position of the lens-shutter unit 40 in the direction perpendicular to the optical axis within the lens support barrel 31 is varied, whereby the position of the first variable power lens group L1 supported by the lens-shutter unit can be adjusted.

The lens support barrel 31 is provided on the front end thereof with a lens barrier mechanism which opens and closes the front opening of the first variable power lens group L1. As shown in FIG. 1, the lens barrier mechanism has a barrier unit including an outer decorative plate 90 secured to the front end of the lens support barrel 31, a barrier retainer ring 96, a pair of outer barrier blades 92 and a pair of inner barrier blades 93 which are rotatably mounted between the barrier retainer ring 96 and the decorative plate 90, and barrier springs 94. A barrier drive ring 91 is supported between the barrier unit and the front end 31b of the lens support barrel 31 so as to be rotatable about the optical axis O. The decorative plate 90 is provided with a projection (not shown) which rotatably supports the outer and inner barrier blades 92 and 93. The outer and inner barrier blades 92 and 93 are rotated about this projection and are associated with each other to carry out the opening and closing operation. The barrier blades 92 and 93 are biased by the barrier springs 94 in a closing direction.

The barrier drive ring 91 is provided with diametrically opposed barrier engagement portions 91a and a driven arm 91b which extends rearwardly in the optical axis direction. The barrier engagement portions 91a engage with the inner barrier blades 93 to transmit the rotation of the barrier drive ring 91 to the inner barrier blades 93. The inner barrier blades 93 are associated with the outer barrier blades 92, and hence, the rotation of the barrier drive ring 91 is transmitted to the outer barrier blades 92 via the inner barrier blades 93. The driven arm 91b extends through a center opening 31d of the front wall portion 31b (see FIG. 21) into the lens support barrel 31. The driven arm 91b can be engaged with an inclined guide surface 33e formed on the front end of the partially cylindrical arm 33b of the third linear guide ring 33.

The barrier drive ring 91 is biased by the drive ring biasing spring 95 in a direction to open the barrier blades 92 and 93. The drive ring biasing spring 95 is stronger than the barrier biasing spring 94, so that the biasing force of the drive ring biasing spring 95 is transmitted to the barrier blades 92 and 93 through the barrier engagement projections 91a to thereby open the barrier blades 92 and 93 against the barrier spring 94 when the barrier drive ring 91 is in a free state. At the wide-angle extremity shown in FIG. 3 and at the telephoto extremity shown in FIG. 4, the driven arm 91b and the inclined guide surface 33e do not come into contact with each other, so that the barrier drive ring 91 is free and, hence, the barrier blades 92 and 93 are open (see FIG. 25). When the zoom lens barrel is moved from the wide-angle extremity to the retracted position shown in FIG. 2, the inclined guide surface 33e of the third linear guide ring 33 engages with the driven arm 91b of the barrier drive ring 91, so that the barrier drive ring 91 is forcedly rotated in a direction against the drive ring biasing spring 95, i.e., in a direction to permit the barrier blades 92 and 93 to be closed, in accordance with the shape of the inclined guide surface 33e. Consequently, the barrier blades 92 and 93 which have been released from the restriction by the barrier drive ring 91 are closed by the spring force of the barrier spring 94 (see FIG. 24).

As mentioned above, in the zoom lens barrel of the present embodiment, the drive ring 47 is rotated to move the first variable power lens group L1 in the optical axis direction to carry out the focusing operation. As indicated by two-dotted chain line in FIG. 25, when the first variable power lens group L1 is moved to the front extremity of the movement for the focusing operation, the front end of the front sub-lens group frame 45 which supports the first sub-lens group S1 is moved to a position located more forward than the axial positions of the barrier blades 92 and 93. Note that FIG. 25 shows the telephoto photographing mode in which the first sub-lens group S1 and the second sub-lens group S2 are in the mutually close position. Likewise, at the wide-angle photographing mode in which the first sub-lens group S1 and the second sub-lens group S2 are in the mutually distant position, the front end of the front sub-lens group frame 45 is moved to a position located more forward than the axial positions of the barrier blades 92 and 93 at the front extremity of the movement for the focusing operation.

The lens-shutter unit (lens assembly/photographing-function unit) 40 of the zoom lens barrel discussed above includes the front unit (lens drive unit/front function unit) 40A and the rear unit (exposure control unit/rear function unit) 40B, in combination. The front support ring 41, the rear support ring 42, the gear retainer ring 43, and the sector retainer ring 44 constitute one support barrel, when the front unit 40A and the rear unit 40B are connected to each other.

Figure 15:
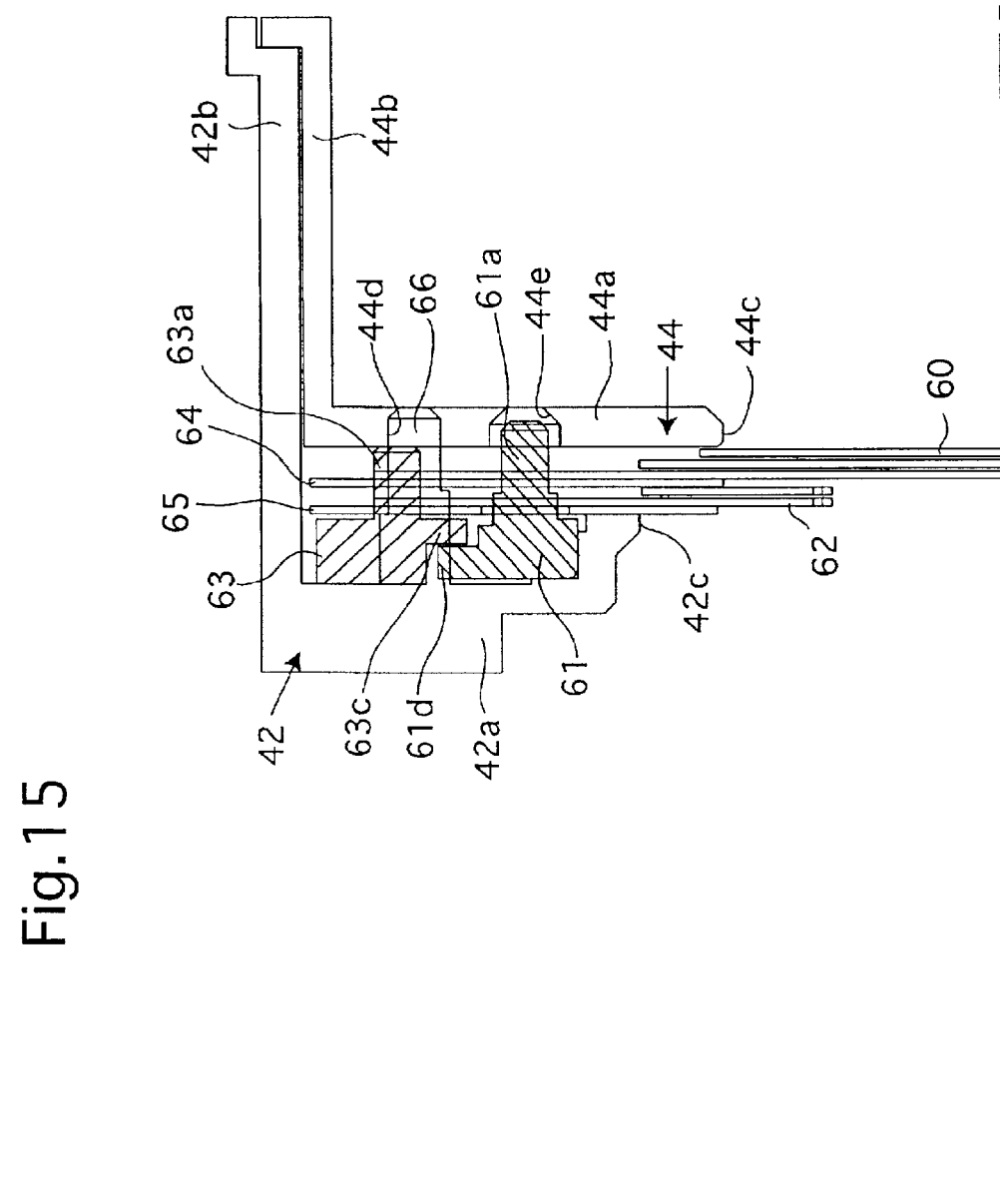
FIG. 15 is a sectional view of an upper half of a rear unit of a lens-shutter unit.

In the rear unit 40B, the three shutter sectors (exposure control member) 60, the three diaphragm sectors (exposure control member) 62, the shutter drive ring (exposure control member drive ring) 61, the diaphragm drive ring (exposure control member drive ring) 63, and the separation plates 64 and 65 are held between the rear support ring 42 and the sector retainer ring 44 (see FIGS. 14 and 15). The shutter drive ring 61 and the diaphragm drive ring 63 constitute a portion of the exposure control member drive mechanism which drives the corresponding shutter sectors and diaphragm sectors 60 and 62.

The mechanism to rotate the shutter drive ring 61, i.e., the shutter drive motor (exposure control motor) 67 and the reduction gear train (exposure control gear train) 68 which transmits the motor drive force of the shutter drive motor 67 to the sector gear 61b of the shutter drive ring 61 are provided in the front unit 40A. As shown in FIG. 17, the front support ring 41 of the front unit 40A is provided, on the outer peripheral surface thereof, with the motor receiving recess 41k in which the shutter drive motor 67 is received, and on the front surface thereof opposed to the gear retainer ring 43, with a plurality of gear support bosses 41q which support some of the gear elements of the reduction gear train 68.

A ring-rotating mechanism to rotate the diaphragm drive ring 63 is provided on the outside of the lens-shutter unit 40.

Namely, as shown in FIG. 11, the diaphragm drive ring 63 is rotated in accordance with the diaphragm control cam groove (engagement portion) 71 formed in the third linear guide ring 33 provided on the outer peripheral side of the lens-shutter unit 40, during the extending and retreating movement of the zoom lens barrel.

The front unit 40A contains a lens drive mechanism for the first variable power lens group L1 which includes the first sub-lens group S1 and the second sub-lens group S2. The first and second sub-lens groups S1 and S2 are supported by a front sub-lens group frame (lens support frame/front lens frame) 45 and a rear sub-lens group frame (lens support frame/rear lens frame) 46, respectively. The front and rear sub-lens group frames 45 and 46 are supported so as to move within the center opening 41a of the front support ring 41 in the optical axis direction, via the linear guide rods 48 secured to the gear retainer ring 43 via the securing bracket 49. The drive mechanism for the first variable power lens group L1 (first and second sub-lens groups S1 and S2) includes the reversible drive motor (lens drive motor) 53, the reduction gear train (lens drive gear train) 52, and the drive ring (lens drive ring) 47. The reversible drive motor 53 and the reduction gear train 52 are supported by the front support ring 41 of the front unit 40A. As shown in FIG. 17, the front support ring 41 is provided on the outer peripheral surface thereof with the motor holding recess 41h in which the reversible drive motor 53 is received, and on the front end thereof opposed to the gear retainer ring 43, with a plurality of gear support bosses 41p which support some of the gear elements of the reduction gear train 52. Gear support rods 52b (see FIG. 13) which supports the remaining gear elements of the reduction gear train 52 is supported between the front support ring 41 and the gear retainer ring 43.

Namely, the front unit 40A constitutes a lens drive unit including a portion of the drive mechanism (the reversible drive motor 53 and the reduction gear train 52) for the first variable power lens group L1 which includes the first and second sub-lens groups S1 and S2. The front unit 40A is also provided with a shutter motor 67 for driving the shutter drive ring 61 and a reduction gear train 68.

The rear unit 40B constitutes an exposure control unit having therein the exposure control members, such as the shutter sectors 60 and the diaphragm sectors 62, and the shutter and diaphragm drive rings 61 and 63, respectively.

The front support ring 41 of the front unit 40A is provided with interrupter holding recesses (detector support portion/detector receiving portion) 41j and 41n in which the photo-interrupter (detection member/lens movement detector) 56 and the photo-interrupter (detection member/exposure control detector) 69 are respectively held. As discussed above, the photo-interrupter 56 is a lens drive or movement detector which detects the position switching operation of the first and second sub-lens groups S1 and S2 at the mutually close position and the mutually distant position, and the entire focusing operation of the first variable power lens group L1. The other photo-interrupter 69 is a detector for the exposure control operation which detects the opening state of the shutter sectors 60.

The lens-shutter unit 40 to which the present invention is applied is constructed from the front and rear units 40A and 40B having respective functions mentioned above, which are assembled separately and interconnected by the three unit securing screws 39 to form a single cylindrical shutter unit. The assembling process of the lens-shutter unit 40 will be discussed below.

To assemble the rear unit 40B, the shutter drive ring 61 is fitted in the inner diameter of the diaphragm drive ring 63 and the outer diameter thrust projections 61*d* are engaged with the inner diameter thrust projections 63*c*. Consequently, the shutter drive ring 61 and the diaphragm drive ring 63 are relatively rotatable due to the engagement between the outer diameter thrust projections 61*d* and the inner diameter thrust projections 63*c*. The shutter drive ring 61 and the diaphragm drive ring 63 are inserted in the rear support ring 42 until the forward movement thereof in the optical axis direction is restricted by the front wall portion 42*a*. In this stage, the diaphragm drive ring biasing spring 72 is arranged between the shutter drive ring 61 and the rear support ring 42.

Thereafter, to cover the drive rings 61 and 63, the separation plate 65, the three diaphragm sectors 62, the separation plate 64, and the three shutter sectors 60 are mounted in that order to the rear support ring 42 from behind. The positions of the shutter sectors 60 and the diaphragm sectors 62 in the circumferential direction are determined so that the common projecting pivots (rotation axis) 66 are fitted in the support holes 60*a* and 62*a*. Consequently, the rotation transmission dowels 61*a* of the shutter drive ring 61 are fitted in the rotational guide cam slots 60*b* of the shutter sectors 60 and the rotation transmission dowels 63*a* of the diaphragm drive ring 63 are fitted in the rotational guide cam slots 62*b* of the diaphragm sectors 62. As shown in FIG. 15, the diaphragm sectors 62 which are located between the shutter drive ring 61 and the shutter sectors 60 are provided with through-holes 62*c* through which the rotation transmission dowels 61*a* are inserted, and hence, no interference with the rotation transmission dowels 61*a* occurs. Furthermore, the separation plates 64 and 65 are respectively provided with through-holes 64*b* and 65*b* through which the projecting pivots 66 extend, through-holes 64*c* and 65*c* in which the rotation transmission dowels 61*a* are inserted, and through-holes 64*d* and 65*d* in which the rotation transmission dowels 63*a* are inserted (see FIG. 14). When the separation plate 64 is attached to the rear support ring 42, the projecting pivots 66 and the rotation transmission dowels 61*a* and 63*a* are registered with the corresponding through-holes in the circumferential position.

Finally, the sector retainer ring 44 is mounted from behind the rear support ring 42. During the mounting of the sector retainer ring 44, engagement projections 44*g* (see FIG. 14) provided on the rear arms 44*b* of the sector retainer ring 44 are engaged into engagement holes 42*j* formed in the rear arms 42*b* of the rear support ring 42, so that the sector retainer ring 44 do not slip off from the rear support ring 42 takes place. In this state, the front ends of the projecting pivots 66 projecting from the rear support ring 42 are fitted into, and secured to, the projecting pivot securing holes 44*d* of the sector retainer ring 44. The front ends of the rotation transmission dowels 61*a* of the shutter drive ring 61 are loosely fitted into dowel receiving slots 44*e*. Moreover, the front ends of the rotation transmission dowels 63*a* of the diaphragm drive ring 63 abut against the front wall portion 44*a* of the sector retainer ring 44.

Thus, the rear unit 40B is assembled. The rear unit 40B includes, at the center portion thereof, a series of center openings (center apertures) from the center opening 42*c* of the rear support ring 42 to the exposing circular opening 44*c* of the sector retainer ring 44, including the exposing circular openings 64*a* and 65*a* of the separation plates 64 and 65. The rear unit 40B is generally cylindrical.

Upon the rear unit 40B being assembled as a subassembly, the shutter sectors 60 and the diaphragm sectors 62 can be independently opened and closed by rotating the drive rings 61 and 63, respectively, using a tool or the like, respectively. Namely, it is possible to check the operation or movement of the shutter sectors 60 and the shutter drive ring 61 before the rear unit 40B is mounted to the front unit 40A having the shutter drive motor 67 and the reduction gear train 68. Moreover, prior to mounting to the third linear guide ring 33 having the diaphragm control cam grooves 71, it is possible to check or inspect the operation or movement of the diaphragm sectors 62 and the diaphragm drive ring 63. The inspection of the rear unit 40B can be carried out without supplying electricity to the shutter drive motor 67 or the zoom motor 15.

To assemble the front unit 40A, the reduction gear train 52 for driving the first variable power lens group L1 (first and second sub-lens groups S1 and S2), the reduction gear train 68 for driving the shutter drive ring 61, and the rotating slit disc 54 are placed between the front support ring 41 and the gear retainer ring 43, and the front support ring 41 and the gear retainer ring 43 are interconnected. The gear elements of the reduction gear train 52 are supported by the gear support rods 52*b* and the gear support bosses 41*p*, and the gear elements of the reduction gear train 68 are supported by the gear support bosses 41*q*. The gear elements of the reduction gear trains 52 and 68 are supported so as not to be disengaged from the gear support bosses 41*p* and 41*q*, and the gear support rods 52*b*, by covering the front end of the front support ring 41 with the gear retainer ring 43, and are held between the front support ring 41 and the gear retainer ring 43 so as to independently rotate. In this state, the terminal gear 52*a* of the reduction gear train 52 and the terminal gear 68*a* of the reduction gear train 68 protrude from the rear end of the front support ring 41 (see FIG. 18). The circular slit disc 54 is held by a rotating support plate 41*r* (see FIG. 17) in the slit disc holding recess 41*i*.

Thereafter, the reversible drive motor 53 and the shutter drive motor 67 are inserted in the motor holding recesses 41*h* and 41*k* of the front support ring 41, respectively. The motors 53 and 67 are received in the corresponding motor holding recesses 41*h* and 41*k*, with the pinions 53*a* and 67*a* facing forward (toward the gear retainer ring 43). Consequently, the pinions 53*a* and 67*a* are engaged with first gears of the reduction gear trains 52 and 68, respectively. The motors 53 and 67 are each provided on the rear ends thereof with a pair of terminals 53*b* and 67*b* which are exposed to the rear end of the front support ring 41 (see FIG. 18). The motor holding recesses 41*h* and 41*k* permit the motors 53 and 67 to move in the insertion direction parallel with the optical axis and prevent the motors 53 and 67 from slipping out in the radial direction of the lens-shutter unit 40. Thus, the motors 53 and 67 held in the motor holding recesses 41*h* and 41*k* cannot slip off in the radial and outward direction of the front support ring 41. Note that the insertion of the motors 53 and 67 into the front support ring 41 can be carried out either before or after the attachment of the reduction gear trains 52 and 68.

In the front unit 40A, the lens drive system which includes elements from the reversible drive motor 53 for driving the first variable power lens group L1 to the terminal gear 52*a* of the reduction gear train 52 is established, and hence, it is possible to check the operation and movement of the motor 53 and the reduction gear train 52 before the front and rear sub-lens groups S1 and S2 and the rear unit 40B are assembled. Likewise, since the shutter drive system which includes elements from the shutter drive motor 67 to the terminal gear 68*a* of the reduction gear train 68 is established, it is possible to check the operation and movement of the motor 53 and the reduction gear train 52 before the rear unit 40B, having the shutter drive ring 61, is assembled.

As shown in FIGS. 13 and 20, the gear retainer ring 43 has a center opening 43h connected to the center opening 41a of the front support ring 41, so that when the front support ring 41 and the gear retainer ring 43 are assembled together, a lens movement opening through which the first variable power lens group L1 is moved is defined at the center portion of the front unit 40A by the center openings 41a and 43h. The front unit 40A is generally cylindrical and the center axis thereof is located at the center axis of the lens movement opening.

After the gear trains 52 and 68 and the motors 53 and 67 are assembled, the photo-interrupters 56 and 69 and the lens-shutter unit FPC 80 are mounted to the front unit 40A. The photo-interrupters 56 and 69 are received into the interrupter holding recesses 41j and 41n formed in the outer peripheral surface of the front support ring 41, respectively. The photo-interrupter 56 received in the interrupter holding recess 41j has a U-shaped body having a pair of opposed light emitting and receiving portions which define a slit insertion recess 56b (see FIG. 17), and the slit disc 54 is located in the slit insertion recess 56b. The photo-interrupter 69 received in the interrupter holding recess 41n has a U-shaped body having a pair of opposed light emitting and receiving portion which define a slit insertion recess 69b and, the slit insertion recess 69b is opposed to the arc opening 41m on the rear end side of the front support ring 41. In this position, the photo-interrupters 56 and 69 are received in the interrupter holding recesses 41j, 41n, and are removable therefrom in the upward and radial direction.

After the photo-interrupters 56 and 69 are incorporated, the annular FPC 80A is attached to the assembly of the front support ring 41 and the gear retainer ring 43. As mentioned above, the annular FPC 80A is provided with the motor terminal portions 80A-1 and 80A-2 positioned on the rear end of the front support ring 41. The motor terminal portion 80A-1 is secured to the terminals 53b (see FIG. 18) of the reversible drive motor 53. The motor terminal portion 80A-2 is secured to the terminals 67b (see FIG. 18) of the shutter drive motor 67. The positioning holes 80A-6 formed at the front end of the annular FPC 80A are engaged with the front face projections 43c (see FIG. 20) of the gear retainer ring 43 to stabilize the annular FPC 80A. Moreover, as shown in FIGS. 27 and 29, the interrupter terminal 80A-3 is engaged with terminals 56a of the photo-interrupter 56, and the interrupter terminal 80A-4 is engaged with terminals 69a of the photo-interrupter 69.

Figure 27:
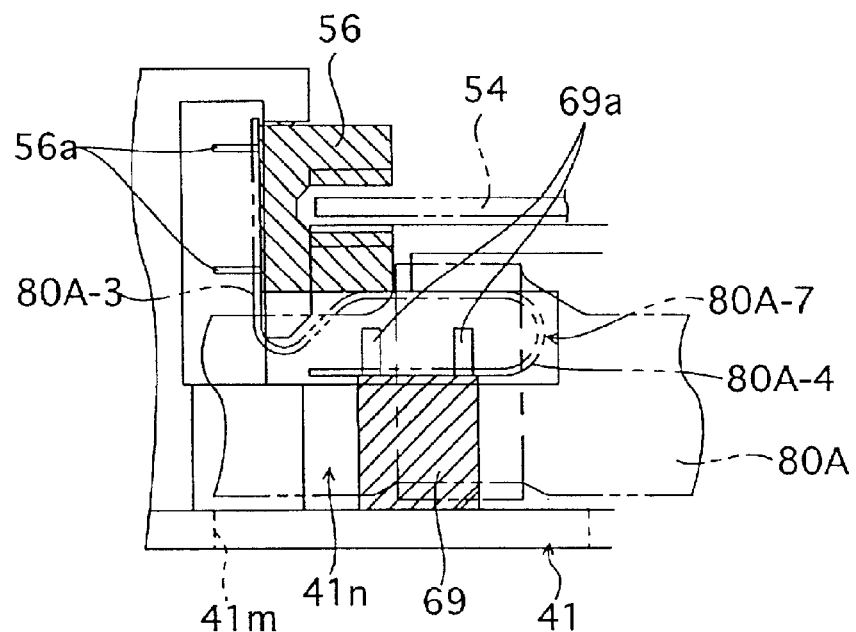
FIG. 27 is a developed view showing a relationship between a photo-interrupter and a FPC board provided in a lens-shutter unit.
Figure 28:
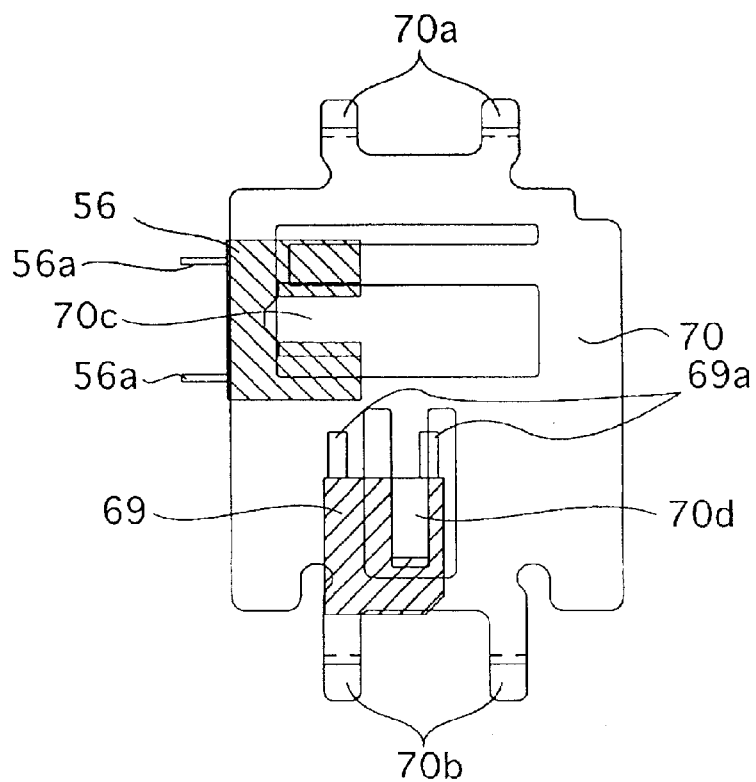
FIG. 28 is a developed view showing a relationship between a leaf spring cover and photo-interrupters.
Figure 29:
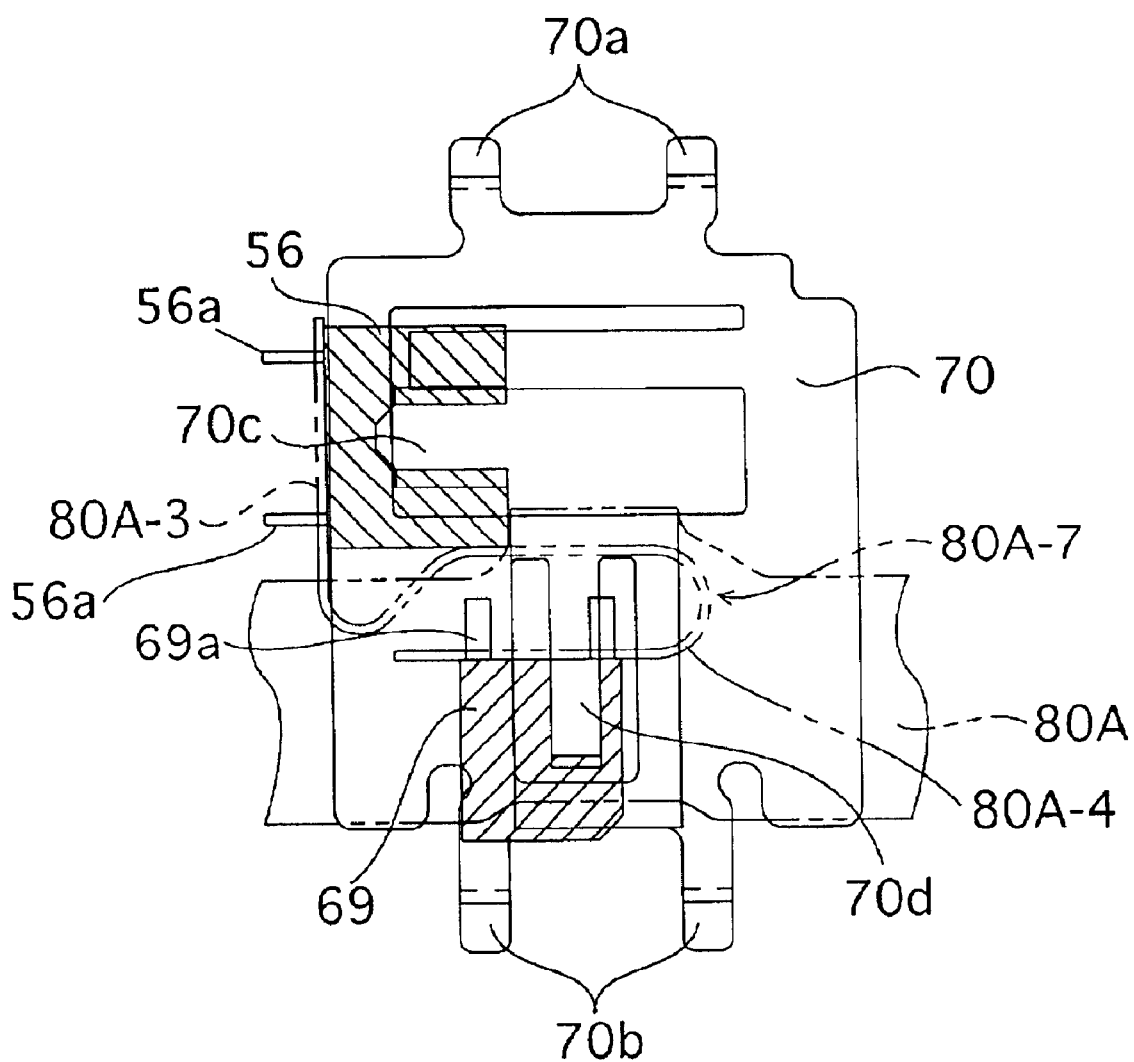
FIG. 29 is a developed view showing a relationship of a photo-interrupter, an FPC board, and a leaf spring cover.

FIGS. 27 through 29 show a relationship between the interrupter terminal portions 80A-3 and 80A-4 and the photo-interrupters 56 and 69. The annular FPC 80A is provided with an inwardly projecting band-like branch portion 80A-7 which is appropriately bent and is provided, on the front end thereof, with the interrupter terminal portion 80A-3 and, on the intermediate portion, with the interrupter terminal portion 80A-4.

After the annular FPC 80A is supported in the assembly of the front support ring 41 and the gear retainer ring 43, the leaf spring cover (cover member) 70 is mounted. The leaf spring cover 70 made of metal is provided with a pair of front engagement legs 70a and a pair of rear engagement legs 70b extending in the forward and rearward directions, respectively. The front engagement legs 70a are engaged with a pair of cover engagement pawls 43d (see FIG. 18) formed on the gear retainer ring 43 of the front unit 40A. Consequently, the leaf spring cover 70 covers the photo-interrupters 56 and 69 and a portion of the annular FPC 80A including the branch portion 80A-7, as shown in FIG. 29. The leaf spring cover 70 is provided with two resilient tongue portions (abutment portions) 70c and 70d which are formed by partly cutting the leaf spring cover 70 in the radial and inward direction (toward the optical axis O). The end of the resilient tongue portion 70c abuts against the photo-interrupter 56 and the end of the resilient tongue portion 70d abuts against the photo-interrupter 69. Note that the rear engagement legs 70b are not fixed when the front unit 40A is disconnected from the rear unit 40B.

After the elements of the front unit 40A are assembled as discussed above, the front unit 40A and the rear unit 40B are interconnected. The rear support ring 42 and the sector retainer ring 44 of the rear unit 40B are respectively provided with three screw insertion holes 42k and 44h (see FIGS. 14 and 18). The front support ring 41 of the front unit 40A is provided on the rear end thereof with three threaded holes 41s (see FIG. 18). Consequently, when three securing screws 39 are inserted into the screw insertion holes 42k and 44h, and are screwed in the threaded holes 41s, the front unit 40A is secured to the rear unit 40B. In this connecting operation, while the rear end face of the drive ring 47 is pressed onto the receiving surface 42s of the rear support ring 42, the drive ring 47 is held between the front support ring 41 and the rear support ring 42 to combine the front and rear units 40A and 40B (see FIGS. 24 and 25). Consequently, the gear 47f of the drive ring 47 is supported between the front support ring 41 and the rear support ring 42, so that the drive ring 47 is supported so as to only rotate and not to move in the optical axis direction.

When the front and rear units 40A and 40B are interconnected, the terminal gear 52a of the reduction gear train 52 which projects rearwardly from the front unit 40A is in mesh with the gear 47f of the drive ring 47. The rear support ring 42 is provided on the front face thereof with a gear receiving recess 42m (see FIG. 14) in which the terminal gear 52a of the reduction gear rain 52 is received. The terminal gear 68a of the reduction gear train 68 is inserted in the rear unit 40B through the through-hole 42e of the rear support ring 42 and is engaged by the sector gear 61b of the shutter drive ring 61.

Conversely, the slit plate 61c of the shutter drive ring 61 provided in the rear unit 40B is inserted in the front unit 40A through the arc opening 42d (see FIG. 14) formed in the rear support ring 42 and the arc opening 41m (see FIG. 17) formed in the front support ring 41, and the slit plate 61c is positioned in the slit insertion recess 69b (see FIGS. 27 through 29) of the photo-interrupter 69 for detecting the operation of the shutter.

As a result of the connection of the front unit 40A and the rear unit 40B, the pair of rear engagement legs 70b of the leaf spring cover 70 are engaged with a pair of cover engagement pawls 42n (see FIG. 14) provided at the front end of the rear support ring 42. As mentioned above, the leaf spring cover 70 has the pair of front engagement pawls 70a which engage with the gear retainer ring 43 (cover engagement pawls 43d) which constitutes part of the front unit 40A, and the pair of rear engagement legs 70b which engage with the rear support ring 42 (cover engagement pawls 42n) which constitutes part of the rear unit 40B. Consequently, the leaf spring cover 70 is held and secured between the front and rear units 40A and 40B. Thus, the leaf spring cover 70 is secured to the outer surface of the lens-shutter unit 40, and accordingly, the photo-interrupters 56 and 69 located on the inner surface side thereof are prevented from being disengaged from the lens-shutter unit 40. Namely, the resilient tongue portions 70c and 70d of the leaf spring cover 70, which are bent in the inner diameter direction of the leaf spring cover 70, are elastically and slightly deformed in the outer diameter direction upon contacting with the photo-interrupters 56 and 69. Consequently, the photo-interrupters 56 and 69 are pressed inwardly and held firmly, due to the resilient force of the resilient tongue portions 70c and 70d.

The leaf spring cover 70 secured to the lens-shutter unit 40 holds the portion of the annular FPC 80A in the vicinity of the branch portion 80A-7 between the leaf spring cover 70 and the outer surface of the lens-shutter unit 40. Consequently, no deformation of the annular FPC 80A in a direction away from the lens-shutter unit 40 takes place.

Namely, the leaf spring cover 70 lies over the front and rear units 40A and 40B when the front unit 40A and the rear unit 40B are interconnected and serves as an anti slip-off member for the photo-interrupters 56 and 69. Moreover, the leaf spring cover 70 functions also as a retainer to press the annular FPC 80A.

The center openings (41a and 43h) which extend through the front unit 40A and the center openings (42c, 44c, 64a and 65a) which extend through the rear unit 40B define a series of exposing openings (lens movement openings) when the lens-shutter unit 40 is assembled. The front sub-lens group frame 45 and the rear sub-lens group frame 46 are mounted to the lens-shutter unit 40 by insertion thereof through the exposing openings from the front side of the front unit 40A.

Figure 33:
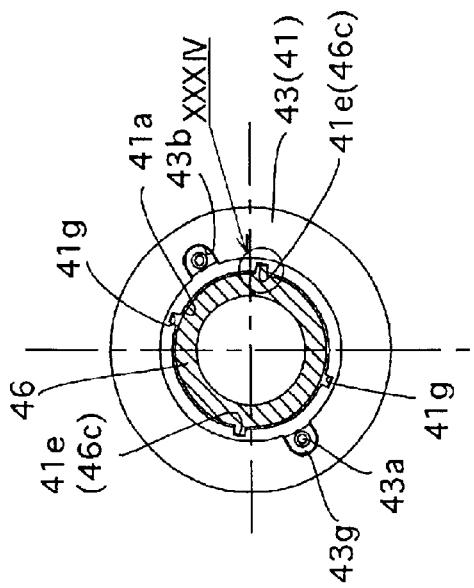
FIG. 33 is an explanatory front elevational view of a rear sub-lens group frame guided by a front support ring.
Figure 34:
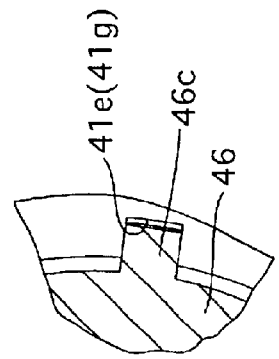
FIG. 34 is an enlarged view of a portion indicated by an arrow XXXIV in FIG. 33.

The rear sub-lens group frame 46 is first assembled into the front support ring 41. The rear sub-lens group frame 46 is moved rearward in the optical axis direction after the two linear guide projections 46c provided on the outer peripheral surface of the rear sub-lens group frame 46 are registered with the wide-angle linear guide groove 41e or the telephoto linear guide groove 41g formed in the inner surface of the front support ring 41 (see FIGS. 33 and 34). The rear sub-lens group frame 46 can be moved rearward until the driven projections 46d come into contact with the telephoto focus leading surfaces 47d or the wide-angle focus leading surfaces 47e of the drive ring 47. Since the rearward movement of the drive ring 47 is restricted by the receiving surface 42s, when the driven projections 46d come into contact with the focus leading surfaces 47d or 47e, further insertion of the rear sub-lens group frame 46 is restricted by the drive ring 47. The linear guide projections 46c (i.e., the rear sub-lens group frame 46) can be inserted into the wide-angle linear guide groove 41e or the telephoto linear guide groove 41g, at any one of the two diametrically opposed angular positions having a phase difference of 180 degrees.

Figure 31:
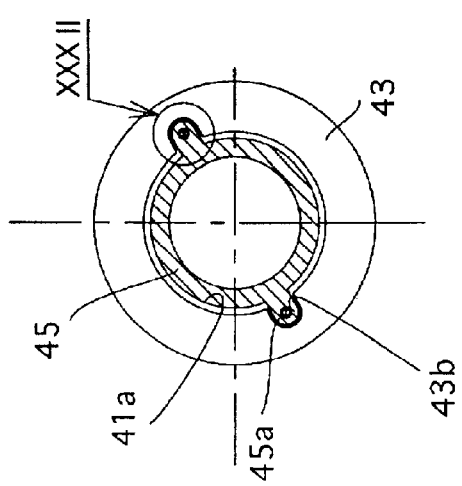
FIG. 31 is an explanatory front elevational view of the front sub-lens group frame guided by a gear retainer ring.

After the rear sub-lens group frame 46 is assembled, the front sub-lens group frame 45 is mounted. The front sub-lens group frame 45 can be mounted while aligning the two diametrically opposed linear guide ribs 45a with the generally U-shaped recesses 43b formed in the gear retainer ring 43 (see FIGS. 20 and 31). In this state, when the front sub-lens group frame 45 is inserted rearward by a predetermined amount, the four shift leading surfaces 45c of the front sub-lens group frame 45 are brought into contact with the four follower projections 46a of the rear sub-lens group frame 46. The front sub-lens group frame 45 can be mounted at any one of the two diametrically opposed angular positions having a phase difference of 180 degrees.

After the front sub-lens group frame 45 is assembled, the securing bracket 49 is attached to the front end surface of the gear retainer ring 43. As shown in FIG. 20, the securing bracket 49 is provided with a pair of positioning holes 49a and a pair of screw insertion holes 49b. The gear retainer ring 43 is provided on the front end face thereof with a pair of positioning projections 43e corresponding to the positioning holes 49a and a pair of threaded holes 43f corresponding to the screw insertion holes 49b. When the securing bracket 49 is mounted, the positioning projections 43e are engaged in the corresponding positioning holes 49a, so that the screw insertion holes 49b are registered with the corresponding threaded holes 43f. Consequently, the securing screws 50 are screwed in the threaded holes 43f through the screw insertion holes 49b.

Figure 30:
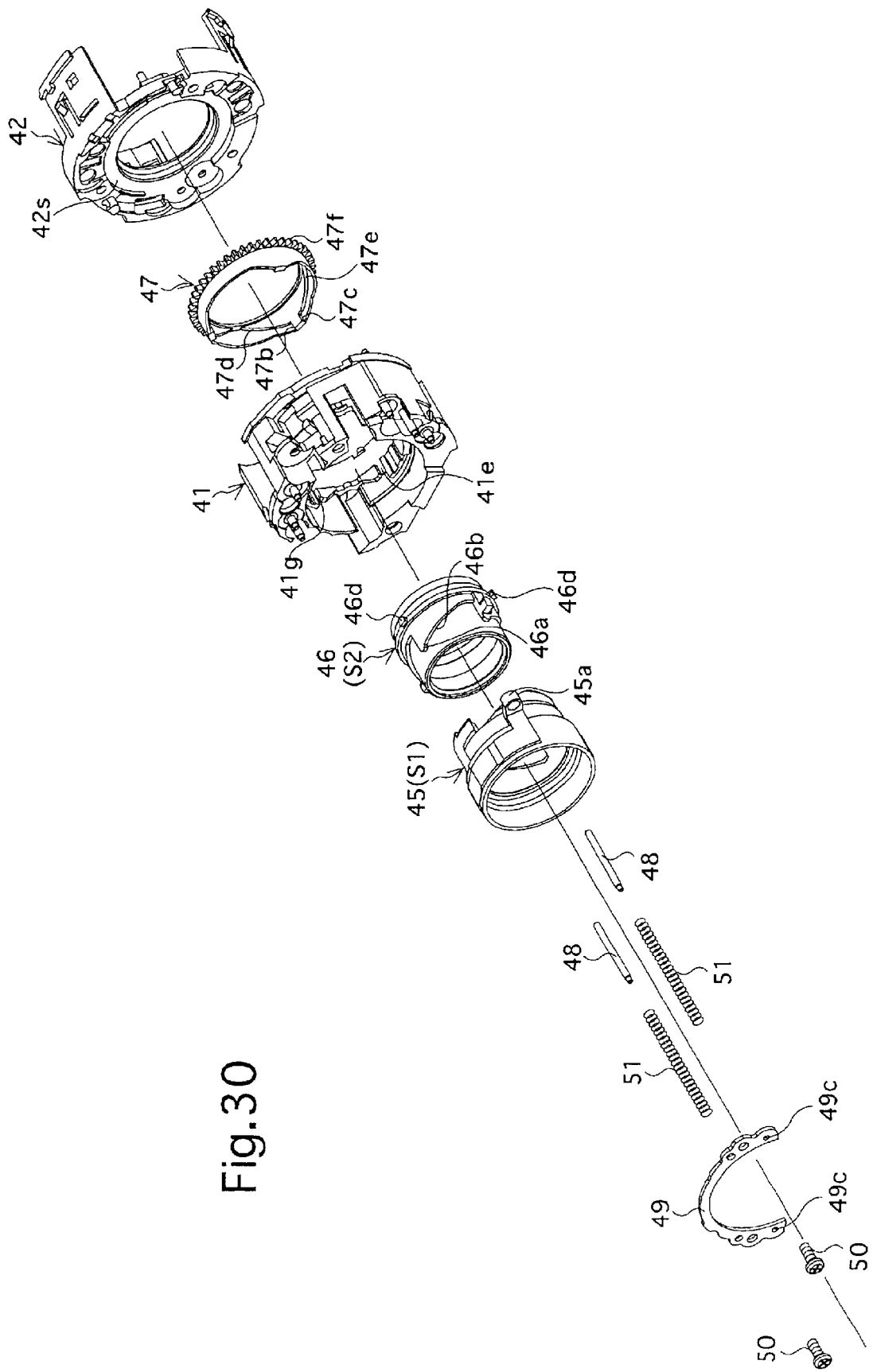
FIG. 30 is an exploded perspective view of a guide mechanism of a front sub-lens group frame and a rear sub-lens group frame, and the surroundings thereof.
Figure 32:
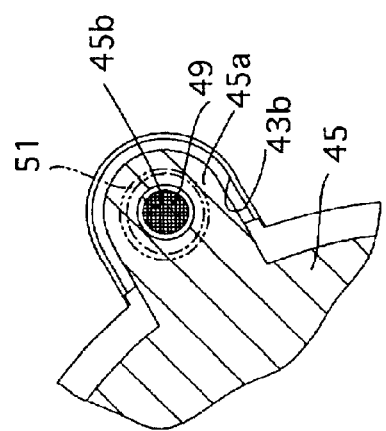
FIG. 32 is an enlarged view of a portion indicated by an arrow XXXII in FIG. 31.

As shown in FIGS. 20 and 30, the two linear guide rods 48 are secured at the front ends thereof to a pair of rod securing holes 49c formed on the securing bracket 49. The positions of the rod securing holes 49c correspond to the two linear guide ribs 45a of the front sub-lens group frame 45. Accordingly, when the securing bracket 49 is secured to the front end face of the gear retainer ring 43 by the pair of securing screws 50, the linear guide rods 48 are inserted in the guide holes 45b formed in the linear guide ribs 45a (see FIGS. 20 and 32), and the ends (rear ends in the optical axis direction) of the linear guide rods 48 are engaged in the securing holes 43a of the bottom ribs 43g (see FIGS. 24 and 25) formed on the inner surface of the gear retainer ring 43. Due to the engagement of the linear guide rods 48 in the guide holes 45b, the front sub-lens group frame 45 is linearly guidable in the lens-shutter unit 40. The securing bracket 49 prevents the front sub-lens group frame 45 from slipping out of the lens-shutter unit 40 in the forward direction, since the securing bracket 49 is located so as to cover the front side of the linear guide ribs 45a. As a result, the rear sub-lens group frame 46 is also prevented from slipping out.

Before the securing bracket 49 is attached to the gear retainer ring 43, the compression coil springs 51 are inserted over the linear guide rods 48 so as to be positioned between the linear guide ribs 45a of the front sub-lens group 45 and the securing bracket 49. As shown in FIGS. 24 and 25, the linear guide ribs 45a of the front sub-lens group fame 45 are provided with bottomed spring receiving recesses 45g in which one end of the compression coil springs 51 are fitted. The guide holes 45b are formed by drilling the bottoms of the spring receiving recesses 45g.

The compression coil springs 51 which are arranged between the securing bracket 49 and the linear guide ribs 45a bias the front sub-lens group frame 45 toward the rear sub-lens group frame 46, so that the shift leading surfaces 45c of the front sub-lens group frame 45, in the form of end cams, are always in contact with the follower projections 46a of the rear sub-lens group frame 46, and the driven projections 46d of the rear sub-lens group frame 46 are always in contact with the telephoto focus lead surfaces 47d or the wide-angle focus leading surfaces 47e of the drive ring 47. The biasing force of the compression coil springs 51 is received by the receiving surface 42s of the rear support ring 42, which constitutes part of the main body of the lens-shutter unit 40, via the drive ring 47. Namely, the front sub-lens group frame 45 and the rear sub-lens group frame 46, and the rear sub-lens group frame 46 and the drive ring 47 are respectively arranged so that the force in the optical axis direction is transmitted through the engagement of the end cams (i.e., the shift leading surfaces 45c and the control recesses 47a) and the cam followers (i.e., the follower projections 46a and the driven projections 46d). As the rearward movement of the rearmost drive ring 47 is restricted by the receiving surface 42s, the positions of the front sub-lens group frame 45 and the rear sub-lens group frame 46 can be stabilized in the optical axis direction merely by exerting the biasing force from the front side by the compression coil springs 51.

When the first variable power lens group L1 is supported in the lens-shutter unit 40, the assembly of the functional elements of the lens-shutter unit 40 is completed. Finally, the foldable strip FPC 80B is mounted. The foldable strip FPC 80B is fastened to the front support ring 41 together with the annular FPC 80A by the securing screw 82. Namely, the front support ring 41 is provided on the outer peripheral surface thereof with a receiving surface (not shown) which receives the cylindrical press-contact support rubber 84 (see FIG. 13) placed thereon. The receiving surface of the front support ring 41 is provided with a threaded hole (not shown). The center opening 84a of the support rubber 84 is registered with the threaded hole. The press-contact portion 80A-5 (see FIG. 17) of the annular FPC 80A and the shutter securing end 80B-1 of the foldable strip FPC 80B are overlapped on the support rubber 84 in that order. As shown in FIGS. 13 and 17, the press-contact portion 80A-5 and the shutter securing end 80B-1 are provided with screw insertion holes 80A-8 and 80B-2, respectively, corresponding to the threaded hole of the front support ring 41 and the center opening 84a of the press-contact support rubber 84. Moreover, the press-contact portion 80A-5 and the shutter securing end 80B-1, which is overlapped thereby, are covered by the FPC support plate 83 (see FIG. 13). The FPC support plate 83 has a center opening 83a similar to the center opening 84a of the press-contact support rubber 84. The securing screw 82 is inserted through the center opening 83a of the FPC support plate 83, the screw insertion holes 80A-8 and 80B-2 of the annular FPC 80A and the foldable strip FPC 80B, and the center opening 84a of the support rubber 84 and is screwed into the threaded hole of the front support ring 41. Accordingly, the annular FPC 80A and the foldable strip FPC 80B are fastened together and secured to the front support ring 41.

Consequently, the press contact portion 80A-5 and the shutter securing end 80B-1 are interconnected in a press-contact state by the securing screw 82. The printed circuits are exposed to the contact surfaces of the press-contact securing portion 80A-5 and the shutter securing end 80B-1, so that when the press-contact securing portion 80A-5 and the shutter securing end 80B-1 are brought into press-contact, the circuits of the annular FPC 80A and the foldable strip FPC 80B are electrically connected to each other. Namely, the annular FPC 80A and the foldable strip FPC 80B function as a single FPC 80 for the lens-shutter unit 40. The motors 53 and 67, and the photo-interrupters 56 and 69, provided in the front unit 40A are connected to the control circuit 81 by connecting the control circuit connecting end 80B-3 (see FIGS. 13, 16 and 18) at the other end of the foldable strip FPC 80B to the control circuit 81.

Note that, it is possible to press-contact the shutter securing end 80B-1 of the foldable strip FPC 80B with the press-contact portion 80A-5 of the annular FPC 80A after the control circuit connecting end 80B-3 of the foldable strip FPC 80B is connected to the control circuit 81. Conversely, it is also possible to connect the control circuit connecting end 80B-3 to the control circuit 81 after the shutter side securing end 80B-3 is connected to the press-contact portion 80A-5.

The lens-shutter unit 40 can be assembled in accordance with the assembling process mentioned above. The lens-shutter unit 40 can be disassembled in the opposite order to that of the assembling process.

As can be understood from the foregoing, in the embodiments discussed above, the front unit 40A having the lens drive system including the motor 53 and the gear train 52 (and the shutter drive system including the shutter drive motor 67 and the gear 68), and the rear unit 40B which supports the exposure control members, such as the shutter sectors 60 and the diaphragm sectors 62, are separately assembled, and are thereafter interconnected to form a single cylindrical lens-shutter assembly (i.e., the lens-shutter unit 40). Therefore, it is possible to check the operation or movement of the functional elements in the front and rear units 40A and 40B, prior to assembling of the lens-shutter unit 40. Namely, it is possible to check the association state of the reversible drive motor 53 and the reduction gear train 52 and the association state of the shutter drive motor 67 and the reduction gear train 68 in the sole front unit 40A. Likewise, it is possible to check the association state of the shutter sectors 60 and the shutter drive ring 61 and the association state of the diaphragm sectors 62 and the diaphragm drive ring 63 in the sole rear unit 40B. Consequently, the checking operation and inspection of the operation or movement of the functional elements of the lens-shutter unit 40 is made easier than if carried out after the assembly of the lens-shutter unit 40 is completed or is incorporated in the lens barrel. Moreover, if it is discovered that a functional element of the front unit 40A or the rear unit 40B is defective in use or during assembling, it is necessary to replace only the front unit or rear unit which contains the defective element. Namely, since the other of the front or rear unit 40A or 40B can be used, there is minimum wastage of the components thereof, and thus, manufacturing and repair costs can be reduced. Furthermore, since the front and rear units 40A and 40B, which include elements having different functions, are formed as separate units, the assembling of the entire lens-shutter unit 40 can be simplified.

Since the leaf spring cover 70 which lies over the front and rear units 40A and 40B when they are interconnected is provided to press and hold the photo-interrupters 56 and 69, it is not necessary to secure the photo-interrupters 56 and 69 by an adhesive. As mentioned above, it is preferable that the detectors such as the photo-interrupters 56 and 69 be secured without using an adhesive. In the present embodiment in which the photo-interrupters 56 and 69 are held by the leaf spring cover 70, no adhesive is necessary. Consequently, not only can the mounting operation of the photo-interrupters 56 and 69 be facilitated, but also there is no chance of the photo-interrupters 56 and 69 or other movable elements being damaged by adhesive. Moreover, the leaf spring cover 70 can be removed by disassembling the lens-shutter unit 40 so as to separate the front and rear units 40A and 40B, so that the photo-interrupters 56 and 69 can be easily removed for replacement.

The leaf spring cover 70 also has a function to prevent the annular FPC 80A which constitutes part of the lens-shutter unit FPC 80 from being partly and elastically bent or deformed upward, in a direction away from the lens-shutter unit 40. Consequently, no special member to prevent such upward bending or deformation of the FPC (annular FPC 80A) is necessary, thus resulting in reduction in the number of the components.

As can be understood from the above discussion, according to the present invention, a lens assembly (lens-shutter unit) which can be easily assembled and disassembled and in which the functions of the elements can be easily checked, and wherein little or no waste of elements occurs, can be obtained. Moreover, according to the present invention, a lens assembly is achieved in which the attachment and detachment of the detectors to detect the operation or movement of the photographing lens group or the exposure control members are facilitated without damaging the functions of the detectors.

However, the present invention is not limited to the illustrated embodiments. For instance, although the lens-shutter unit 40 contains therein the front and rear sub-lens groups S1 and S2 which can be moved together in the optical axis direction and which can be moved between the mutually close position and the mutually distant position in the illustrated embodiments, the photographing lens group in the lens assembly can be alternatively made of a single lens group which has lens elements which are always moved together in the optical axis direction without varying the mutual distance therebetween.

The details of the structure of the lens assembly or the assembling process can be modified without departing from the spirit of the invention.

The lens assembly of the present invention is not limited to a zoom lens barrel and can be a single focal-point lens barrel.

Furthermore, although the rear unit 40B in the illustrated embodiments includes the shutter sectors 60 and the diaphragm sectors 62 as the exposure control members, the exposure control unit corresponding to the rear unit 40B can include only the shutter or only the diaphragm. In this alternative, the exposure control members can be of the type like the shutter sectors 60, driven by the motor in the lens assembly, or the type like the diaphragm sectors 62, driven by the ring-rotating mechanism outside the lens assembly.

Although, the shutter sectors 60 are provided with the variable diaphragm function and the shutter function in the previous embodiments, it is alternatively possible to provide the variable diaphragm function to members corresponding to the diaphragm sectors 62. In this alternative, it is desirable for a diaphragm drive system including elements similar to the shutter drive motor 67 and the reduction gear train 68 to be provided in the lens drive unit (front unit 40A in the embodiment).

Moreover, although the pulser including a combination of the photo-interrupters (photo-interrupters 56 and 69) and the slit disc/plate (slit disc 54/slit plate 61*c*) is used for the detection mechanism to detect the operation or movement of the lens or the shutter, etc., in the illustrated embodiments, the detection device is not limited thereto and can be constructed from a combination of a photo-reflector and a light reflecting member including light reflecting portion and non-reflecting portion. Namely, a photo-reflector, etc., can be prevented from slipping off via the leaf spring cover 70 instead of the photo-interrupters 56 and 69, etc.

Furthermore, obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens assembly comprising:
   an exposure control unit having an exposure control member;
   a lens drive unit including a lens drive mechanism which moves a photographing lens group in an optical axis direction;
   center apertures which are formed in said exposure control unit and said lens drive unit, respectively, at the center portions thereof, which define a lens movement opening when said exposure control unit and said lens drive unit are connected to each other; and
   a lens support frame which supports said photographing lens group, said lens support frame provided in said lens movement openings such that said lens support frame, said lens drive unit and said exposure control unit are movable relative to each other in the optical axis direction, and said lens support frame is configured to be driven via said lens drive mechanism.

2. The lens assembly according to claim 1, wherein said lens drive mechanism comprises:
   a lens drive motor; and
   a lens drive gear train provided between said lens drive motor and said lens support frame;
   wherein said lens drive motor and said lens drive gear train are supported by said lens drive unit.

3. The lens assembly according to claim 2, wherein said lens drive mechanism further comprises a lens drive ring which is rotatably provided between said lens drive unit and said exposure control unit;
   wherein said lens drive ring is rotated via said lens drive motor and said lens drive gear train, so that said lens support frame is moved in the optical axis direction in accordance with the rotation of said lens drive ring.

4. The lens assembly according to claim 3, wherein said photographing lens group comprises a front sub-lens group and a rear sub-lens group which optically function at a mutually close position and a mutually distant position in the optical axis direction;
   wherein said lens support frame includes a front lens frame and a rear lens frame which support said front and rear sub-lens groups, respectively;
   wherein said rear lens frame is rotatable within a predetermined angular range in said lens drive unit, and is supported so as to linearly move in the optical axis direction at each rotational extremity of said predetermined angular range while restricting the rotation thereof;
   wherein said rear lens frame and said lens drive ring include first contact portions, said first contact portions causing said rear lens frame to rotate and linearly move at said each rotational extremity, in accordance with the rotation of said lens drive ring; and
   wherein said front lens frame and said rear lens frame include second contact portions, said second contact portions moving said front lens frame and said rear lens frame between said mutually close position and said mutually distant position in accordance with the rotation of said rear lens frame, and said second contact portions linearly moving said front lens frame together with said rear lens frame, in accordance with the linear movement of said rear lens frame.

5. The lens assembly according to claim 1, wherein said exposure control member provided in said exposure control unit comprises at least one of shutter sectors which open and close said center aperture of said exposure control unit and diaphragm sectors which vary a diameter of said center aperture of said exposure control unit, independently of said shutter sectors.

6. The lens assembly according to claim 1, wherein said exposure control member is rotatable about rotation axes parallel with the optical axis of said photographing lens group so that said exposure control member is movable into said center aperture of said exposure control unit in accordance with the rotation thereof;
   wherein said exposure control unit is provided with an exposure control member drive ring which is rotatable in the forward and reverse directions about the optical axis, so that said exposure control member is driven by the rotation of said exposure control member drive ring.

7. The lens assembly according to claim 6, wherein said exposure control member drive ring is provided with a gear having a center located substantially on the optical axis;
   said lens drive unit including an exposure control motor and an exposure control gear train provided between said exposure control motor and said gear of said exposure control member drive ring;
   wherein when said lens drive unit and said exposure control unit are connected to each other, said exposure control gear train and said gear of said exposure control member drive ring are engaged with each other.

8. The lens assembly according to claim 6, wherein said exposure control member drive ring is provided on the outer peripheral surface thereof with a driven projection which extends in an externally radial direction of said exposure control unit; and
   wherein a ring-rotating mechanism is externally provided on said exposure control unit, said ring-rotating mechanism being provided with an engagement portion with which said driven projection engages and which rotates said exposure control member drive ring via said engagement portion and said driven projection.

9. The lens assembly according to claim 8, wherein said lens assembly is mounted to a zoom lens barrel, and said ring-rotating mechanism rotates said exposure control member drive ring in accordance with a zooming operation of said zoom lens barrel.

10. The lens assembly according to claim 1, wherein said exposure control unit comprises:
   shutter sectors which open and close said center aperture of said exposure control unit;
   a shutter drive ring which rotates about the optical axis in the forward and reverse directions to open and close said shutter sectors;
   diaphragm sectors which vary the diameter of said center aperture of said exposure control unit, independently of said shutter sectors; and
   a diaphragm drive ring which rotates about the optical axis in the forward and reverse directions to open and close said diaphragm sectors.

11. The lens assembly according to claim 10, wherein said shutter drive ring is provided with a gear having a center located substantially on the optical axis; and
   wherein said lens drive unit includes a shutter drive motor, and a shutter drive gear train provided between said shutter drive motor and said gear of said shutter drive ring, so that said shutter drive gear train and said gear of the shutter drive ring engage with each other when said lens drive unit and said exposure control unit are connected to each other.

12. The lens assembly according to claim 10, wherein said diaphragm drive ring is provided on the outer peripheral surface thereof with a driven projection which extends in an externally radial direction of said exposure control unit; and
   wherein a ring-rotating mechanism is externally provided on said exposure control unit, said ring-rotating mechanism being provided with an engagement portion with which said driven projection engages and which rotates said diaphragm drive ring through said engagement portion and said driven projection.

13. The lens assembly according to claim 1, further comprising at least one detection member, said detection member comprising at least one of a lens movement detector which detects the amount and direction of the movement of said photographing lens group in the optical axis direction, and an exposure control detector which detects the operation state of said exposure control member;
   wherein said lens drive unit is provided on the outer surface thereof with a support portion on which said detection member is supported.

14. The lens assembly according to claim 13, further comprising a cover member which is provided with engagement portions for engaging with said lens drive unit and said exposure control unit, said cover member being mounted to the outer surfaces of said lens drive unit and said exposure control unit via said engagement portions when said lens drive unit and said exposure control unit are interconnected, to thereby cover said support portion which supports said detection member.

15. The lens assembly according to claim 14, wherein said cover member is provided with an elastically deformable abutment portion which abuts against said detection member to bias said detection member into said support portion of said lens drive unit.

16. The lens assembly according to claim 14, wherein said cover member supports a portion of an FPC, which is connected to said detection member, between said cover member and the outer surface of said lens drive unit.

17. A lens assembly comprising:
   a support barrel having a center opening;
   a lens support frame which supports a photographing lens group;
   a lens drive mechanism which moves said lens support frame within said center opening of said support barrel in the optical axis direction; and
   an exposure control member which is movable into the center opening;
   wherein said support barrel includes a lens drive unit having at least part of said lens drive mechanism, and an exposure control unit which supports said exposure control member; and
   wherein said lens drive unit and said exposure control unit are interconnected upon each of said lens drive unit and said exposure control unit being independently assembled.

18. A lens assembly comprising:
   an exposure control unit having an exposure control member;
   a lens drive unit including at least a part of a lens drive mechanism which moves a photographing lens group in an optical axis direction;
   center apertures which are formed in said exposure control unit and said lens drive unit, respectively, at the center portions thereof, which define a lens movement opening when said exposure control unit and said lens drive unit are connected to each other;
   a lens support frame which supports said photographing lens group, said lens support frame being provided in said lens movement openings so as to move in the optical axis direction and so as to be driven via said lens drive mechanism provided in the lens drive unit;
   a lens movement detector which detects the amount and direction of the movement of said lens support frame;
   an exposure control detector which detects the operational state of said exposure control member;
   support portions provided on the outer surface of said lens drive unit to support said lens movement detector and said exposure control detector; and
   a cover member which is provided with engagement portions for engaging with said lens drive unit and said exposure control unit, said cover member being mounted to the outer surfaces of said lens drive unit and said exposure control unit via said engagement portions when said lens drive unit and said exposure control unit are interconnected, to thereby cover said support portions which support said detectors.

19. The lens assembly according to claim 18, wherein said cover member is provided with a pair of elastically deformable abutment portions which abut against said lens movement detector and said exposure control detector to bias said lens movement detector and said exposure control detector into said support portions of said lens drive unit.

20. The lens assembly according to claim 18, further comprising an FPC which is connected to said lens movement detector and said exposure control detector;

wherein said cover member holds a part of said FPC between said cover member and the outer surface of said lens drive unit.

21. A lens assembly comprising:

an exposure control mechanism;

a lens drive mechanism which drives a photographing lens group in an optical axis direction; and a detector which detects the operational state of at least one of said lens drive mechanism and said exposure control mechanism;

wherein said lens assembly includes front and rear function units which can be divided, one of said front and rear function units being provided on the outer peripheral surface thereof with a detector receiving portion which receives therein said detector; and wherein a cover member having engagement portions for engaging with said front and rear function units is mounted to the outer surfaces of said front and rear function units via said engagement portions when said function units are interconnected, to thereby cover said detector receiving portion.

22. The lens assembly according to claim 21, wherein said cover member is provided with an elastically deformable abutment portion which abuts against said detector to bias said detector into said detector receiving portion of said function unit.

23. The lens assembly according to claim 21, further comprising an FPC which is connected to said detector;

wherein said cover member holds a part of said FPC between said cover member and the outer surface of said function unit.

* * * * *